US007949428B2

(12) United States Patent
Endo et al.

(10) Patent No.: US 7,949,428 B2
(45) Date of Patent: May 24, 2011

(54) ROBOT APPARATUS AND METHOD OF CONTROLLING THE SAME

(75) Inventors: Gen Endo, Tokyo (JP); Jun Morimoto, Kyoto (JP); Jun Nakanishi, Kyoto (JP); Gordon Chang, Kyoto (JP)

(73) Assignees: Sony Corporation, Tokyo (JP); Japan Science and Technology Agency, Saitama (JP); Advanced Telecommunications Research Institute International, Kyoto (JP)

( * ) Notice: Subject to any disclaimer, the term of this patent is extended or adjusted under 35 U.S.C. 154(b) by 1142 days.

(21) Appl. No.: 11/703,332

(22) Filed: Feb. 7, 2007

(65) Prior Publication Data

US 2007/0220637 A1    Sep. 20, 2007

(30) Foreign Application Priority Data

Feb. 9, 2006   (JP) .................................. 2006-032762

(51) Int. Cl.
    *G06F 19/00*   (2011.01)
(52) U.S. Cl. .......... 700/245; 700/19; 700/247; 700/249; 318/567; 318/568.12; 318/568.2
(58) Field of Classification Search .................. 700/245, 700/247, 249, 250, 19, 52; 901/1, 2, 8, 20, 901/50, 46, 48; 340/870.16; 318/568.2, 318/567, 568.1, 568.18, 568.17, 568.23, 318/568.12; 706/2, 10, 904, 912; 601/5
See application file for complete search history.

(56) References Cited

U.S. PATENT DOCUMENTS

| 6,961,640 | B2 * | 11/2005 | Kuroki et al. ................. 700/245 |
| 2003/0120388 | A1 * | 6/2003 | Kuroki et al. ................. 700/245 |
| 2004/0148268 | A1 * | 7/2004 | Reil .............................. 706/904 |
| 2005/0113973 | A1 * | 5/2005 | Endo et al. ................... 700/245 |
| 2007/0220637 | A1 * | 9/2007 | Endo et al. ........................ 901/2 |

OTHER PUBLICATIONS

Yamasaki et al., Phase Reset and Dynamic Stability During Human Gait, 2003, Science Direct Byosystems, pp. 221-232.*
Endo et al., A method for co-evolving morphology and walking pattern of biped humanoid robot, 2002,IEEE, Robotics and Automation, Proceedings ICRA 2002 International Conference, Washington, DC,USA, pp. 2775-2780.*
Yang et al., Dynamic Systems Control Using Entrainment-enhanced Neural Oscillator,Jun. 2005, IEEE, ICCAS 2005 KINTEX, Korea, pp. 1-5.*

(Continued)

*Primary Examiner* — Khoi Tran
*Assistant Examiner* — Jaime Figueroa
(74) *Attorney, Agent, or Firm* — Frommer Lawrence & Haug LLP; William S. Frommer; Ellen Marcie Emas

(57) ABSTRACT

A robot apparatus having a plurality of movable sections includes a motion control section that generates a control signal for the periodic motion of at least part of the movable sections according to the output of an oscillator showing self-oscillation and entrainment characteristics, an environment measuring section that measures the motion according to the control signal for the movable sections or the physical environment at the time of the motion of the movable sections, a periodic oscillator control section that inputs a periodic signal to the oscillator as feedback according to the outcome of the measurement by the environment measuring section and generates an entrainment phenomenon and a non-periodic oscillator control section that inputs a non-periodic or temporary feedback signal to the oscillator.

34 Claims, 43 Drawing Sheets

OTHER PUBLICATIONS

Yang et al., Entrainment-enhanced Neural Oscillator for Imitation Learning, 2006, IEEE, Proceedings of International Conference on Information Acquisition, China, pp. 218-223.*

Kasuga et al., Human-Robot Handshaking using Neural Oscillators, Apr. 2005, Proceedings of the 2005 IEEE International Conference on Robotics and Automation, Barcelona, Spain, pp. 3802-3807.*

Tomita et al., A Model of Learning Free Bipedal Walking in Indefinite Environment, 2003, IEEE, SICE Annual Conference in Fukui, Aug. 2003, Japan, pp. 1535-1540.*

Zaier et al., Motion Pattern Generator and Reflex System for Humanoid Robots, 2006, Proceedings of the 2006 IEEE/RSJ International Conference on Intelligent Robots and Systems, Oct. 2006, Beijing, China, pp. 840-845.*

* cited by examiner

ROBOT APPARATUS AND METHOD OF CONTROLLING THE SAME

CROSS REFERENCE TO RELATED APPLICATION

The present invention contains subject matter related to Japanese Patent Application JP2006-032762, filed in the Japanese Patent Office on Feb. 9, 2006, the entire contents of which being incorporated herein by reference.

BACKGROUND OF THE INVENTION

1. Field of the Invention

The present invention relates to a robot apparatus having a plurality of movable sections including legs and a method of controlling the same. More particularly, the present invention relates to a robot apparatus adapted to control the motions of the movable sections thereof by means of oscillators having self-oscillation and entrainment characteristics and also to a method of controlling such a robot apparatus.

To be more specific, the present invention relates to a robot apparatus adapted to control the non-periodic (aperiodic) motions of the movable sections thereof by means of oscillators having entrainment characteristics and a method of controlling such a robot apparatus. More specifically, the present invention relates to a robot apparatus adapted to use a non-periodic signal as feedback signal to oscillators and having a large entrainment region and a method of controlling such a robot apparatus.

2. Description of the Related Art

Researches on and developments of structures of legged mobile robots and controlling such robots to make them walk stably have progressed remarkably in recent years and expectations are high for actual daily use of such robots. Legged mobile robots are instable if compared with crawler type robots and hence it is difficult to control the attitude and the locomotion of such robots. However, legged mobile robots are advantageous because of the capabilities of walking and running in a flexible manner as they can move up and down staircases and stride over obstacles.

Techniques for controlling the locomotion and other motions of legged mobile robots can be roughly divided into model-based approaches and non-model-based approaches.

Examples of model-based approaches include locomotion control techniques employing a Zero Moment Point (ZMP) as stability judging norm (see Jpn. Pat. Appln. Publication No. 3443077 and Jpn. Pat. Appln. Publication No. 3443116) and linear inverted pendulum control techniques (see S. Kajita, F. Kanehiro, K. Kaneko, K. Fujiwara, K. Yokoi and H. Hirukawa, "Biped walking pattern generation by a simple three-dimensional inverted pendulum model", Advanced Robotics, vol. 17, No. 2, pp. 131-147, 2003). Model-based approaches are accompanied by problems including that the robot requires detailed model information including the center of gravity, the moment of inertia and the link length of each part of the robot to control motions of the robot, that the robot requires high precision actuators capable of accurately following joint angle trajectories designed based on model information at high manufacturing cost and that the robot becomes less robust when subjected to unexpected external force or formed to walk on an unleveled ground.

On the other hand, the bio-mechanisms of human being and other animals are believed to be efficiently operating for locomotion and other motions, suitably utilizing the physical laws applicable to legs and arms. If robots can utilize such physical laws, they can be made to walk and do other motions with a high energy conversion efficiency without requiring detailed models (and hence with a small load for computations) and drive torques for actuators.

Recently, non-model-based approaches that do not require information on detailed mechanical models and environments in advance are attracting attention in view of the above-identified problems of the model-based control technique. A typical example of such a control technique is the motion control of a robot using a model of neural oscillators that are believed to be inherent in the nervous systems of living creatures.

Neural oscillators are formulated by Matsuoka (see K. Matsuoka: "Sustained oscillator generated by mutually inhibiting neurons with adaptation", Biological Cybernetics, 52, pp. 345-353 (1985)). Particularly, it is known that a neural oscillator (coupled oscillator) obtained by mutual inhibitory connection of two neural elements shows self-oscillation with a natural frequency that is determined by the parameters of the neural elements. It is also known that such a neural oscillator can input signals from the outside and shows "an entrainment phenomenon" of outputting a signal in response to a periodic input with a frequency close to the natural frequency of the neural oscillator with a predetermined phase delay.

A neural oscillator can output an adaptively synchronized signal in response to an appropriate input (feedback) from the environment because of the feature of self-oscillation and entrainment characteristics it has. Therefore, it is possible to form a controller that is robust against environmental changes by means of neural oscillators. For example, it is possible to control the walking motion of a robot by taking the movable sections, or at least a par thereof, for oscillators having such entrainment characteristics, handling the walking motion and other motions of the robot as periodic motion and determining or controlling the phase and the frequency of each of the oscillators. Then, continuation of such a periodic motion can be regarded as "stable locomotion".

To date, examples of application of neural oscillators to biped locomotion (see G. Taga, Y. Yamaguchi, H. Shimizu: "Self-organized control of bipedal locomotion by a neural oscillators in unpredictable environment", Biological Cybernetics, vol. 65, pp. 147-159 (1991); G. Taga, "Dynamic Design of Brain and Body—Non-Linear Dynamics of Perception and Development", Kaneko Shobo (2002); Hase, Yamazaki, "Generation of a Motion Resembling Real Biped Locomotion using neural oscillator and genetic algorithm", Papers of the Society of Instrument and Control Engineers, Vol. 33, No. 5, pp. 448-454 (1997); Nakamura, Sato, Ishii, "Reinforcement Learning for Rhythmic Movements Using a Neural Oscillator Network", Papers of the Institute of Electronics Information and Communication Engineers, Vol. J87-D-II, No. 3, pp. 893-902 (2004); and G. Endo, J. Nakanishi, J. Morimoto, G. Chen, "Experimental Study of a Neural Oscillator for Biped Locomotion Using QRIO", International Conference on Robotics and Automation, pp. 598-604 (2005)), those to quadruped locomotion (see Fukuoka, Kimura, "Biologically Inspired Adaptive Dynamic Walking of a Quadruped Robot Irregular Terrain—Adjustment Based on Somatic Sensation and Vestibular Sensation—"), those to periodic motions of arms (see Matthew M. Williamson, "Robot Arm Control Exploiting Natural Dynamics", Massachusetts Institute of Technology, Ph-D Theses (1999)) and those to juggling motions (see S. Miyakoshi, M. Yamakita, K. Furuta, "Juggling Control Using Neural Oscillator", International Conference on Intelligent Robots and Systems (IROS '94), Vol. 2, pp. 1186-1193 (1994)).

However, the above cited examples of application mostly handle steady periodic motions and periodic oscillations are used for entrainment. In other words, the feedback signal input to a neural oscillator from the environment is a periodic signal and there is no example that uses a non-periodic signal such as a pulse wave as feedback signal. Thus, no satisfactory study has been made so far on the applicability of neural oscillators to non-periodic motions such as a motion for getting to a goal. Additionally, the amplitude of the feedback signal is about a half of that of the neural oscillator at most and hence it is not possible to produce a large entrainment region by a periodic signal.

An abrupt external turbulence can occur when a locomotive robot walks on an unleveled ground or at high speed or encounters an obstacle. Then, if the attitude of the robot goes out of the entrainment region of its neural oscillators, it is difficult for the robot to recover the original attitude by a feedback signal that is a periodic signal.

SUMMARY OF THE INVENTION

In view of the above-identified circumstances, it is desirable to provide an excellent robot apparatus that can control the motion of its movable sections by means of oscillators showing self-oscillation and entrainment characteristics and a method of controlling such a robot apparatus.

It is also desirable to provide an excellent robot apparatus that can control the non-periodic motion of its movable sections by means of an oscillator showing entrainment characteristics and a method of controlling such a robot apparatus.

It is also desirable to provide an excellent robot apparatus adapted to use a non-periodic signal as feedback signal for an oscillator and having a large entrainment region and a method of controlling such a robot apparatus.

In an aspect of the invention, there is provided a robot apparatus having a plurality of movable sections and including:

a motion control section that generates a control signal for the periodic motion of at least part of the movable sections according to the output of an oscillator showing self-oscillation and entrainment characteristics;

an environment measuring section that measures the motion according to the control signal for the movable sections or the physical environment at the time of the motion of the movable sections;

a periodic oscillator control section that inputs a periodic signal to the oscillator as feedback according to the outcome of the measurement by the environment measuring section and generates an entrainment phenomenon; and a non-periodic oscillator control section that inputs a non-periodic or temporary feedback signal to the oscillator.

The movable sections may be movable legs having at least a joint. The motion control section can transform the output of the oscillator into the trajectories of the movable sections in the coordinate system of the robot apparatus and computationally determine the command values for the joints from the trajectories by inverse kinematics arithmetic operations.

The present invention relates to a robot apparatus realized by taking at least part of the mobile sections such as legs of the robot for oscillators and handling walking and other motions as cyclic motions on the basis of the findings of exercise physiology, neuroscience and computer learning.

The motion control section of the robot apparatus converts the phase signal output from the oscillator into a joint command value (control signal) for the position, the angular velocity, the angular acceleration and/or the torque of each of the joints of the movable sections by mapping. Then, it drives each of the joints of the movable sections according to the control signal. The position, the angular velocity, the angular acceleration, the torque and the external force of each of the joints and other environment information are observed by sensors when the movable sections are operated and a feedback signal is generated according to the output values of the sensors. Then, the phase and the frequency of the oscillator is determined according to the feedback signal and the motion of the robot apparatus is controlled according to the feedback signal. Thus, the oscillator shows entrainment characteristics relative to the feedback signal and its natural frequency is autonomously adjusted according to the environment.

For example, when the robot apparatus is a legged mobile robot, the walking motion of the robot is handled as cyclic motion and a periodic signal is generated by means of a neural oscillator or the like. The joint actuators of the leg sections of the robot are controlled by means of the periodic signal. At this time, an entrainment phenomenon occurs as the periodic signal for the observed walking motion and the neural oscillator are made to interfere with each other so that the robot can stably continue the walking motion. When the cyclic motion continues, such a continuous motion can be regarded as "stable walking".

However, a feedback signal that is used for a cyclic motion is a periodic signal having an amplitude about a half of that of a neural oscillator and the entrainment region of such a signal is not large. Therefore, such a feedback signal is not satisfactory from the viewpoint of applicability to a non-cyclic motion of a neural oscillator that is observed when getting to a target point. Additionally, when an abrupt, large and non-periodic external turbulence is applied and the state of the neural oscillator goes out of the entrainment region, the neural oscillator can no longer move back to the entrainment region. Then, as a result, it is not possible for the robot to continue the cyclic motion.

In view of the above-described circumstances, a robot apparatus according to an aspect of the present invention is made to be able to move back into the entrainment region from a state where it goes out of the entrainment region by using a pulse-like non-periodic signal having an amplitude that is about ten times as large as that of a neural oscillator for a short term non-periodic feedback operation.

A neural oscillator may be used for the above-described oscillator. Such a neural oscillator includes two neural elements coupled to each other by mutually inhibiting coupling, of which one works for the positive side output while the other works for the negative side output.

The non-periodic oscillator control section may be so adapted as to do a positively directed excitation-excitation type feedback operation of inputting a feedback signal of a single pulse rectangular wave or a negatively directed inhibition-inhibition type feedback operation of inputting a feedback signal of a single pulse rectangular wave to both of the positive side and negative side neural elements. The oscillation of the oscillator is made to continue regardless if an excitation-excitation type feedback signal is input or an inhibition-inhibition type feedback signal is input. Then, the amplitude is substantially proportional to the height of the rectangular wave. In other words, such a feedback signal is suited to gradually increase or decrease the output amplitude.

Alternatively, the non-periodic oscillator control section may be so adapted as to do an excitation-inhibition type feedback operation of inputting stepwise a positively directed feedback signal and a negatively directed feedback signal respectively to the positive side neural element and the negative side neural element. With this arrangement, it is possible to produce a discontinuous motion by stopping the oscillation of the oscillator. Therefore, since such a feedback signal can stop oscillation at a specific value, it is useful for controlling the angle of a joint in a non-cyclic motion of getting to a target point.

On the other hand, when an excitation-inhibition type feedback signal is input not stepwise but by means of a rectangular wave, the speed becomes discontinuous immediately after removing the input of the feedback signal to stop the oscillation. Such discontinuity of speed is not desirable when the speed is used as joint command value for the robot. To the contrary, when an excitation-zero type feedback operation or an inhibition-zero type feedback operation of inputting a rectangular wave only to the neural element to be adjusted is used, the oscillation of the oscillator is continued at a smoothly changing rate. Then, the amplitude is substantially proportional to the height of the rectangular wave. In other words, since an excitation-zero type or inhibition-zero type feedback signal can gradually increase or decrease a specific amplitude, it is suited to temporarily increase or decrease a specific amplitude.

It is also possible to use in combination the entrainment phenomenon due to feeding back conventional periodic signals and a non-periodic feedback operation to be performed when the state of the robot apparatus goes out of the entrainment region. It is possible to absorb the phase shift of the oscillator that arises due to the latter can be absorbed by feeding back the former.

A robot apparatus according to an aspect of the present invention includes an environment measuring section that measures and acquires information on the physical environment of the robot apparatus. An oscillator state determining section can determine that the state of the oscillator is out of the entrainment region when the outcome of measurement of the environment measuring section satisfies predetermined requirements.

The non-periodic oscillator control section may output a constant value as feedback signal to the oscillator according to the outcome of determination that the state of the oscillator is out of the entrainment region. The motion control section uses in combination the periodic feedback signal from the periodic oscillator control section and the non-periodic feedback signal from the non-periodic oscillator control section. In other words, a feedback signal obtained by adding the non-periodic feedback signal to the periodic feedback signal that operates as base line is input to the oscillator.

In the case of a biped locomotion robot having left and right legs that are fitted to the trunk as movable sections, the motion control section drives the Z-position of each of the legs by adding a value based on the output of the oscillator for describing the motion of the leg in the Z-direction to the initial reference position defined for the leg in the Z-direction. At this time, the periodic oscillator control section can realize an intra-lateral-plane stepping motion as a walking motion using the left and right legs by generating a linear feedback signal according to at least the difference between the floor reaction forces applied respectively to the soles of the left and right legs or the roll angle of the trunk and inputting it to the oscillator describing the motion of, the leg in the Z-direction. The motion control section drives the X-position of the leg by using an oscillator describing the motion in the X-direction showing a phase shift of 90 degrees relative to the oscillator describing the motion of the leg in the Z-direction. Then, the periodic oscillator control section can realize an intra-sagittal-plane straight forward motion by generating a linear feedback signal according to the angular velocity of the roll of the trunk and inputting it to the oscillator describing the motion of the leg in the X-direction.

If it is desired to move the leg forward by increasing the stride in the intra-sagittal-plane motion, the non-periodic oscillator control section temporarily supplies a feedback signal that increases the amplitude to the oscillator describing the motion of the foreleg in the X-direction. Inversely, if it is desired to decrease the stride in the intra-sagittal-plane motion, the non-periodic oscillator control section temporarily supplies a feedback signal that decreases the amplitude to the oscillator describing the motion of the foreleg in the X-direction.

If it is desired to increase the height of the idling leg in the intra-lateral-plane stepping motion, the non-periodic oscillator control section temporarily supplies a feedback signal that increases the amplitude in the positive Z-direction to the oscillator describing the motion of the idling leg in the Z-direction.

At this time, the non-periodic oscillator control section temporarily supplies a feedback signal having a value greater than the amplitude of the oscillator describing the motion of the idling leg in the Z-direction using as base line the linear feedback signal according to at least the difference between the floor reaction forces applied respectively to the soles of the left and right legs or the roll angle of the trunk.

A steady intra-saggital-plane straight forward motion is realized by giving an appropriate phase difference to the oscillator in the X-direction and the oscillator in the Z-direction on an assumption that the intra-lateral-plane motion and the intra-sagittal-plane motion are independent from each other. However, there arises a problem that the phase difference becomes inappropriate when a non-periodic feedback signal is input to the oscillator describing the motion of the idling leg in the Z-direction in order to increase the height of the idling leg. Therefore, when the non-periodic oscillator control section inputs a temporary feedback signal to the oscillator in the Z-direction, the periodic oscillator control section accordingly inputs the base line periodic signal for the purpose of producing an appropriate phase difference between the oscillator describing the motion in the X-direction and the oscillator describing the motion in the Z-direction.

More specifically, the periodic oscillator control section can produce an appropriate phase difference necessary for walking between the oscillator in the X-direction and the oscillator in the Z-direction by generating a base line periodic signal by way of weighting and linearly coupling the linear feedback signal according to the difference between the floor reaction forces applied respectively to the soles of the left and right legs and the linear feedback signal according to the angular velocity of the roll of the trunk.

Additionally, when the floor reaction force applied to the sole of the supporting leg falls below a predetermined threshold value as a result of the external force applied to the robot and both the angular velocity and the angle of the trunk exceed the respective threshold values, the non-periodic oscillator control section can improve the robustness of the robot against the external force applied to the robot during a walking motion by temporarily supplying a feedback signal that increases the output in the acting direction of the external force to the oscillator describing the motion in the acting direction of the external force.

Thus, according to the present invention, it is possible to provide a robot apparatus and a method of controlling it that can control the non-periodic motion of the movable sections by means of an oscillator showing entrainment characteristics.

Additionally, according to the present invention, it is possible to provide a robot apparatus having a large entrainment region and a method of controlling it by using a non-periodic signal as feedback signal to the oscillator.

Since a robot apparatus according to the present invention controls the movable sections thereof by using a neural oscillator that shows self-oscillation and entrainment characteristics, it does not require a detailed machine model and is robust against changes in the parameters of the robot. Additionally, it feeds back a non-periodic signal to the neural oscillator when an event such as an abrupt external turbulence takes place while the neural oscillator is controlling the motion of the robot. At this time, it is possible to generate a non-periodic motion by inputting a pulse-shaped non-periodic signal having an amplitude sufficiently larger than the oscillation amplitude of the neural oscillator to increase or decrease a specific amplitude. Or, it is possible to stop the oscillation itself of the neural oscillator in order to avoid an excessively large output by inputting a non-periodic signal stepwise. Such a feedback signal of a non-periodic signal can be added to the ordinary periodic feedback signal.

If a pulse-shaped non-periodic signal having an amplitude sufficiently larger than the oscillation amplitude of the neural oscillator is input, the neural oscillator oscillates smoothly due to the low pass filtering characteristic of the neural oscillator to give rise to a smooth output.

When the robot intensively learns the modeling error that the feedback signal has, it only has to learn the pulse string that is input non-periodically to make the learning an easy one.

While a robot apparatus according to the present invention can generate a non-periodic motion by feeding back a non-periodic signal, it can also drive an element with asymmetric positive and negative amplitudes.

It is possible for a robot apparatus according to the present invention to improve the resistance against external turbulences and noises by forming a state transition machine by means of the state of a neural oscillator such as generating a motion according to a periodic signal and a motion according to a non-periodic signal.

The entrainment region of the neural oscillator can be expanded by combining such a state transition machine and inputting a pulse-shaped non-periodic signal as one-shot like feedback signal to the neural oscillator.

Other purposes, the features and the advantages of the present invention will become apparent from the following detailed description on preferred embodiments given below by referring to the accompanying drawings.

DETAILED DESCRIPTION OF THE PREFERRED EMBODIMENTS

Now, embodiments of the present invention will be described in greater detail by referring to the accompanying drawings.

A. Configuration of Robot Apparatus

Figure 1:
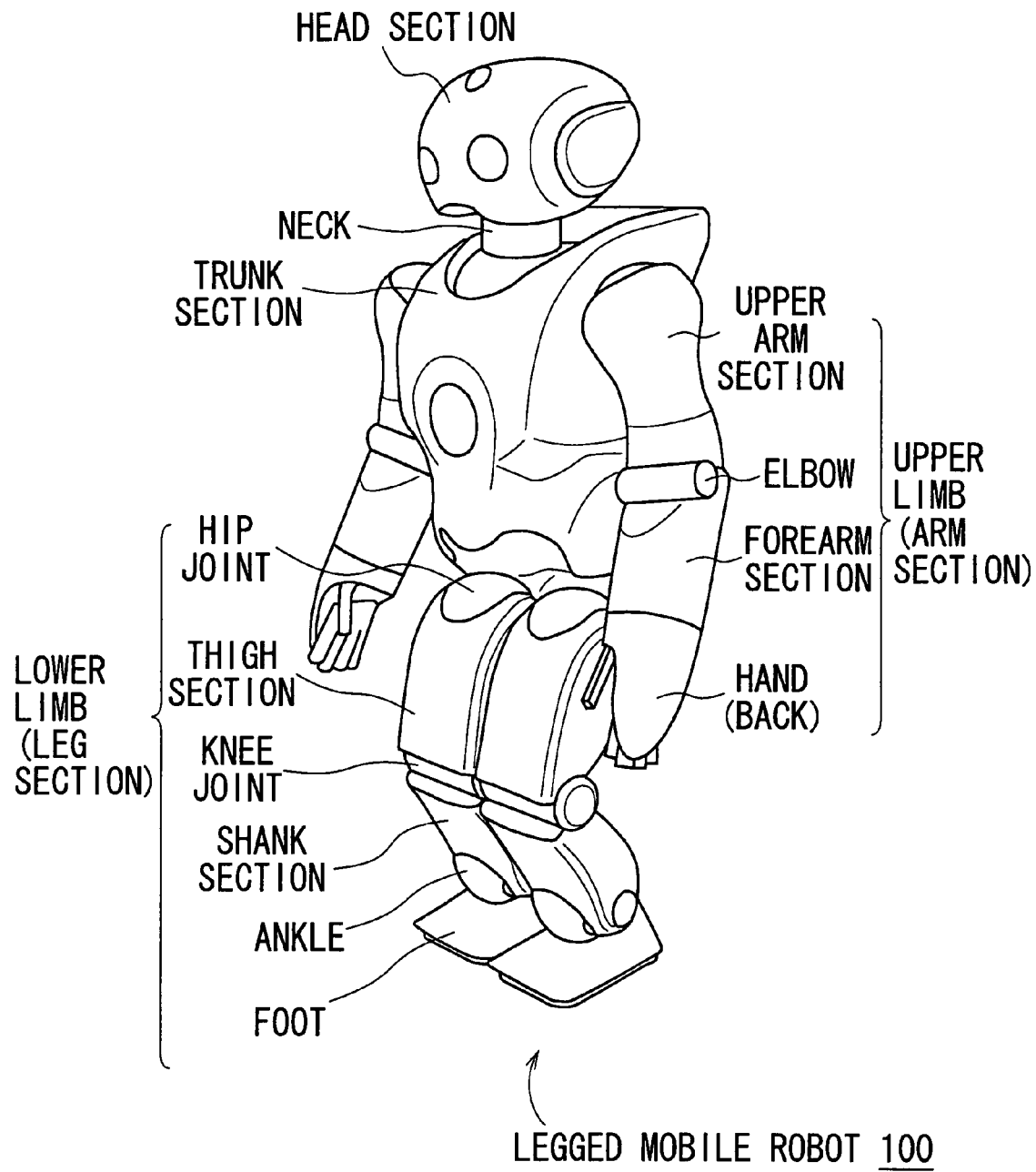
FIG. 1 is a schematic perspective front view of a "humanoid" or "human-type" legged mobile robot 100 who is standing upright.
Figure 2:
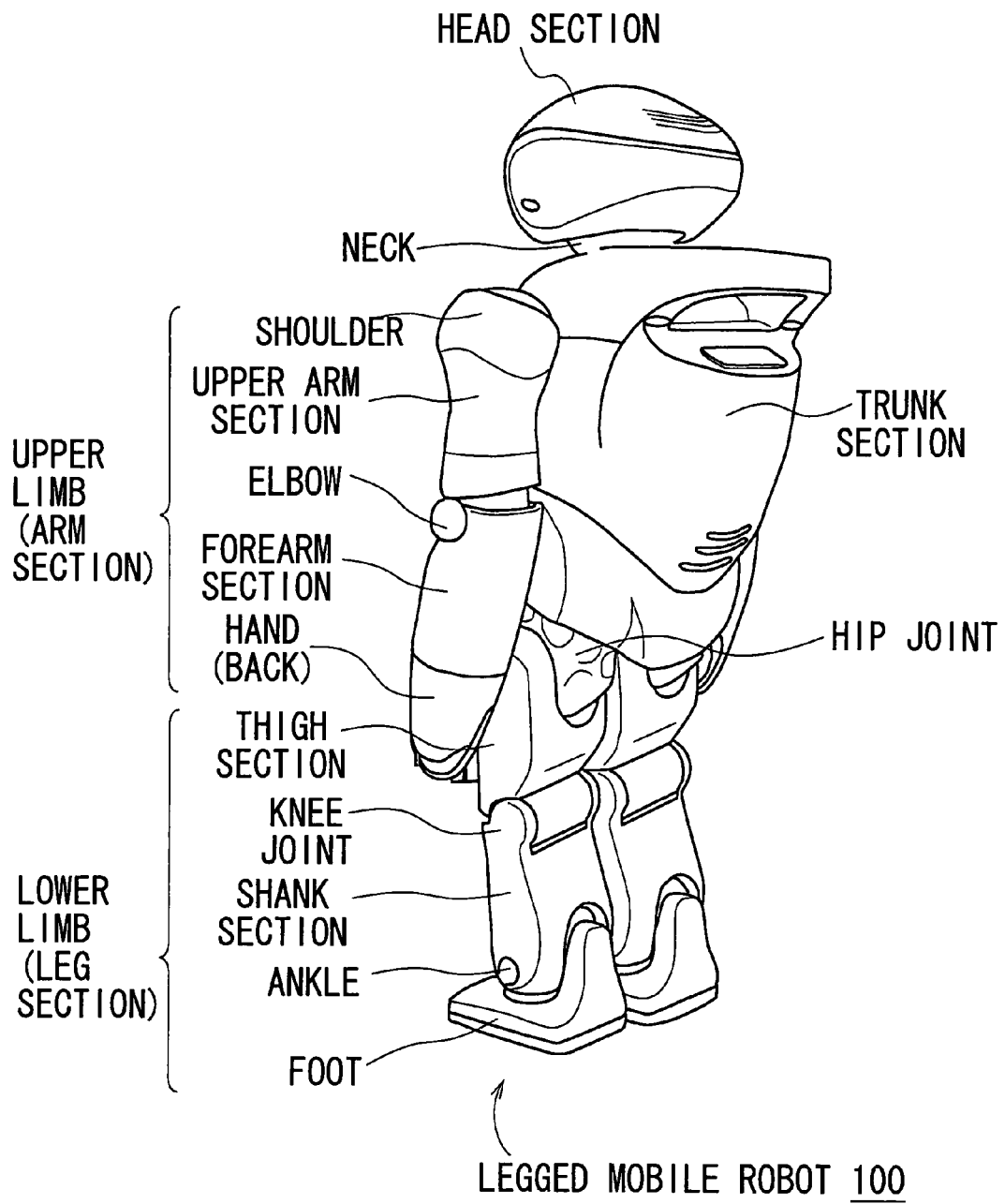
FIG. 2 is a schematic perspective back view of the humanoid legged mobile robot 100 who is standing upright.

FIG. 1 is a schematic perspective front view of a "humanoid" or "human-type" legged mobile robot 100 who is standing upright. FIG. 2 is a schematic perspective back view of the humanoid legged mobile robot 100 who is standing upright. The legged mobile robot 100 has a trunk section, a head section, left and right upper limb sections and left and right lower limb sections to be used for biped locomotion and the overall motion of the robot is controlled by a control section (not shown) typically contained in the trunk section.

Each of the lower limbs includes a thigh, a knee joint, a shank, an ankle and a foot. The lower limbs are linked to each other by means of a hip joint substantially at the lower end of the trunk section. Each of the upper limbs includes an upper arm, an elbow joint and a forearm. The left and right upper limbs are linked respectively to the upper left and right lateral edges of the trunk section by means of shoulder joints. The head section is linked substantially to the top center of the trunk section by means of a neck joint.

The control section is a cabinet containing a controller (main control section) for processing external inputs from the drive circuits of the joint actuators and various circuits (which will be described in greater detail hereinafter), a power supply circuit and peripherals. The control section may additionally contain a communication interface and a communication apparatus for remote control operations.

The legged mobile robot 100 can realize biped locomotion of walking on the two legs as the control section controls the motion of the entire body in a concerted manner. Biped locomotion is generally realized by repeating a walking cycle that is divided into the four motion periods as listed below.

(1) a single leg support period when the right leg is lifted and the body is supported by the left leg alone
(2) a two legs support period when the right leg is grounded
(3) a single leg support period when the left leg is lifted and the body is supported by the right leg alone
(4) a two legs support period when the left leg is grounded.

The locomotion control of the legged mobile robot 100 can be realized by planning target trajectories of the lower limbs, typically using a ZMP as stability judging norm, and amending, the planned trajectories in each of the above listed periods. Then, the amendment of the trajectories of the lower limbs is suspended in the two legs support period and the height of the waist is amended to a constant value by using the total amount of amendment relative to the planned trajectories. Amended trajectories are generated so as to restore the relative positional relationship of the ankles of the legs and the waist that has been amended to the planned trajectories in the single leg support period.

Or, as will be discussed in greater detail hereinafter, it is possible to take at least part of the movable sections of the entire body of the legged mobile robot 100 such as the left and right legs for oscillators that repeat a periodic motion. Then, it is possible to realize a periodical stability for the machine and accommodate unknown external turbulences by generating a phase for each of the oscillators in response to the internal condition and the external environment obtained according to the outputs of sensors by mathematical operations.

Figure 3:
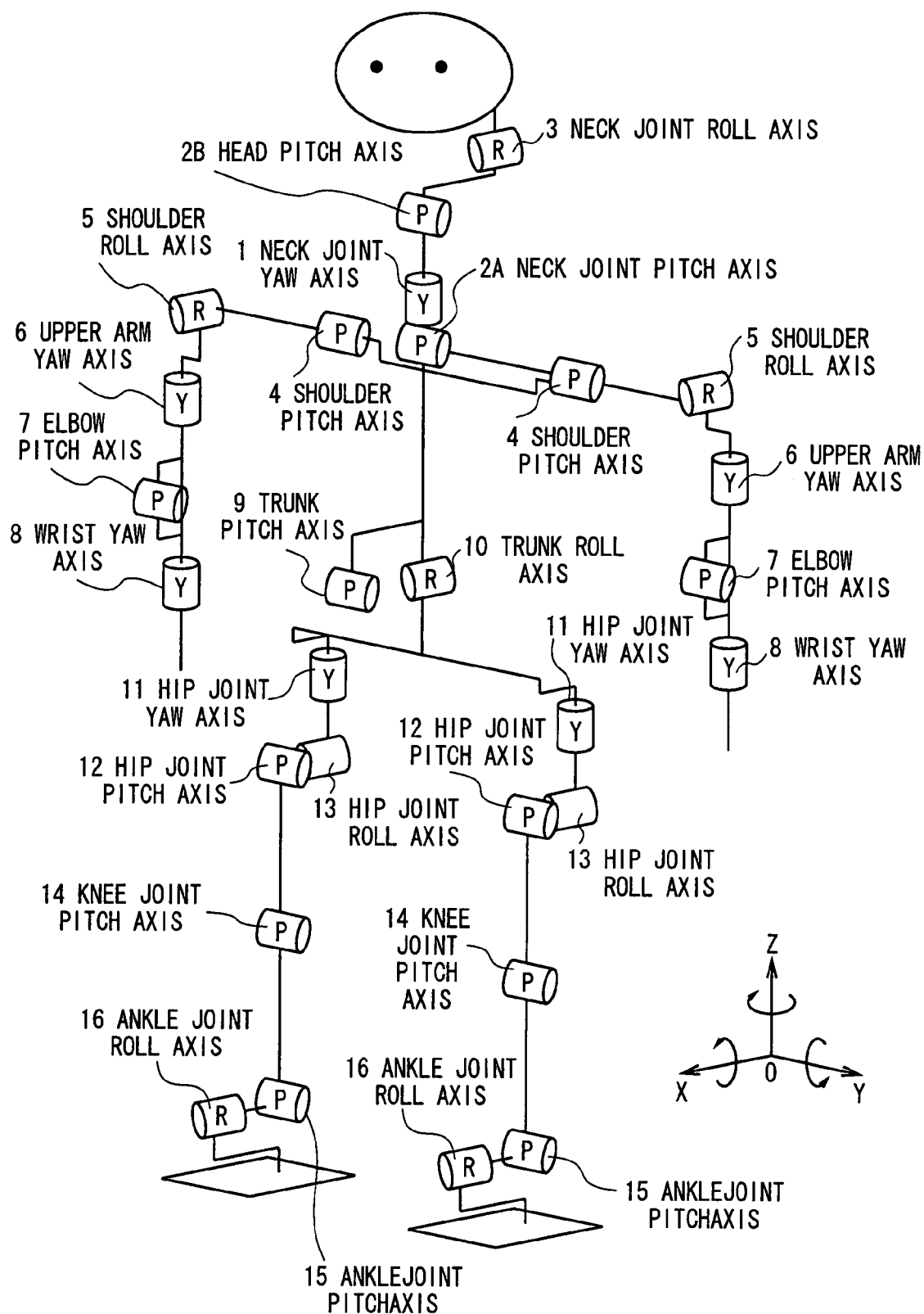
FIG. 3 is a schematic illustration of the degree of freedom of each of the joints that the legged mobile robot 100 has.

FIG. 3 is a schematic illustration of the degree of freedom of each of the joints that the legged mobile robot 100 has. As shown in FIG. 3, the legged mobile robot 100 is a multi-limb structure having upper limbs including a head and two arms and lower limbs including two legs to be used for moving and a trunk section linking the upper limbs and the lower limbs.

The neck joint that supports the head section has three degrees of freedom realized by a neck joint yaw axis 1, first and second neck joint pitch axes 2a and 2b and a neck joint roll axis 3.

Each of the arms includes a shoulder joint pitch axis 4, a should joint roll axis 5, an upper arm yaw axis 6, an elbow joint pitch axis 7 and a wrist joint yaw axis 8 and a hand from the viewpoint of degrees of freedom. The hand is a multi-joint structure including a plurality of fingers and having many degrees of freedom.

The trunk section has two degrees of freedom realized by a truck pitch axis 9 and a trunk roll axis 10.

Each of the legs of the lower limbs includes a hip joint yaw axis 11, a hip joint pitch axis 12, a hip joint roll axis 13, a knee joint pitch axis 14, an ankle joint pitch axis 15, an ankle joint roll axis 16 and a foot from the viewpoint of degrees of freedom.

Note, however, that the legged mobile robot 100 does not necessarily have to have the above listed degrees of freedom. Nor is it limited to the above listed degrees of freedom. It may be needless to say that the degrees of freedom and the number of joints may be increased or decreased appropriately according to the restrictive conditions for designing and manufacturing the robot and the requirements of the specifications of the robot.

Figure 4:
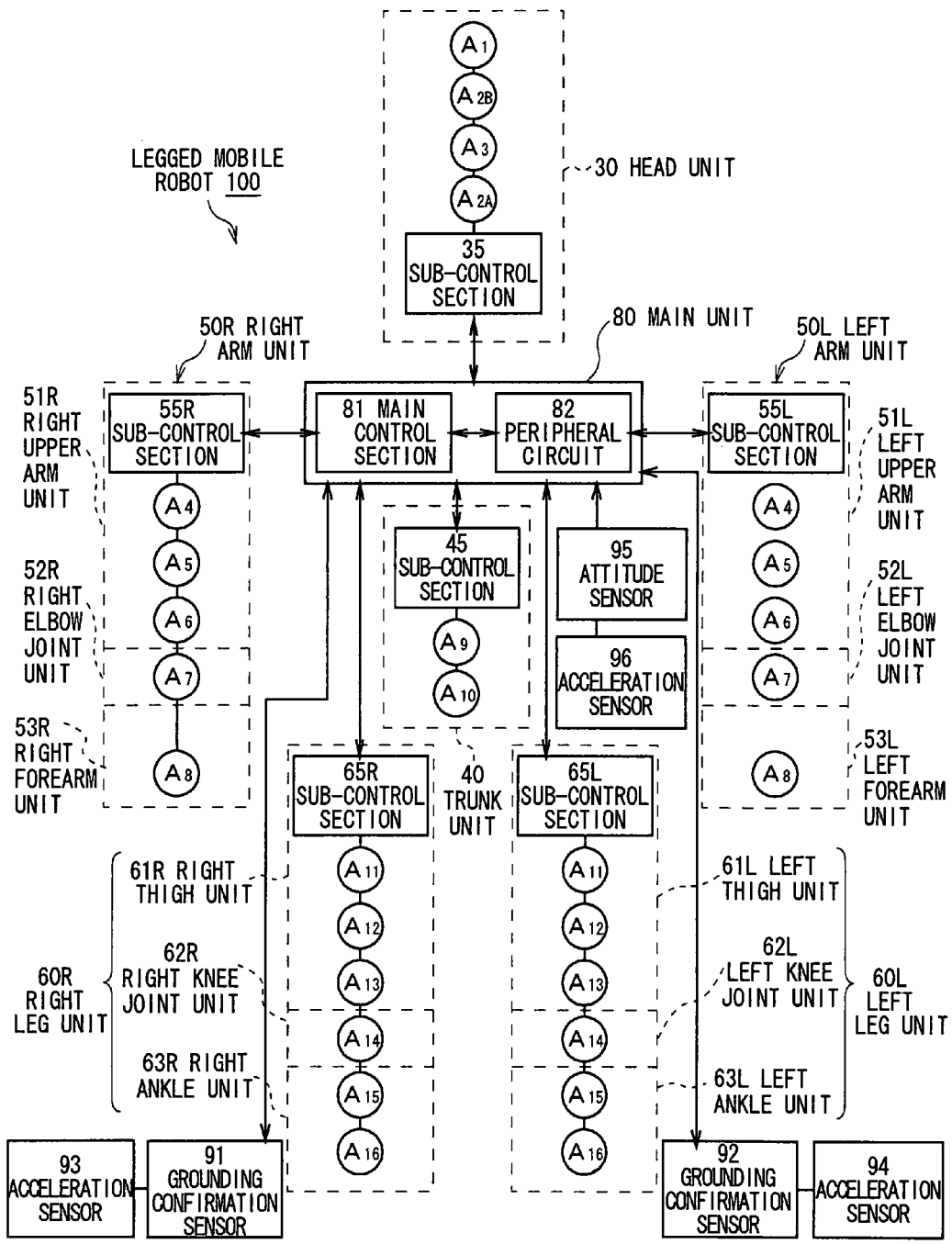
FIG. 4 is a schematic illustration of the control system of the legged mobile robot 100, showing the configuration thereof.

FIG. 4 is a schematic illustration of the control system of the legged mobile robot 100, showing the configuration thereof. As shown in FIG. 4, the legged mobile robot 100 includes functional units 30, 40, 50R/L and 60R/L that mimic the body elements of human being and a control unit 80 that adaptively controls the units in order to realize an concerted motion of the legged mobile robot 100 (R and L are suffixes indicating respectively right and left throughout this document).

The bodily motion of the legged mobile robot 100 is controlled comprehensively by the control unit 80. The control unit 80 has a main control section 81 that is formed by main circuit components (not shown) including a Central Processing Unit (CPU) and memories and a peripheral circuit 82 including interfaces (not shown) for issuing commands to and exchanging data with the components of the robot 100.

The peripheral circuit 82 includes peripheral equipment mounted in the robot 100 as well as peripheral devices that are externally arranged and connected to the robot 100 by way of cables or wirelessly, a charging station (not shown) and interfaces and connectors for connecting the peripheral devices to the robot 100.

The legged mobile robot 100 illustrated in FIG. 3 realizes a desired motion by arranging one to the rotary type actuators at each joint axis and controlling their positions.

The head unit 30 is provided with a neck joint yaw axis actuator $A_1$, a neck joint pitch axis actuator $A_2$ and a neck joint roll axis actuator $A_3$ to realize the respective degrees of freedom of the neck joint yaw axis 1, neck joint pitch axis 2, and neck joint roll axis 3.

The trunk unit 40 is provided with a trunk pitch axis actuator $A_9$ and a trunk roll axis actuator $A_{10}$ to realize the respective degrees of freedom of the trunk pitch axis 9 and the trunk roll axis 10.

The arm units 50R/L are divided respectively into upper arm units 51R/L, elbow joint units 52R/L and forearm units 53R/L and provided respectively with shoulder joint pitch axes actuators $A_4$, shoulder joint roll axes actuators $A_5$, upper arm yaw axis actuators $A_6$, elbow joint pitch axes actuators $A_7$ and wrist joints yaw axes actuators $A_8$ to realize the respective degrees of freedom of the shoulder joint pitch axes 4, the shoulder joint roll axes 5, the upper arm yaw axis 6, the elbow joint pitch axes 7 and the wrist joints yaw axes 8.

The leg units 60R/L are divided respectively into thigh units 61R/L, knee units 62R/L and shank units 63R/L and provided respectively with hip joint yaw axes actuators $A_{11}$, hip joint pitch axes actuators $A_{12}$, hip joint roll axes actuators $A_{13}$, knee joint pitch axes actuators $A_{14}$, ankle joint pitch axes actuators $A_{15}$ and ankle joint roll axes actuators $A_{16}$ to realize the respective degrees of freedom of the hip joint yaw axes 11, hip joint pitch axes 12, hip joint roll axes 13, knee joint pitch axes 14, ankle joint pitch axes 15 and ankle joint roll axes 16.

Additionally, sub-control sections 35, 45, 55 and 65 are arranged to drive/control the actuators of the head unit 30, the trunk unit 40, the arm units 50 and the leg units 60.

The trunk unit 40 is equipped with an attitude sensor 95 and an acceleration sensor 96. The soles 60R and 60L of the left and right leg sections are equipped respectively with one or more than one grounding confirmation sensors 91 and 92 and acceleration sensors 93 and 94. The front ends of the hands and other parts that operate as end effectors are equipped with respective touch confirmation (or pressure) sensors (not shown). Each of the grounding confirmation sensors 91 and 92 is a pressure sensor fitted to the corresponding sole to detect if the sole touches the floor or not by detecting the presence or absence of the reaction force of the floor.

Then, it is possible to generate feedback terms for the oscillators by using the output values of the sensors as environment information. For example, it is possible to judge the current period as a two legs support period or a single leg support period according to the outputs of the grounding confirmations sensors 91 and 92 and estimates the phase ø and the angular frequency ω of each of the movable legs that operate as oscillators.

The main control section 80 controls the attitude stability of the robot 100 in response to the internal condition and the external environment of the robot 100 according to the outputs of the sensors 91 through 93. More specifically, the main control section 80 adaptively controls the sub-control sections 35, 45, 55 and 65 so as to drive the upper limbs, the trunk and the lower limbs of the legged mobile robot 100 in a concerted manner. It extracts periodic motions of at least part of the movable sections of the robot 100 such as legs in a walking motion, generates phase signals for the respective periodic motions according to the internal condition and the external environment and controls the operation of driving the movable sections according to the phase signals. In this way, it can control the attitude stability of the robot 100.

B. Motion Control of Robot Apparatus Using Oscillators

The method of motion control of a robot apparatus according to the ZMP norm can simplify of a problem by means of techniques of control engineering and analytically obtain a solution to the problem and hence has a wide scope of applicability. On the other hand, this method requires preparing exquisite models of both the robot apparatus and the external environment. Then, as a result, a very high precision level is required for the hardware of the robot. Additionally, the motion that is mathematically led out apparently differs from the walking motion of human being.

Meanwhile, the bio-mechanisms of human being and other living creatures for legged locomotion show a pattern different from the trajectories that are currently realized according to the ZMP norm. They suitably utilize physical laws of the four limbs to realize a natural walking motion. Therefore, it is conceivable to realize a walking motion for a robot without requiring exquisite models (and hence at low computation cost) by utilizing such physical laws with lower drive torques of actuators and higher energy conversion efficiencies.

On the basis of the above identified concept, the inventors of the present invention discloses "a method of controlling locomotion more resembling that of human being" by exploiting the findings of exercise physiology, neuroscience and computer learning. More specifically, the inventors of the present invention take at least part of the movable sections of a robot apparatus such as legs for oscillators and control the legged locomotion of the robot apparatus by handling walking motions and other motions as periodic motions and determining or controlling the phase and the frequency of each of the oscillators. Then, continuation of such a periodic motion can be regarded as "stable locomotion".

Figure 5:
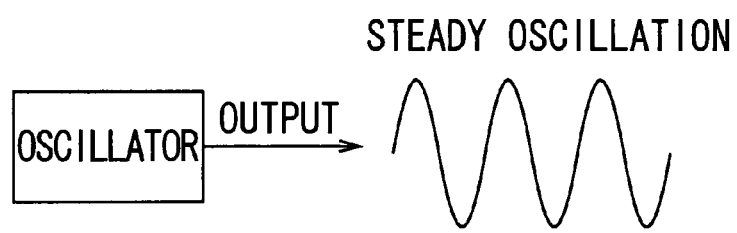
FIGS. 5 and 6 are schematic illustrations of the principle of motion control of the legged mobile robot 100 including oscillators.
Figure 6:
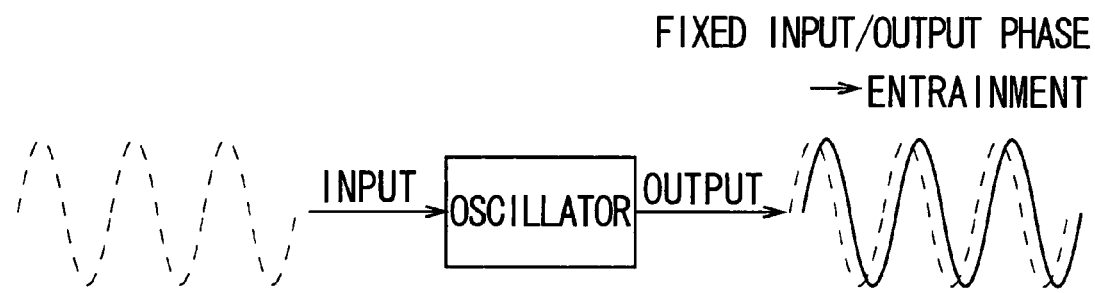

Now, the principle of motion control of a robot apparatus having oscillators will be described below by referring to FIGS. 5 and 6.

The motion of the entire robot or each of the movable sections of the robot including the legs, the arms, the waist and the head is described as that of an oscillator that shows a periodic motion. As shown in FIG. 5, the oscillator shows a steady self-oscillation. As a feedback signal is input due to a change in the external environment or for some other reason, the amplitude and the period of the oscillator and the phase are disturbed temporarily but eventually an output signal of an oscillation that shows a fixed phase difference relative to the input signal can be obtained as shown in FIG. 6.

The phenomenon where the phase relationship is fixed between the input and the output is referred to as entrainment phenomenon. In the motion control of a robot apparatus including oscillators, the entrainment phenomenon is effectively utilized by using signals from the external environment to make it possible to obtain the control quantity U for the robot apparatus or part of the movable sections thereof according to the output phase information ø of the oscillators that are autonomously regulated.

Figure 7:
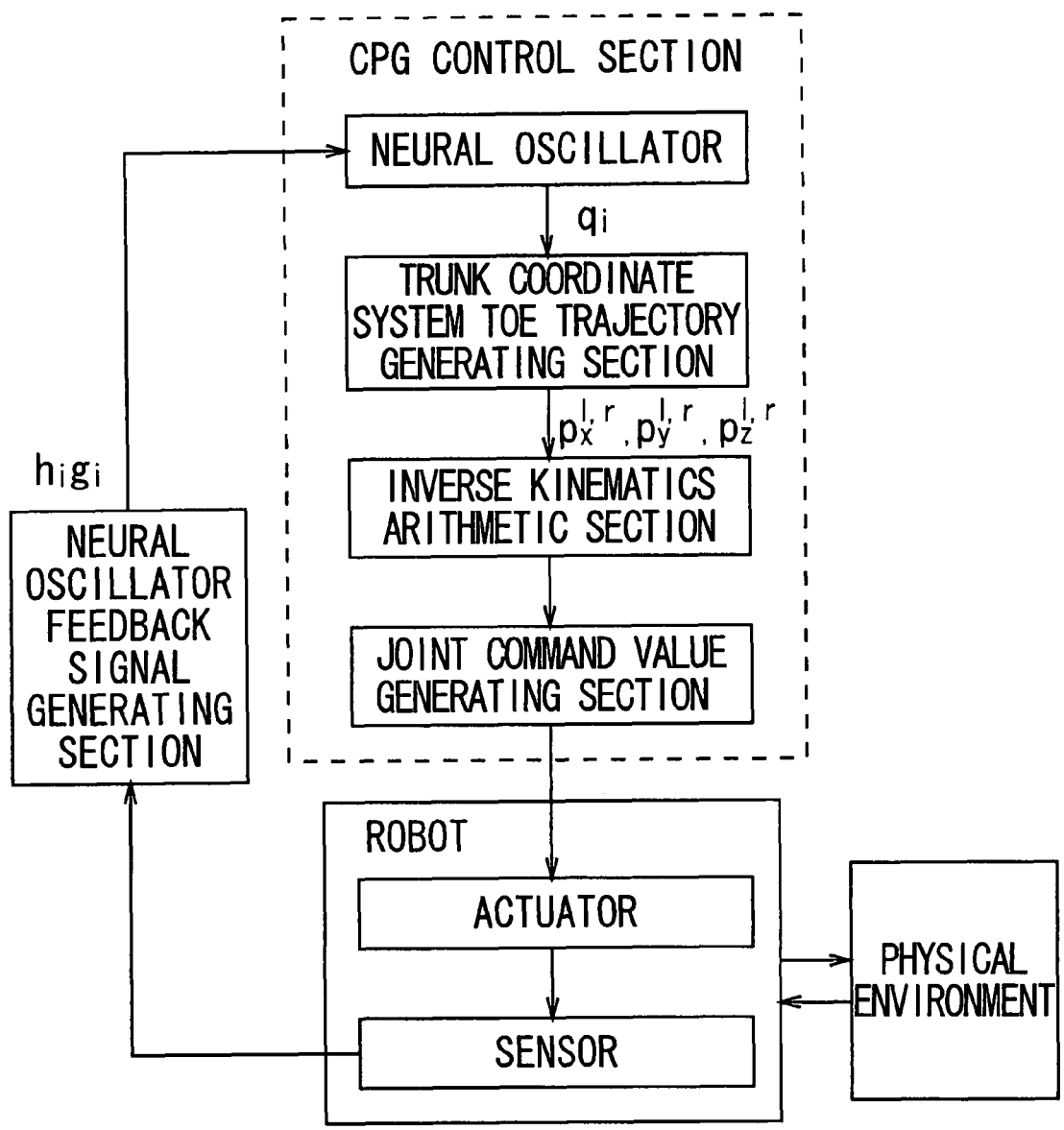
FIG. 7 is a schematic illustration of the basic configuration of the control system of a robot formed by utilizing the entrainment characteristics of an oscillator.

FIG. 7 is a schematic illustration of the basic configuration of the control system of a robot formed by utilizing the entrainment characteristics of an oscillator. The system illustrated in FIG. 7 includes a CPG control section that generates a command value according to a neural oscillator, a robot to be controlled and a neural oscillator feedback signal generating section that gives a feedback term for the neural oscillator.

The CPG control section includes a neural oscillator, a trunk coordinate system toe trajectories generating section, an inverse kinematics arithmetic section and a joint command value generating section.

The neural oscillator is an oscillator that corresponds to the rhythm generator found in the nervous system of a living creature. It shows entrainment characteristics relative to the environment but oscillates by itself with a natural frequency and outputs $q_i$ in a state of receiving no feedback signal.

The trunk coordinate system toe trajectories generating section converts the outputs qi of the neuro oscillator into toe trajectories as viewed from the orthogonal trunk coordinate system by mapping. While to trajectories may be expressed by position, speed or force, positional trajectories will be used in the following description.

The inverse kinematics arithmetic section computationally determines the positions of the joints of the legs by means of the inverse kinematics arithmetic in order to realize the generated toe trajectories. The joint command value generating section generates a command value signal for driving the joints to the obtained joint positions and outputs it to the joint actuators.

Roughly speaking, the actual robot is formed by using joint actuators to be controlled by the CPG control section and sensors for observing interactions of the robot and the physical environment when the robot is moving by driving the actuators.

The neural oscillator feedback signal generating section generates feedback signal $h_i g_i$ to the neural oscillator according to the observed values input from the sensors of the actual robot, of which $h_i$ represents the gain relative to the feedback signal $g_i$ to the oscillator $ø_i$ and $h_i g_i$ represents the input signal to the neural oscillator in the CPG control section. Due to the entrainment characteristics of the neural oscillator, the oscillation frequency of $q_i$ is synchronized with the oscillation frequency of $g_i$ and their phase relationship is fixed to a constant value. In other words, while the motion of the robot apparatus is controlled by determining or controlling the phase and the frequency of the neural oscillator according to the feedback signal, the neural oscillator shows entrainment characteristics for the feedback signal and the natural frequency thereof is autonomously regulated according to the environment.

In this way, the neural oscillator is made to autonomously adapt itself to the environment as it keeps on oscillating according to the dynamics of the robot.

There arises a problem of how to convert the observed values input from the sensors of the actual robot into an adaptive feedback signal to the neural oscillator by mapping. A solution to this problem may be optimization by learning.

C. Configuration of Oscillator

From the engineering viewpoint, examples of oscillators having entrainment characteristics include Phase Lock Loop (PLL) circuits that can be used as detection circuits. Other examples include non-linear oscillators and phase oscillators. Matsuoka's oscillators that are neural oscillators described by a non-linear differential equation can also be used as oscillators.

Matsuoka's oscillators are described in K. Matsuoka, "Sustained oscillations generated by mutually inhibiting neurons with adaptation", Biological Cybernetics, 52, pp. 345-353 (1985) However, the above document described only the conditions to be met for continuing an oscillation and the waveform of the oscillation and there is no description in the document about applying oscillators to periodic motions of movable sections of a legged mobile robot such as locomotion.

Figure 8:
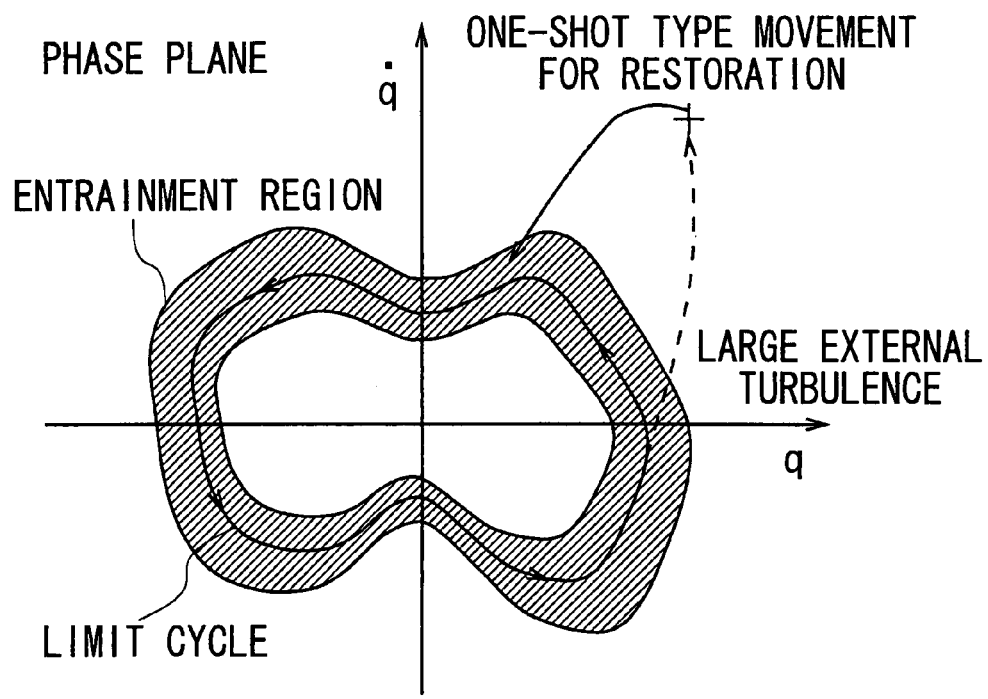
FIG. 8 schematically illustrates how an oscillator that does self-oscillation forms a limit cycle and draws a closed curve on the phase plane.

A neural oscillator does self-oscillation and regulates the frequency so as to maintain a fixed phase relationship relative to the input signal. FIG. 8 schematically illustrates the behavior of the oscillator output q on the phase plane where the oscillator output q and the temporal differential thereof are used as orthogonal axes. Since the oscillator does self-oscillation, the oscillator forms a limit cycle and draws a closed curve on the phase plane. Then, it is possible to entrain the state of the neural oscillator to the limit cycle by feeding back the periodic signal from the environment. In FIG. 8, the region that can be entrained is hatched.

Since a neural oscillator can apply any input, it is not possible to obtain an analysis solution for it. However, since the computational complexity of an oscillator itself is very small, it is possible to look into the input/output relationship of an oscillator in advance by comprehensively performing an operation of parameter-retrieval within the range where the behavior of the oscillator is defined by means of a parameter.

Figure 9:
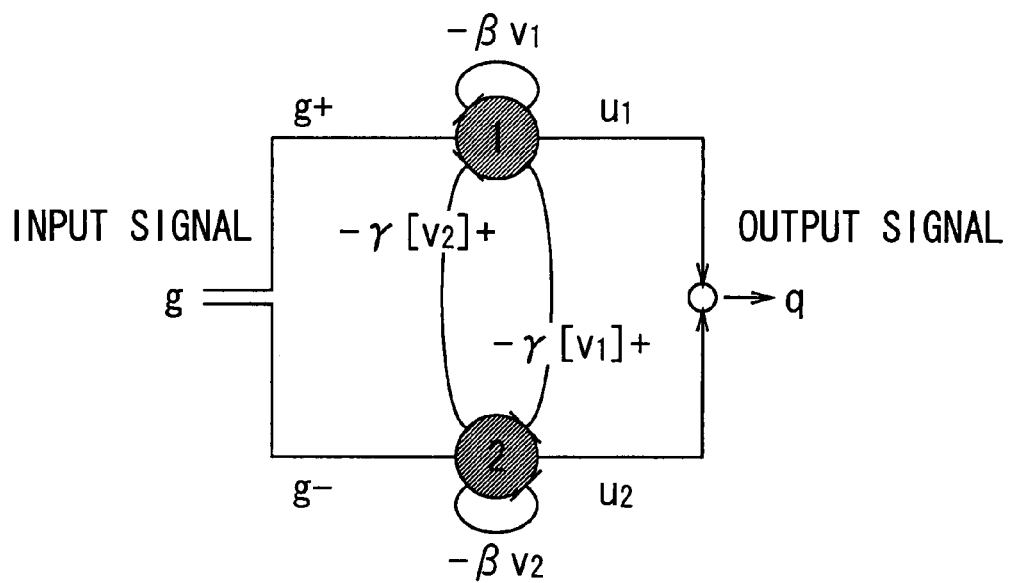
FIG. 9 is a schematic illustration of the configuration of a neural oscillator.

A neural oscillator is defined by formulas (1) through (6) shown below. FIG. 9 is a schematic illustration of a neural oscillator expressed by the formulas shown below. Note that the formulas (1) and (2) and the formulas (3) and (4) show respective units of neural elements. The two neural elements are coupled by mutually inhibiting coupling with the formulas shown below. For the purpose of convenience, the element expressed by the formulas (1) and (2) is suffixed by 1 and handled as positive side element while the element expressed by the formulas (3) and (4) is suffixed by 2 and handled as negative side element.

[Formulas 1]

$$\tau_1 \dot{u}_1 = c - u_1 \beta v_1 - \gamma[u_2]^+ + g^+ \quad (1)$$

$$\tau_2 \dot{v}_1 = [u_1]^+ - v_1 \quad (2)$$

$$\tau_1 \dot{u}_2 = c - u_2 - \beta v_2 - \gamma[u_1]^+ + g^- \quad (3)$$

$$\tau_2 \dot{v}_2 = [u_2]^+ - v_2 \quad (4)$$

$$q = [u_1]^+ - [u_2]^+ \quad (5)$$

where the following symbols are defined so as to read as:

$$[X]^+ = \max(x, 0) [X]^- = \min(x, 0) \quad (6)$$

In the above formulas, u and v represent the internal variables of the oscillator and q represents the difference of the output internal variable of the positive side element and that of the negative side element and is handled as the final oscillator output. Note that the expressions of (6) are used because values not smaller than zero are used as internal variables for the computation of (5). In the above formulas, $\tau_1$ and $\tau_2$ are time constants and c is a stationary input term, whereas $\beta$ is a fatigue coefficient and $v$ is the weight of mutually inhibiting coupling between the neural elements. $g^+$ and $g^-$ are feedback terms applied respectively to the positive side neural element and the negative side neural element.

D. Input of Feedback Signal to Neural Oscillator

FIG. 8 schematically illustrates the entrainment region that the neural oscillator has as a function of the limit cycle that the neural oscillator forms on the phase plane. However, most known applications select a periodic motion as subject and uses a cyclic signal having an amplitude that is equal to about a half of that of the neural oscillator at most as feedback signal so that the entrainment region is nor very large.

Therefore, such known applications do not show any satisfactory applicability to a non-periodic motion of a neural oscillator such as a motion of getting to a target point. Additionally, the neural oscillator is not able to return to the limit cycle trajectory when it goes out of the entrainment region due to application of abrupt non-periodic large turbulence. Then, the neural oscillator can no longer continue a periodic motion. This means that, if a robot gets into an unleveled ground or collides with an obstacle while walking, it can no longer continue walking and falls down.

The inventors of the present invention believe that not a feedback signal obtained from an ordinary periodic signal but a temporary feedback signal having a large value is effective for making a robot to get back to the entrainment region if it goes out of the entrainment region. A temporary feedback signal as used herein refers to a short term and non-periodic feedback signal that is applied only when the robot goes out of the entrainment region. It is typically formed by a pulse-like non-periodic signal having an amplitude that is about ten times as large as that of the neural oscillator.

As a specific example, assume that a robot is walking on two legs and a large external force is applied to the robot while the robot is steadily walking. The robot can prevent itself from falling down if the robot takes a large stride. Once the external force is removed, the robot is only required to use a periodic feedback signal same as the one being used when it is steadily walking. Thus, such a large non-periodic or one-shot feedback signal having a large amplitude can effectively be issued only when the robot is in a unsteady state.

Figure 10:
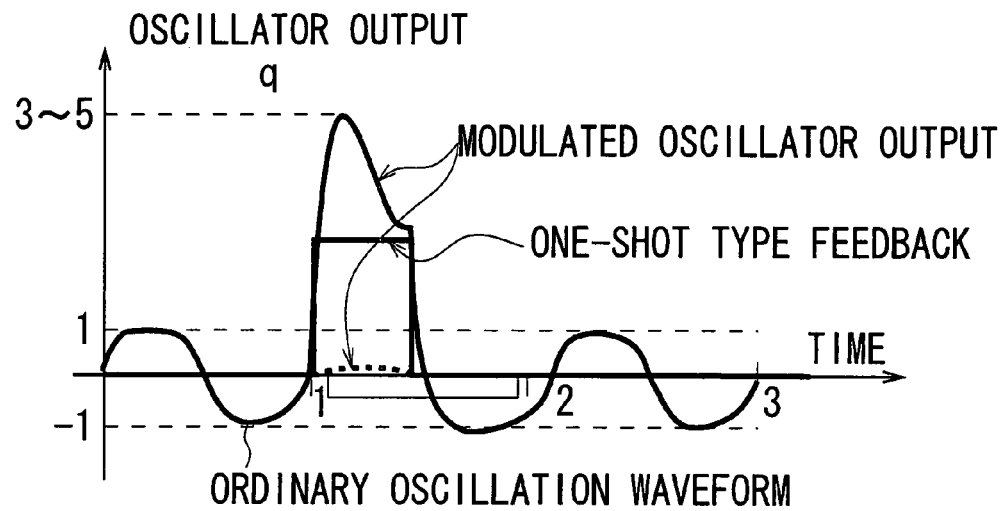
FIG. 10 is a timing chart conceptually illustrating the relationship between the output q of the neural oscillator and the one-shot feedback signal.

FIG. 10 is a conceptual illustration of the relationship between the output q of the neural oscillator and the one-shot feedback signal. If the control system is so configured that the output q of the neural oscillator is mapped for positional commands for the legs in the moving direction of the robot, the stride of the legs of the robot will be temporarily increased to move one of the legs much more forwardly than usual. In other words, the feedback signal for such a large stride is made to show an amplitude much larger than that of the ordinary periodic feedback signal. If the external force is directed backward, a small stride may have to be taken.

Matthew M. Williamson, "Robot Arm Control Exploiting Natural Dynamics", Massachusetts Institute of Technology, Ph-D Theses (1999) mathematically describes the output of a neural oscillator when it is steadily oscillating in a manner as shown below.
(1) The ratio of time constants $\tau_1/\tau_2$ defines the external profile of the oscillator output q and the natural frequency of self-oscillation of a neural oscillator can be made to change by changing only $\tau_1$ while keeping $\tau_1/\tau_2$ to a constant value.
(2) A good linear relationship exists between the steady input term c and the amplitude of the oscillator q.

The above-cited document also describes the output when a sinusoidal wave is input as feedback signal g. However, it does not refer to any non-periodic feedback signal.

Figure 11:
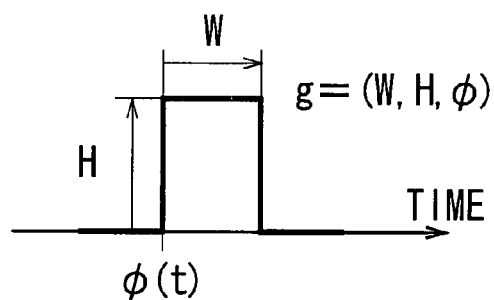
FIG. 11 illustrates a one-shot feedback signal that can be input to a neural oscillator.

Therefore, the inventors of the present invention adjusted and fixed the parameters of a neural oscillator as shown in FIG. 9 in a manner as described below in order to make the neural oscillator naturally oscillate with an amplitude of 1 and a period of 1 second and applied an input signal of a rectangular pulse as shown in FIG. 11 as "one-shot feedback signal" in order to mathematically verify the behavior of the oscillator output. The rectangular wave g of FIG. 11 has a height of H ($-2.0 \leq H \leq 10.0$) and a pulse width W ($T/8 \leq W \leq \infty$, T being the natural period of the oscillator) and the phase in which the one-shot feedback signal is input is $\phi$ ($\phi = 0$ when $q = 0$ and $dq/dt > 0$). A relatively small value has been used for the feedback signal to a neural oscillator relative to a steady amplitude (e.g., about 0.2). On the other hand, the oscillator output q can be made to vary to a large extent for a non-periodic feedback signal using an amplitude H having a large absolute value ($-2.0 \leq H \leq 10.0$).

[Formula 2]

$$\beta=2.5, \gamma=2.0, c=2.45, \tau_1=0.11676, \tau_1/\tau_2=0.8$$

The neural elements 1 and 2 that are coupled by mutually inhibiting coupling correspond respectively to the positive side output and the negative side output of the output q of the neural oscillator (see formula (5)) below and a rectangular wave as shown in FIG. 11 is input as feedback signal g for the two elements.

The feedback signal for each neural element may be applied for excitation (positive), zero or inhibition (negative) according to the sign of the signal. Excitation coupling increases the output of the neural element and inhibition coupling decreases the output of the neural element. Table 1 below summarizes the possible combinations of feedback signals to the neural elements.

TABLE 1

| | | negative side element 2 | | |
|---|---|---|---|---|
| | | excitation | 0 | inhibition |
| positive side element 1 | excitation | I | II | III |
| | 0 | (II) | NONE | (IV) |
| | inhibition | (V) | IV | V |

In view of the symmetry of two neural elements, there are five possible combinations (cases) as shown in Table 1 above. The results of each of the combinations will be discussed below.

D-1. Feedback of Excitation—Excitation or Inhibition—Inhibition (Case I and Case V)

Excitation feedback signals or inhibition feedback signals having a same value are respectively applied to the two neural elements. This instance is equivalent to increasing or decreasing the steady input c in the above formulas (1) and (3). It is known that the steady input c and amplitude of the oscillator output q show a good linear relationship and hence the amplitude will change.

Figure 12:
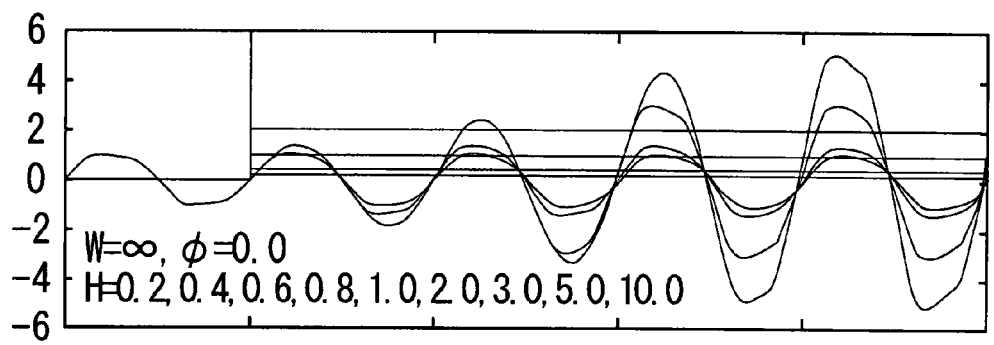
FIG. 12 is a schematic illustration of the outcome obtained when a stepped excitation—excitation feedback signal is input.
Figure 13:
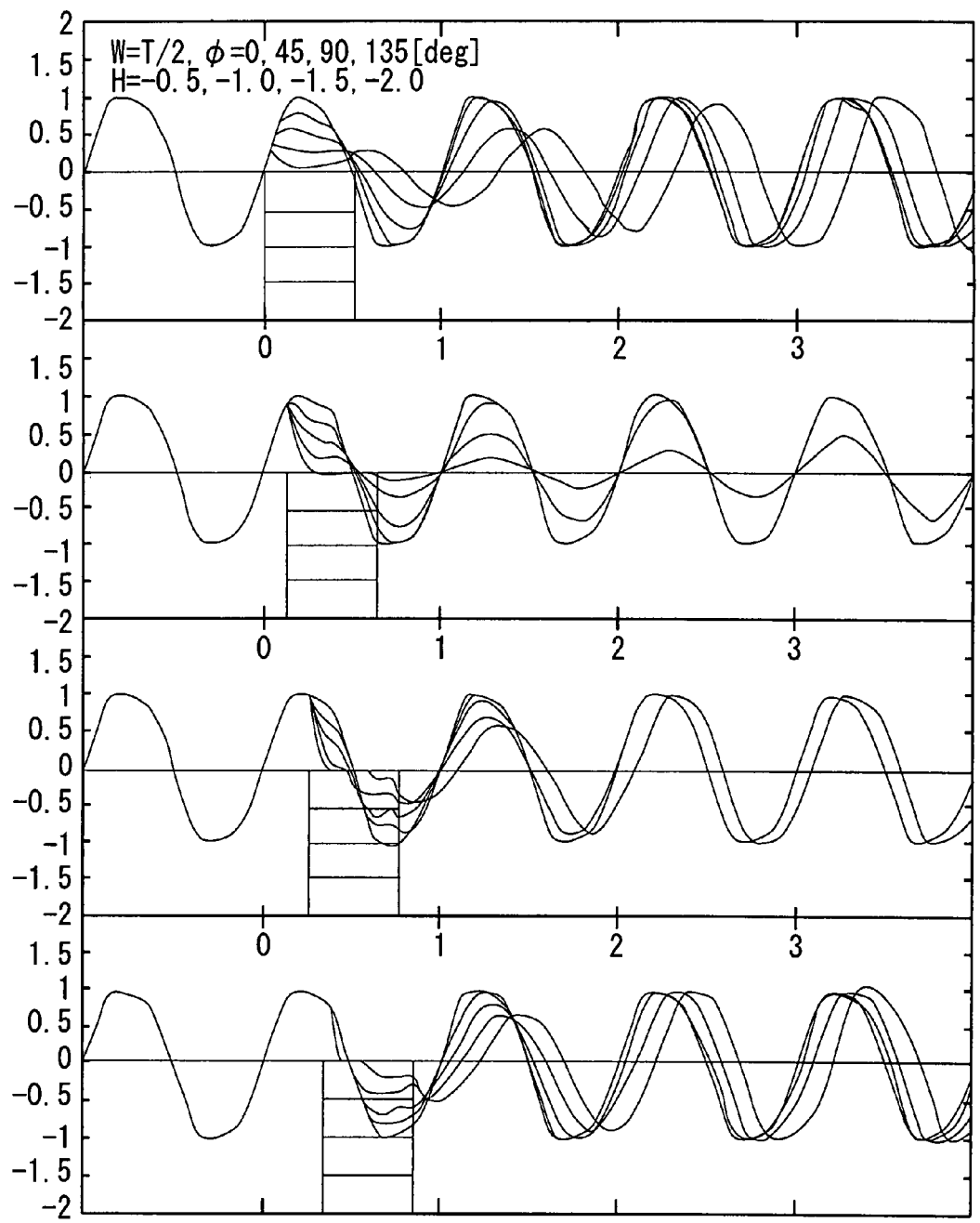
FIG. 13 is a schematic illustration of the outcome obtained when an inhibition—inhibition feedback signal of a half period is input.

FIGS. 12 and 13 illustrate the respective outcomes obtained when a stepped excitation—excitation feedback signal is input in Case I and when an inhibition—inhibition feedback signal of a half period is input in Case V. From FIG. 12, it is seen that the amplitude gradually increases and the responsiveness is low. From FIG. 13, it is seen that there are occasions where two or more than two periods are required to restore the original amplitude once the amplitude is reduced and the responsiveness is also low, while the output is not smooth.

In either case, the oscillation of the oscillator output is continued and the amplitude is proportional to the value of the height H of the rectangular wave. Thus, it may be safe to assume that such a feedback signal is suitable for gradually increasing or decreasing the amplitude.

D-2. Feedback of Excitation—Inhibition (Case III)

Figure 14A:
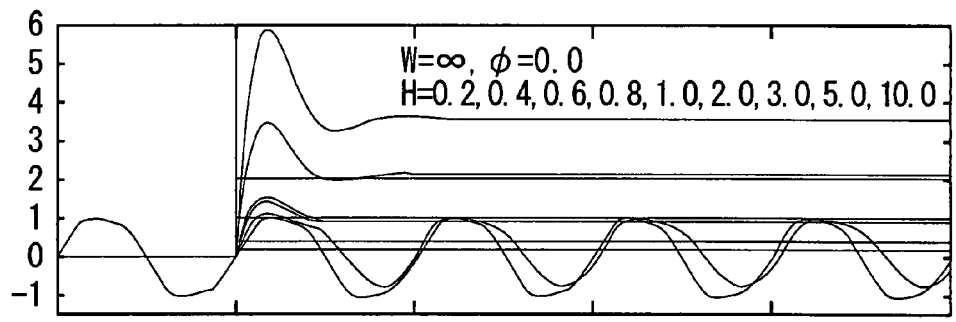
FIG. 14A is a schematic illustration of the outcome obtained when an excitation—inhibition type feedback signal is input to the neural oscillator stepwise.
Figure 14B:
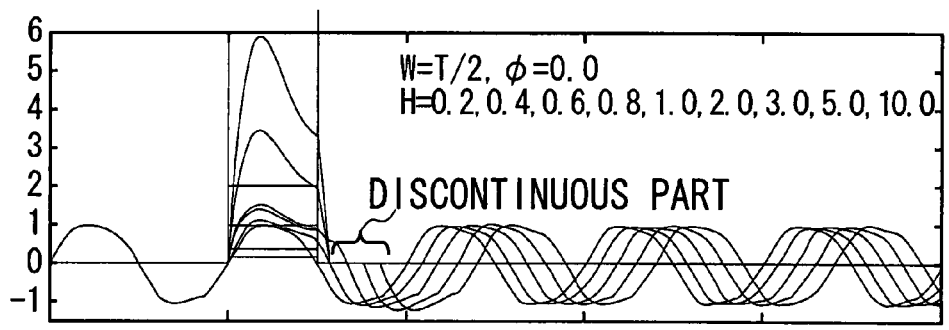
FIG. 14B is a schematic illustration of the outcome obtained when a rectangular wave of a half period is input to increase the amplitude.
Figure 14C:
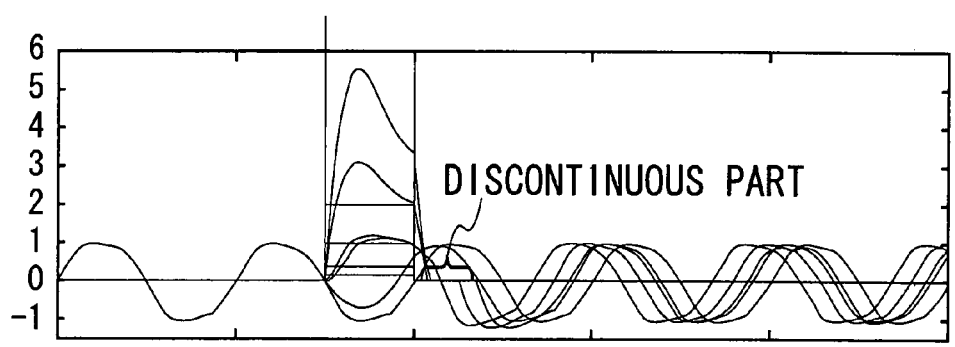
FIG. 14C is a schematic illustration of the outcome obtained when a rectangular wave of a half period is input to decrease the amplitude.

When an excitation type feedback signal is input to the positive side neural element while an inhibition type feedback signal is input to the negative side neural element, it will be expected that the amplitude of the positive side rises while that of the negative side falls. FIGS. 14A through 14C are illustrations of the outcomes obtained when an excitation—inhibition type feedback signal is input to the neural oscillator stepwise, when a rectangular wave of a half period is input to increase the amplitude and when a rectangular wave of a half period is input to decrease the amplitude respectively.

FIG. 14A illustrates that the oscillator smoothly stops when a feedback that is not smaller than 0.8 is applied. Matthew M. Williamson, "Robot Arm Control Exploiting Natural Dynamics", Massachusetts Institute of Technology, Ph-D Theses (1999) describes that a time constant ratio of $\tau_1/\tau_2$ not greater than 0.5 is desirable for a stable oscillation. On the other hand, in this embodiment, it is possible to generate a discontinuous motion by selecting a time constant ratio of $\tau_1/\tau_2=0.8$ to stop the oscillation. This arrangement is useful when controlling the joint angles of a robot in a non-periodic motion of getting to a target point.

Referring to FIG. 14B, the amplitude of the positive side is changed to a large extent only in the period where a feedback signal is applied as one-shot. FIG. 14C is equivalent to the outcome obtained when a feedback signal is input to the negative side as one-shot if the Y-axis is viewed reversely. Thus, it will be seen that the amplitude can be reduced only partly by inputting an excitation—inhibition type feedback signal as one-shot. However, when a large feedback signal (e.g., H=10.0) is input, the speed becomes discontinuous and the oscillation stops immediately after removing the input. Such a discontinuity of the speed is not desirable as a command value for the joints of a robot.

The discontinuous oscillator outputs as shown in FIGS. 14B and 14C will be examined further below.

Figure 15:
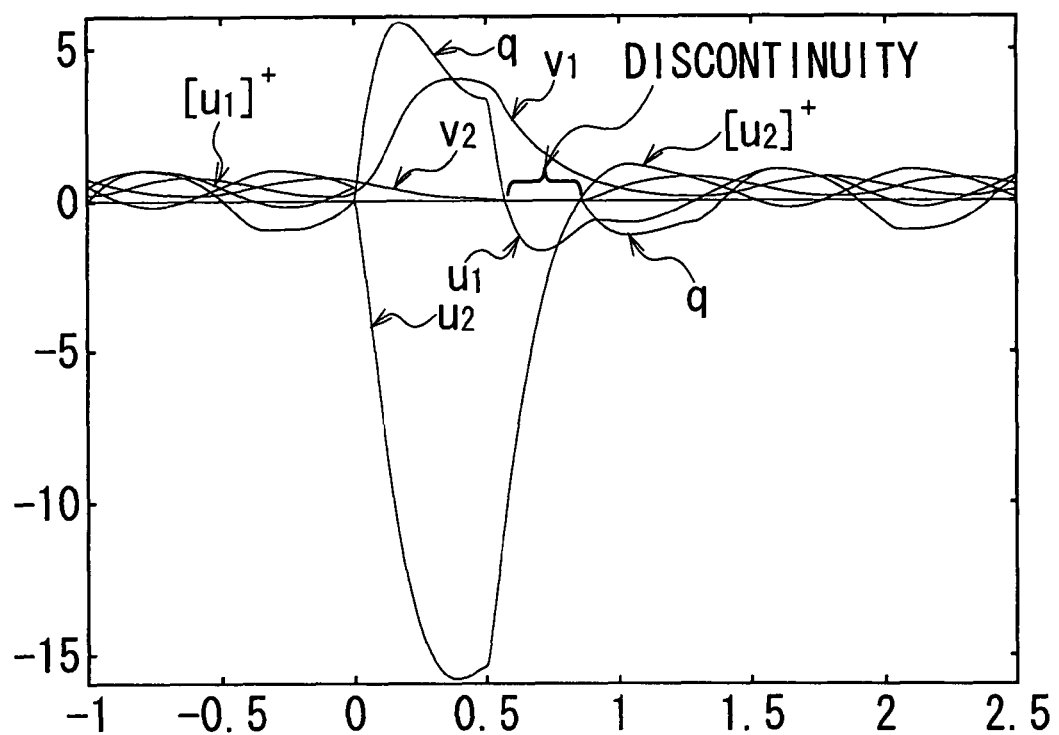
FIG. 15 is a graph obtained by plotting the behaviors of the internal variables of the neural oscillator in detail.

FIG. 15 is a graph obtained by plotting the behaviors of the internal variables of the neural oscillator in detail. It will be seen from FIG. 15 that the value of the internal variable $u_2$ of the negative side neural element is drawn to a large extent in the negative direction when a feedback signal is applied. This is attributable to the inhibition coupling of the one-shot feedback signal and the internal variable $u_1$ of the positive side element.

The weight of the mutually inhibiting coupling v is defined to be equal to 2. Thus, an inhibition feedback signal roughly estimated about three times as large as the feedback signal of the positive side is applied to the negative side when the value of the one-shot feedback signal is added. Therefore, it takes time for the internal variable $u_2$ of the negative side neural element to rise if the one-shot feedback signal is eliminated. Then, as a result, it is found that both $u_1$ and $u_2$ becomes negative and the output of the oscillator is equal to 0.

When the internal variables $u_1$ and $u_2$ of the two neural elements are both negative, the output of the oscillator is free of any influence and hence an excessive inhibiting signal makes no sense. These can be improved by either of the excitation—zero type feedback signal of the Case II and the inhibition—zero type feedback signal of the Case IV, which will be described below.

D-3. Excitation—Zero or Inhibition—Zero Feedback Signal (Cases II and IV)

On the basis of the outcome of the above described Case III, addition of a one-shot feedback signal to the feedback of the neural element to be adjusted will be discussed below. If only the amplitude of the positive side is to be increased, a feedback signal may be input only to the positive side element and the input to the negative side element may be made equal to zero. Then, a weight v of mutually inhibiting coupling is adjusted by means of formula (7) shown below in order to avoid a situation where the signal to the negative side becomes an excessively inhibiting signal due to the mutually inhibiting coupling.

[Formula 3]

$$\gamma=\min(\gamma_0,\gamma_0/[u_{1,2}]^+) \qquad (7)$$

Figure 16A:
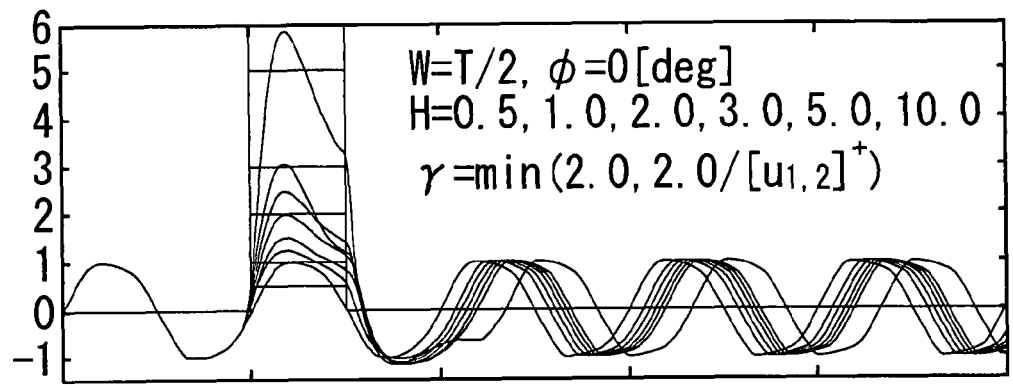
FIG. 16A is a schematic illustration of the outcome of the input of a pulse wave having a positive amplitude to the positive side neural element as one-shot feedback signal.
Figure 16B:
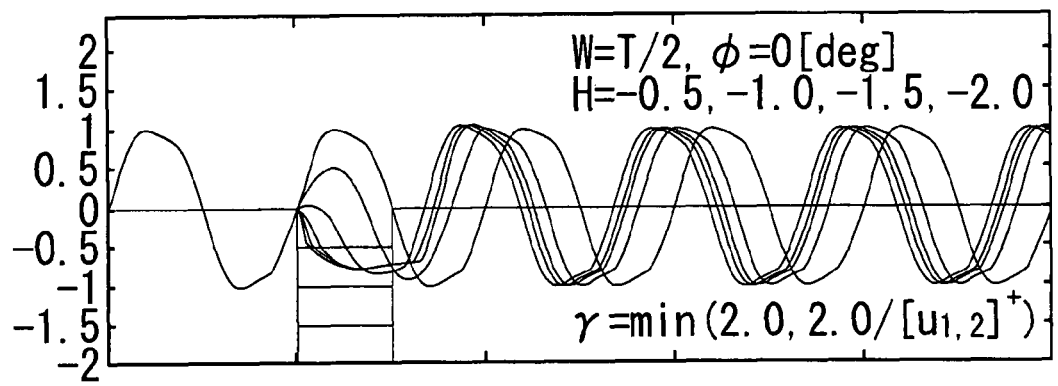
FIG. 16B is a schematic illustration of the outcome of the input of a pulse wave having a negative amplitude to the positive side neural element as one-shot feedback signal.

FIG. 16A shows the outcome obtained when a pulse wave having an amplitude of the positive direction is input as one-shot feedback signal to the positive side neural element. FIG. 16B shows the outcome obtained when a pulse wave having an amplitude of the negative direction is input to the positive side neural element as one-shot feedback signal.

The discontinuity of speed observed in FIGS. 14B and 14C are not noticeable in FIGS. 16A and 16B and hence the output is smooth in the latter figures. Although not shown, the behavior obtained when W=∞ is substantially same as that of FIG. 14. In either case, it will be seen that the largest value of the amplitude and the magnitude of the one-shot feedback signal show a relatively good linear relationship.

D-4. Combined use with Periodic Feedback Signal

As described above, it is confirmed that it is possible to change only a specific amplitude, although a phase shift occurs from the original oscillation. In such a situation, however, the phase shift can be absorbed by inputting a periodic signal as steady base line and utilizing the entrainment characteristics.

Figure 17:
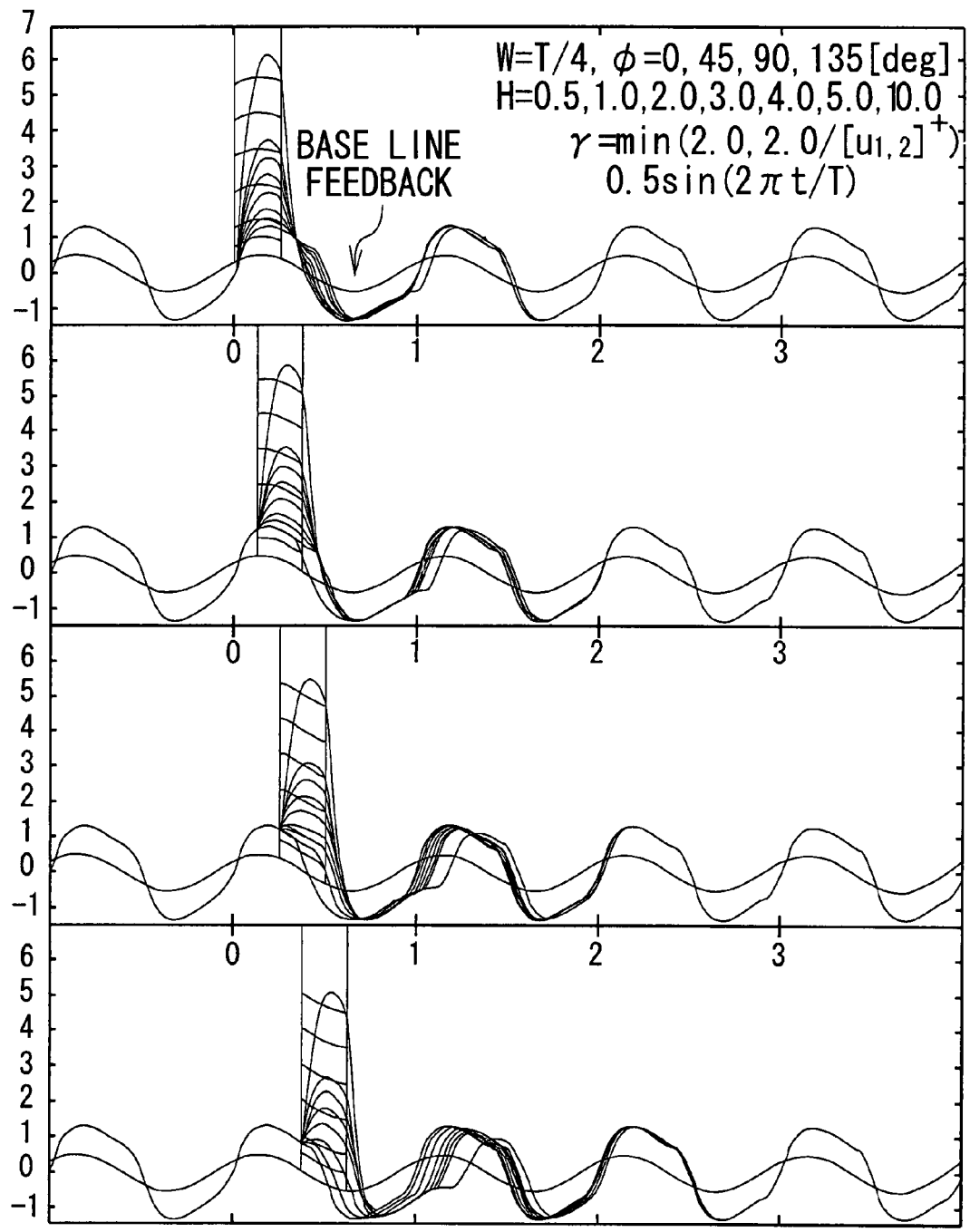
FIG. 17 is a schematic illustration of the outcome of the input of a one-shot feedback signal, while constantly inputting a sinusoidal wave signal as base line.

FIG. 17 is a schematic illustration of the outcome obtained when a one-shot feedback signal is applied while constantly inputting a sinusoidal wave signal as base line. In the instance of FIG. 17, the one-shot feedback signal is applied while changing the phase of the input signal. It will be seen that the oscillation is converged to the original one within two periods after inputting a one-shot feedback signal to the neural oscillator. Thus, it is possible to combine the entrainment phenomenon that is observed when a periodic signal is used as feedback signal in a conventional manner and a one-shot feedback signal when the neural oscillator goes out of the entrainment region.

The following statement for inputting a non-periodic feedback signal to a neural oscillator summarizes the above-described results.

(1) It is possible to mildly increase (decrease) the output amplitude (Cases I and V).
(2) It is possible to stop the oscillation at a specified value (Cases II, III and IV).
(3) It is possible to smoothly increase or decrease a specific amplitude (Cases II and IV).
(4) It is possible to combine a non-periodic feedback signal with a periodic feedback signal for use to absorb the phase shift.

E. Example of Application to Ball Throwing Motion

As an example of application of the technique of controlling a motion of the upper limbs of a robot apparatus as shown in FIGS. 1 through 4 by using the entrainment characteristics of the neural oscillator and a one-shot feedback signal in combination, a motion of throwing a ball will be examined below.

Figure 18:
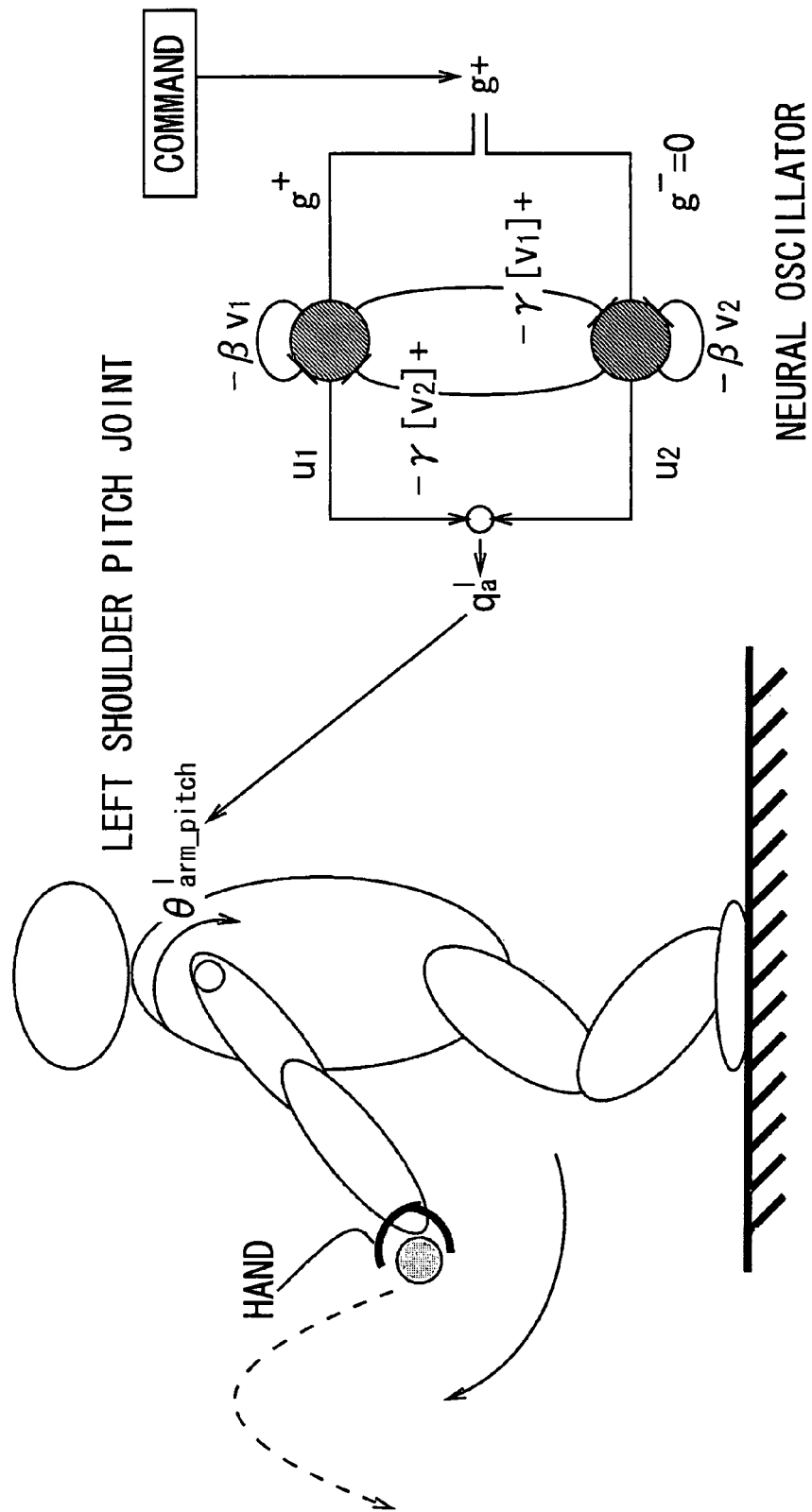
FIG. 18 is a schematic illustration of a neural oscillator arranged on a robot to be used when the robot is made to release and throw a ball it holds (from under) when the shoulder joint angle of one of the shoulders of the robot exceeds a threshold value.

Assume here that the robot apparatus uses only one of the shoulder joints and releases and throw the ball it holds (from under) when the shoulder joint angle exceeds a threshold value. For such a ball throwing motion, a neural oscillator is arranged at the left shoulder pitch joint of the robot as shown in FIG. 18 and a one-shot feedback signal is used for the neural oscillator.

Figure 19:
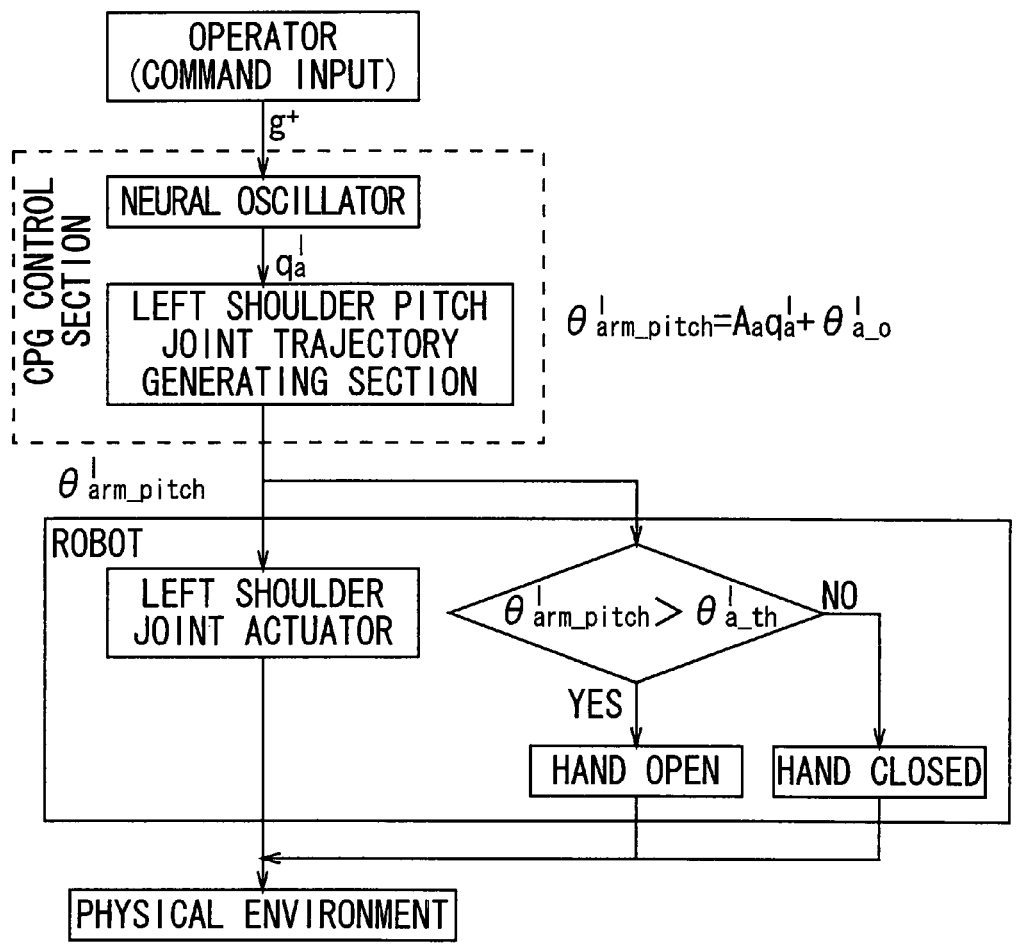
FIG. 19 is a schematic illustration of the frame of the ball throwing motion of the robot of FIG. 18.

FIG. 19 is schematic illustration of the frame of the ball throwing motion of the robot.

It is assumed here that the operator can arbitrarily change the value of the feedback signal $g^+$ for the neural oscillator $q_a^l$ arranged at the left shoulder pitch joint at a given time. An excitation—zero type (or inhibition—zero type) feedback signal is applied and the relationship of $g^-$ is constantly maintained, while $g^+$ is input to the neural oscillator, in order to obtain a smooth oscillator output. The oscillator shows self-oscillation when $g^+=0$ but the oscillation can be suspended depending on the value $g^+$ of the one-shot feedback signal.

The neural oscillator is defined by the above cited formulas (1) through (6), although it should be noted that q in the formula (5) is replaced by $q_a^l$. The mutually inhibiting coupling v of the neural oscillator is adjusted by means of the above cited formula (7).

The output $q_a^l$ of the neural oscillator is converted into the left shoulder pitch joint command value $\theta_{arm\_pitch}^l$ by means of formula (8) shown below. In the formula (8), $A_a$ is a gain constant and $\theta_{a\_0}^l$ is the offset of the central value.

[Formula 4]

$$\theta_{arm\_pitch}^l = A_a q_a^l + \theta_{a\_0}^l \qquad (8)$$

The hand section that holds the ball is closed and opened according to formula (9) shown below. More specifically, when the left shoulder that is swung down by the neural oscillator output $q_a^l$ gets to the predetermined threshold angle $\theta_{a\_th}^l$, the hand section release the ball and a motion of throwing the ball takes place.

[Formula 5]

$$\theta_{arm\_pitch}^l > \theta_{a\_th}^l \qquad (9)$$

Figure 20A:
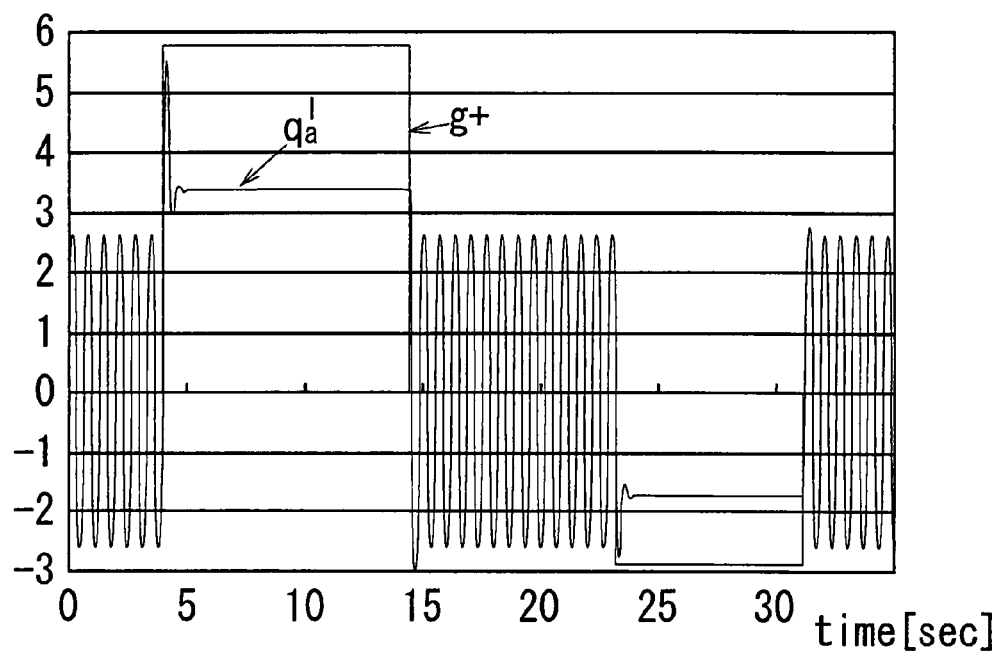
FIG. 20A shows the time series data of the output $q^l_a$ of the oscillator arranged at the left shoulder pitch joint and the one-shot feedback signal $g^+$ (note $\tau_1=0.8$)
Figure 20B:
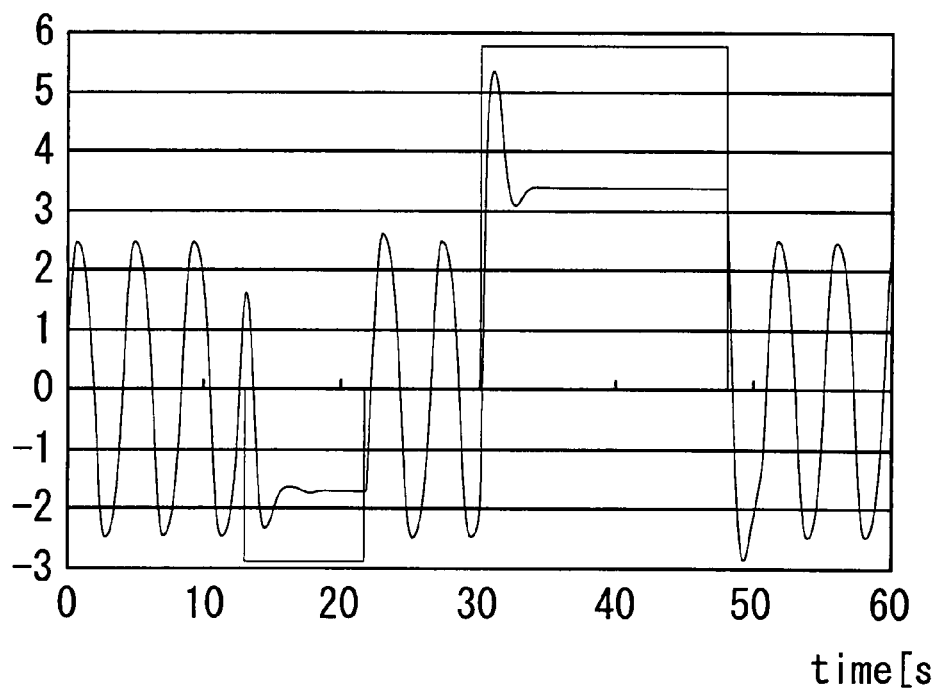
FIG. 20B shows the time series data of the output $q^l_a$ of the oscillator arranged at the left shoulder pitch joint and the one-shot feedback signal $g^+$ (note $\tau_1=5.0$)

FIGS. 20A and 20B show the time series data of the output $q_a^l$ of the oscillator arranged at the left shoulder pitch joint and the one-shot feedback signal $g^+$ obtained as a result of an experiment. Note that the parameters were defined as $\tau_1/\tau_2=0.8$, c=6.0, v=2.0 and β=2.5. FIG. 20A shows the graph obtained when the time constant $\tau_1$ was $\tau_1=0.8$, whereas FIG. 20B shows the graph obtained when the time constant $\tau_1$ was $\tau_1=5.0$. Then, a stepped one-shot feedback signal $g^+=-2.88$ or 5.77 was applied at a clock time and its behavior was observed.

In either case, it will be seen that the oscillator is inhibited and converged to a constant value. By comparing FIG. 20A and FIG. 20B, it will be seen that the response speed to the one-shot feedback signal can be altered by changing the time constant $\tau_1$. It was confirmed that the magnitude of the applied one-shot feedback signal and the value of convergence shows a good linear relationship.

Figure 21:
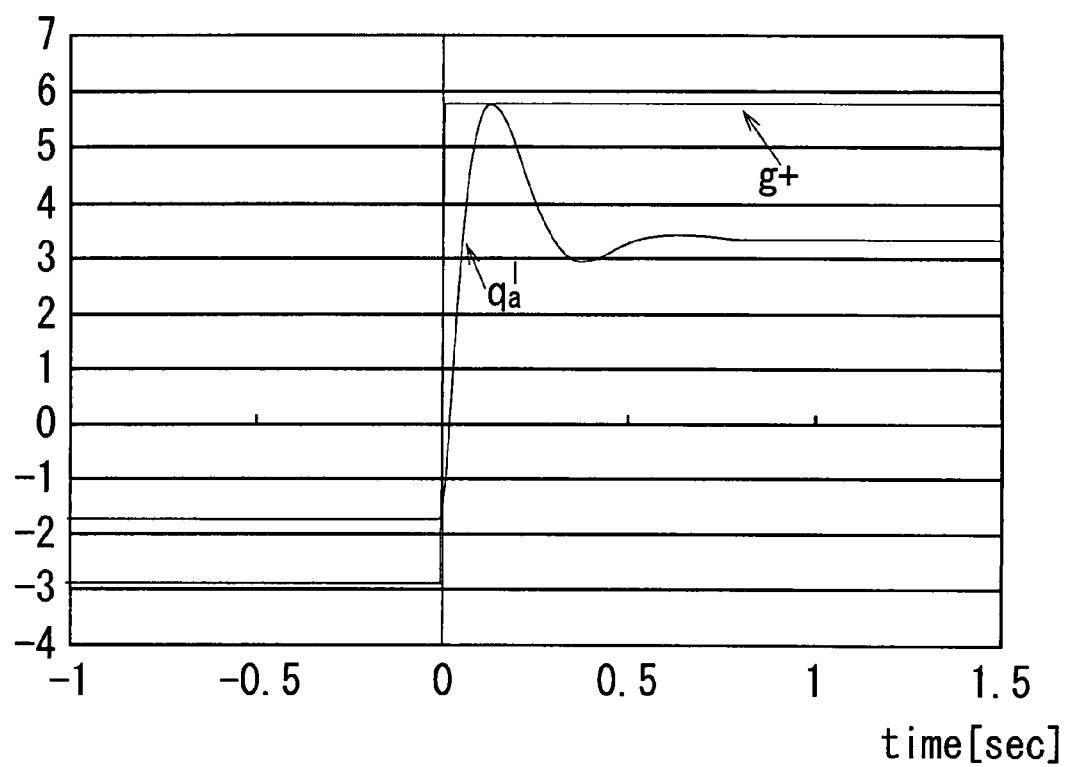
FIG. 21 is a schematic illustration of the behavior observed when the one-shot feedback signal $g^+$ applied to the output $q^l_a$ of the oscillator arranged at the left shoulder pitch joint was set to $g^+=-2.88$ and changed to $+5.77$ at clock time 0.

FIG. 21 is a schematic illustration of the behavior observed when the one-shot feedback signal $g^+$ was set to $g^+=-2.88$ and changed to +5.77 at clock time 0. As seen from FIG. 21, the output $q_a^l$ of the oscillator was converged from −1.71 to +3.35 by way of a transitional state. Thus, the left shoulder can make a motion of getting to a target from an initial state to a final state.

While the feedback signal $g^+$ to the oscillator changes stepwise sharply, the output of the oscillator changes relatively smoothly due to the characteristics of the low pass filter. The characteristics are suitable in terms of not applying a large load to the shoulder joint of the robot.

Figure 22:
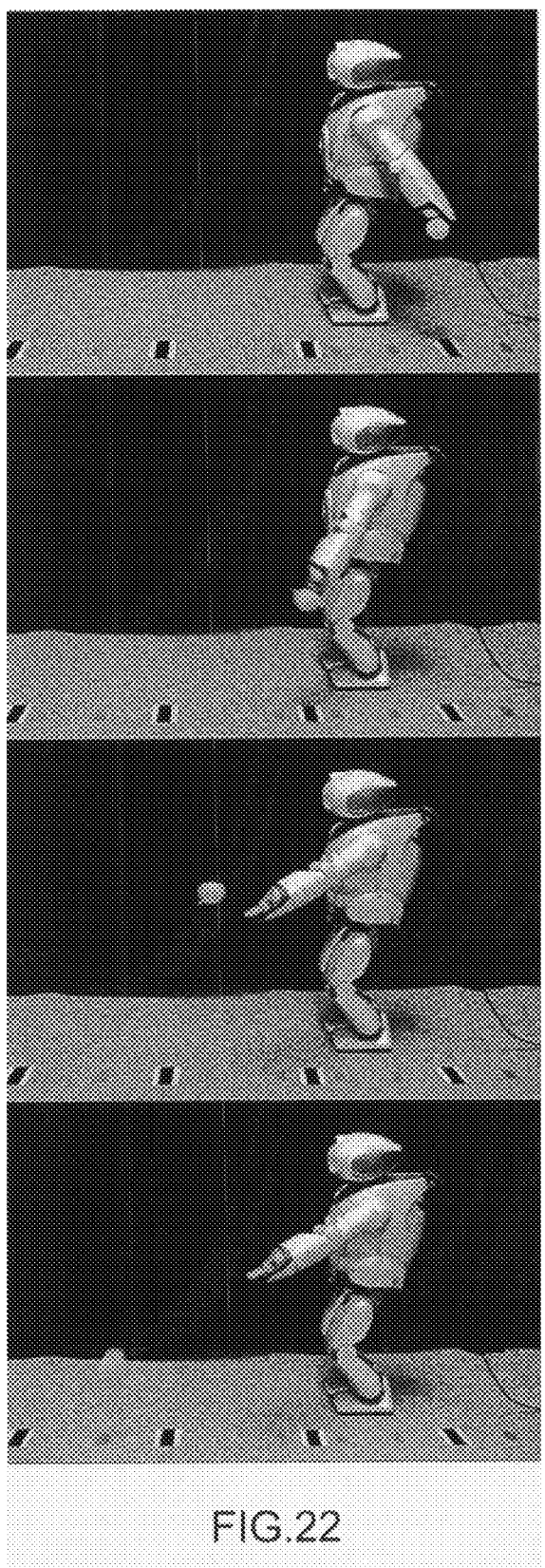
FIG. 22 shows photographs of a ball throwing motion of a robot taken at every 0.2 seconds.

The shoulder joint pitch axis $\theta_{arm\_pitch}^l$ can be driven by giving an appropriate gain to the output $q_a^l$ of the oscillator. FIG. 22 shows photographs of the ball throwing motion of the robot taken at every 0.2 seconds. It will be seen that the ball is thrown by about 0.3 meters by the ball throwing motion.

F. Example of Application to Walking Motion

In this section, an example of application of the embodiment of the present invention to an operation of controlling the biped locomotion of the robot apparatus of FIGS. 1 through 4 by means of neural oscillators will be discussed. As a periodic signal is fed back to the neural oscillators, it is possible to realize steady locomotion by utilizing the entrainment characteristics of the oscillators. It is also possible to pull back any of the neural oscillators to the entrainment region by means of a feedback signal that is a non-periodic signal if it goes out of the entrainment region.

F-1. Arrangement of Oscillators

As shown in FIGS. 3 and 4, the robot apparatus of this embodiment is provided with a rotary type actuator for each joint axis to realize a desired motion of the apparatus by positionally controlling the actuators. Thus, it is conceivable to arrange an oscillator for each joint axis to be directly controlled. For example, oscillators maybe defined for each joint of the legs having six degrees of freedom.

However, then, there arises a problem that the positional arrangement of oscillators in the field of forward dynamics makes it difficult to understand the behavior of each oscillator from the viewpoint of the behavior of the entire system. In short, it is difficult to know the extent to which the motion of each joint angle contributes to the behavior of the feet that operate as points of action (grounding point, stride, etc.).

From the viewpoint of robot engineering, the arrangement of oscillators is a forward kinetic arrangement and the command to be issued by each oscillator is inevitably a very complex one. For instance, when performing a specific task such as controlling the height of the center of gravity of a locomotion type robot or the grounding position of a leg, the command to be output by each oscillator involves a coordinate system that differs from that of the target of control (the center of gravity, the grounding point, etc.) so that it is difficult to intuitively understand the design of the characteristics of the oscillator and realize it. Thus, the route of feedback is a very complex one that forces the control system to operate on a trial and error basis and consume a long time.

In view of the above-identified problem, this embodiment arranges oscillators by introducing inverse kinematics. A reference coordinate system is defined for the movable section that is the target of control and oscillators are described for the movable sections by means of each of the coordinate axes of the reference coordinate system. Then, it is possible to obtain a command value to be given from an oscillator to a movable section in terms of the reference coordinate system and converts the command for a position to the movable section into a command for a joint angle by means of operations of inverse kinematics. Additionally, it is possible to effectively utilize the entrainment phenomenon by feeding back the state quantity of the movable section in the reference coordinate system to the oscillator. In the instance of FIG. 7, a trunk coordinate system is defined and the output $q_i$ of the neural oscillator is converted into toe trajectories in the coordinate system by mapping. Then, the command value for each joint of the legs is computed by operations of inverse kinematics.

Since an oscillator is described for the movable section by means of each of the coordinate axes of the reference coordinate system, it is possible to realize an arrangement of oscillators that is adapted to the function to be realized by the robot apparatus. Additionally, since the oscillator is described for the point of action of the movable section that is the target of control, it is possible to intuitively understand the role of the oscillator in the arranged oscillators to make it easy to adjust the parameters of the oscillator. Then, it is possible to obtain the command value to the joint actuator that is the target of direct control by converting the command value from the oscillator to the movable section into a command value to the joint in question. Thus, it is possible to effectively realize entrainment for the dynamic characteristics of the robot apparatus and utilize the entrainment phenomenon by the oscillator.

Figure 23:
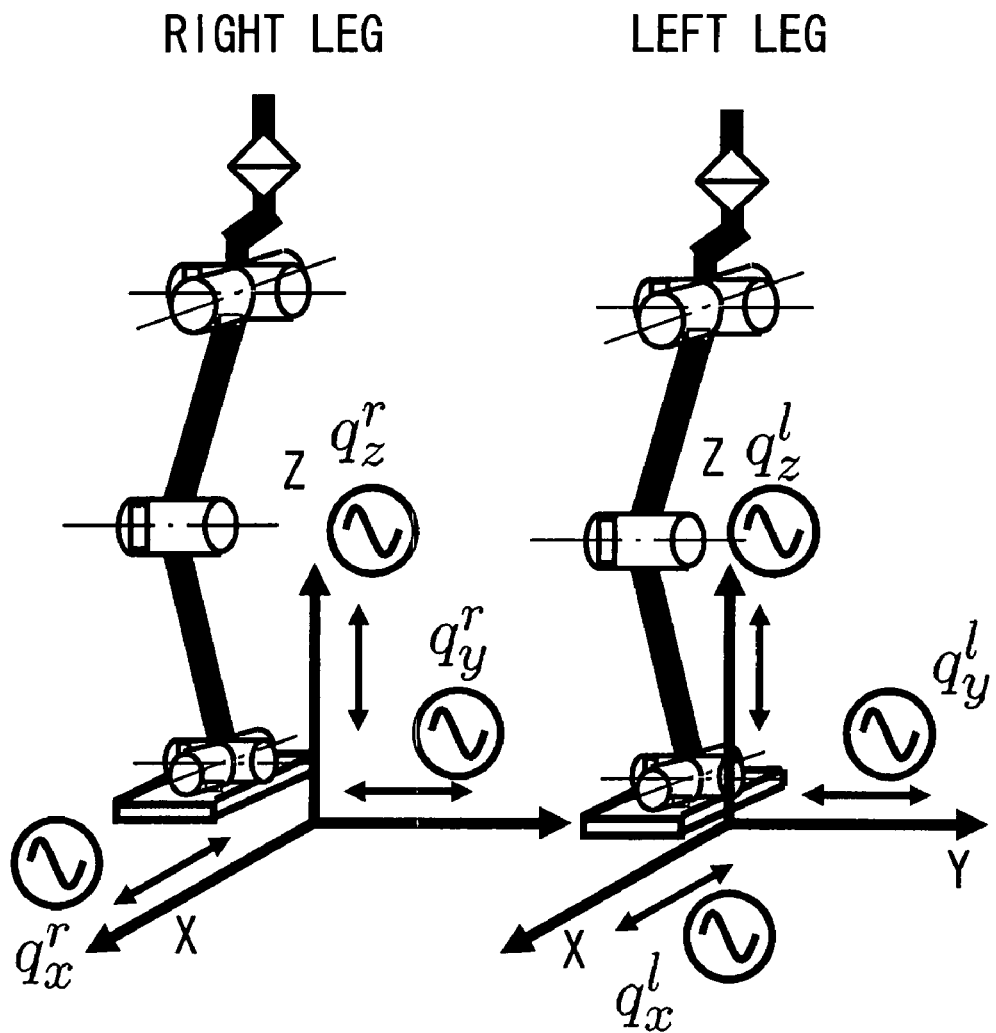
FIG. 23 is a schematic illustration of an example of arrangement where the reference coordinate system is formed by an XYZ orthogonal coordinate system and oscillators are arranged at the left and right legs along the axes.

FIG. 23 is a schematic illustration of an example of arrangement where the reference coordinate system is formed by an XYZ orthogonal coordinate system and oscillators are arranged at the left and right legs along the axes. Then, it is possible to functionally decompose the motions of the robot apparatus. The motion for supporting the own weight of the robot apparatus is in the Z-direction and the motion of stepping forward is in the X-direction, while the waist swinging motion for maintaining the balance of the left side and the right side of the robot apparatus is in the Y-direction. In the instance illustrated in FIG. 23, oscillators $q^l_x$, $q^l_y$ and $q^l_z$ are arranged at the left leg respectively in the X-, Y- and Z-directions while oscillators $q^r_x$, $q^r_y$ and $q^r_z$ are arranged at the right leg respectively in the X-, Y- and Z-directions to make the total number of oscillators equal to six. Although not shown, a similar reference coordinate system may be provided for the attitude of each toe.

Now, the forward walking motion of the legs equipped with the oscillators as shown in FIG. 23 will be discussed below. For the purpose of simplicity of explanation, it is assumed that the toes maintains the respective reference attitudes.

Figure 24:
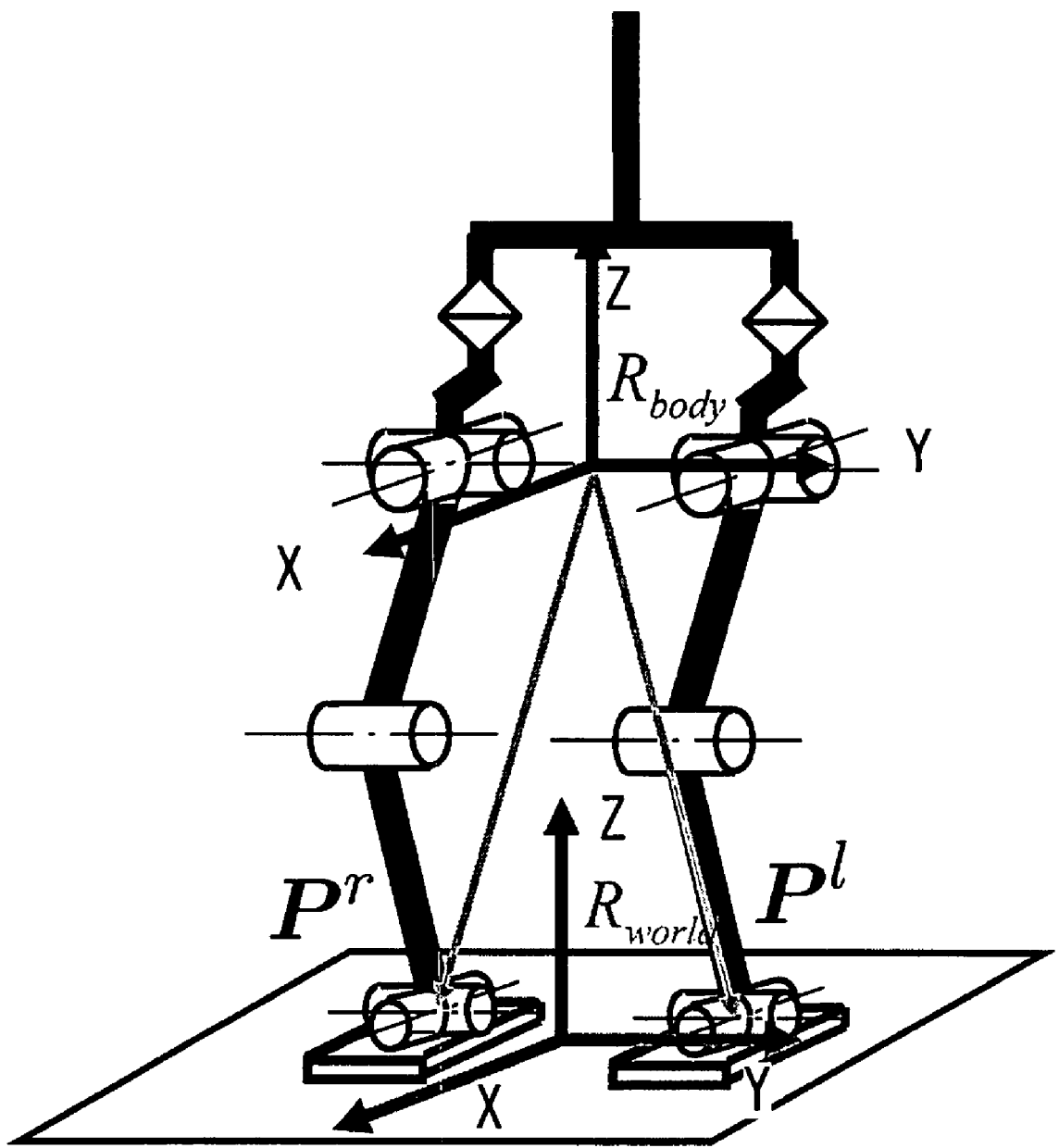
FIG. 24 is a schematic illustration of defined coordinate axes that can be used for looking into a steady walking motion.

A coordinate system $R_{world}$ is defined in an absolute space. A coordinate system $R_{body}$ that is fixed to the robot is also defined. The origins and the coordinate axes of the two coordinate systems are set in a manner as shown in FIG. 24. The position of the origin and the attitude of the robot coordinate system $R_{body}$ as viewed from the absolute coordinate system $R_{world}$ are expressed by formula (10) below.

[Formula 6]

$$\vec{P}^b = (p_x^b, p_y^b, p_z^b, p_{roll}^b, p_{pitch}^b, p_{yaw}^b) \tag{10}$$

Then, the toe position (x, y, z) and the attitude (roll, pitch, yaw) of each of the left and right feet as viewed from the coordinate system $R_{body}$ fixed to the robot apparatus are expressed respectively by formulas (11) and (12) below.

[Formulas 7]

$$\vec{P}^l = (p_x^l, p_y^l, p_z^l, p_{roll}^l, p_{pitch}^l, p_{yaw}^l) \tag{11}$$

$$\vec{P}^r = (p_x^r, p_y^r, p_z^r, p_{roll}^r, p_{pitch}^r, p_{yaw}^r) \tag{12}$$

When the toe positions are given, it is possible to computationally determine the joint angles by means of operations of inverse kinematics.

The XZ plane is "a sagittal plane" and the YZ plane is "a lateral plane". In this letter of specification, the movement in the positive direction of the X-axis is referred to as forward movement and the movement in the negative direction of the X-axis is referred to as backward movement.

F-2. Biped Walking Motion Using Oscillators

The robot apparatus of this embodiment has left and right movable legs and is adapted to biped locomotion. Biped locomotion is generally realized by repeating a walking cycle that is divided into the four motion periods as listed below.

(1) a single leg support period when the right leg is lifted and the body is supported by the left leg alone
(2) a two legs support period when the right leg is grounded
(3) a single leg support period when the left leg is lifted and the body is supported by the right leg alone
(4) a two legs support period when the left leg is grounded.

In short, a walking motion is realized by cyclically repeating a discrete grounding motion and switching of the supporting leg and the idling leg.

In this embodiment, the oscillators of a movable section are described for each and every coordinate axis of the reference coordinate system. Then, it is possible to obtain a command value to be given from an oscillator to a movable section in terms of the reference coordinate system. Thus, it is possible to convert the command for a position to the movable section into a command for a joint angle by means of operations of inverse kinematics. Additionally, it is possible to effectively utilize the entrainment phenomenon by feeding back the state quantity of the movable section in the reference coordinate system to the oscillator.

Figure 25:
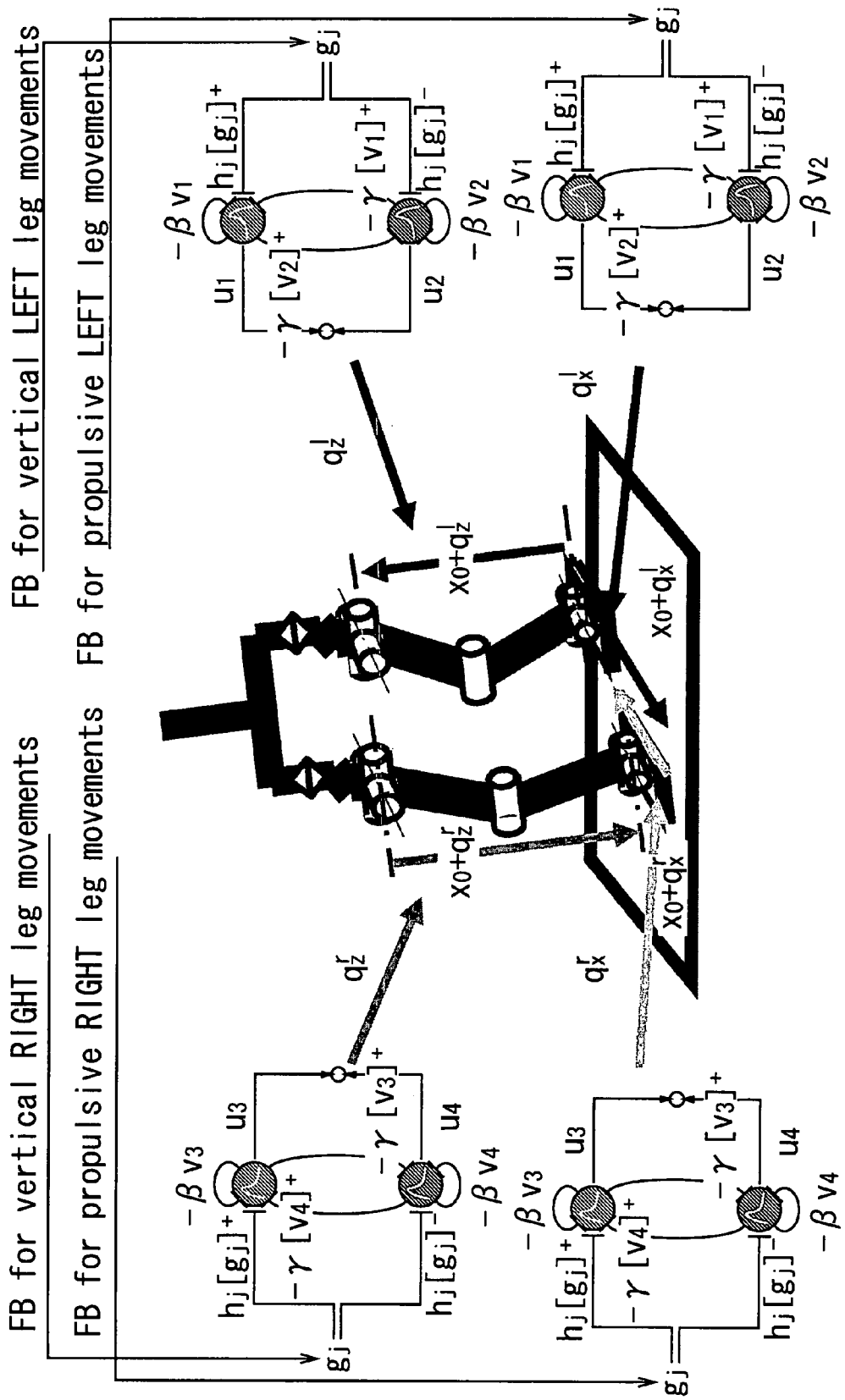
FIG. 25 is a schematic illustration of the oscillators arranged for controlling a walking motion.

The idea of decomposing a walking motion into a sagittal plane and a lateral plane is popular. FIG. 25 is a schematic illustration of the oscillators arranged for controlling a walking motion. In the illustrated instance, the left and right legs are provided respectively with oscillators for the positions in the X-direction and those for the positions in the Z-direction. Table 2 below summarily shows the relationship of the input and the output of each oscillator.

TABLE 2

| function | oscillator denomination | input (positive side) | input (negative side) | output |
|---|---|---|---|---|
| left leg position in Z-direction | $\phi_z^l$ | $g_z^{l+}$ | $g_z^{l-}$ | $q_z^l$ |
| left leg position in X-direction | $\phi_x^l$ | $g_x^{l+}$ | $g_x^{l-}$ | $q_x^l$ |
| right leg position in Z-direction | $\phi_z^r$ | $g_z^{r+}$ | $g_z^{r-}$ | $q_z^r$ |
| right leg position in X-direction | $\phi_x^r$ | $g_x^{r+}$ | $g_x^{r-}$ | $q_x^r$ |

In the following, firstly a stepping motion on the spot, which is a motion in the lateral plane, will be discussed. Then, a motion in the saggital plane is discussed to describe a forward walking motion and a backward walking motion.
F-2-1. Stepping Motion in Lateral Plane A motion in the lateral plane (YZ-plane) is decomposed in the Z-direction and the Y-direction to look into independently. A motion in the Z-direction involves a motion for supporting the own weight and an alternating motion of the legs for securing a clearance for the idling leg. For the purpose of simplicity of explanation, the stepping motion is generated only by a motion in the Z-direction and the legs are fixed to the reference positions in the Y-direction.

It is possible to generate a stepping motion by driving the left and right legs for the respective Z-positions as expressed by formula (13) and (14) shown below, using the outputs $q_z^l$ and $q_z^r$ of the oscillators of the left and right legs arranged in the Z-direction, appropriate constants $A_z^l$ and $A_z^r$ and the initial reference position $z_0$ in the Z-direction.

[Formula 8]

$$P_z^l = z_0 + A_z^l q_z^l \quad (13)$$

$$P_z^r = z_0 + A_z^r q_z^r \quad (14)$$

However, when the physical natural frequency of the robot and the natural frequency of the oscillators are close to each other, it is not possible to maintain a steady oscillation due to resonance and the oscillators are prone to be influenced by external turbulences. Additionally, when the natural frequency of the oscillators is small, neither leg can be made to be idle and hence it is not possible to realize a stepping motion. Thus, in this embodiment, a feedback system as described below is introduced to the oscillators $q_z^l$ and $q_z^r$ of the left and right legs in order to make the robot, which is a physical oscillator, capable of continuing a steady stepping motion.
(1) Extensor Response From experiments on decerebrated cats, it is known that a leg steps down strongly when the leg is extended and force is applied to the sole. This reaction is referred to as "extensor response". Such an action can be realized by feeding back the vertical reaction force of the floor to the neural oscillator. The observed reaction forces of the floor to the left and right legs are expressed as $F_z^l$ and $F_z^r$ respectively. The mass and the gravity acceleration of the robot are expressed by m and g respectively. Then, the feedback signal $g_{ER}$ to the oscillators $q_z^l$ and $q_z^r$ arranged in the Z-direction can be defined by formula (15) below. Note that the feedback signal is normalized by mg so that the feedback gain $h_{ER}$ may be adjusted with ease and the signs of the gains are inverted for the left and right legs in order to make them realize a symmetric stepping motion.

[Formulas 9]

$$g_{ER} = (F_z^l - F_z^r)/mg \quad (15)$$

$$h_{ER}^l < 0 \quad (16)$$

$$h_{ER}^r = -h_{ER}^l \quad (17)$$

Figure 26:
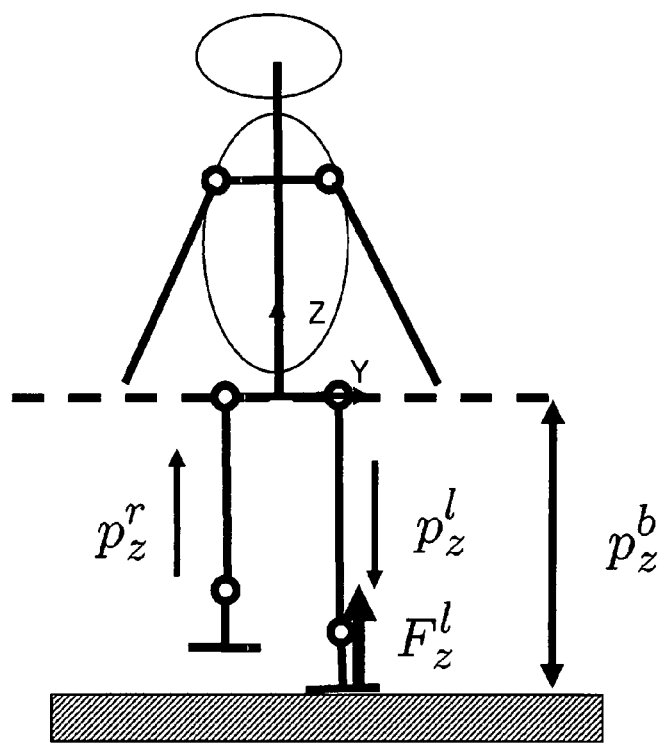
FIG. 26 is a schematic illustration of constantly maintaining the height $P^b_z$ of the trunk high from the floor surface by introducing a feedback system that utilizes the extensor response to left and right oscillators $q^l_z$ and $q^r_z$ when generating a stepping motion by driving the left and right legs for the respective Z-positions by means of the left and right oscillators $\phi_z$.

When generating a stepping motion by driving the left and right legs for the respective Z-positions by means of the left and right oscillators $q_z^l$ and $q_z^r$ arranged in the Z-direction, the leg that is stepping down is made to step down stronger when the reaction force of the floor is increased by introducing a feedback system that utilizes the above described extensor response to the oscillators $q_z^l$ and $q_z^r$. Then, as a result, it is possible to constantly maintain the height $P_z^b$ of the trunk high from the floor surface. FIG. 26 shows such an effect.
(2) Vestibulo-Spinal Reflex It is known that the nervous system of a living creature operates in such a way that, when the trunk is inclined, the muscles at the side for blocking the inclination extend. Such a reaction is referred to as "vestibulo-spinal reflex". Such a reflex can be introduced to the left and right oscillators $q_z^l$ and $q_z^r$ by inputting a feedback signal $g_{VSR}$ (see formula (18) below) to the left and right oscillators $q_z^l$ and $q_z^r$ according to the inclination $p^b_{roll}$ in the roll direction of the trunk. The feedback gains of the left and right legs are expressed respectively by $h^l_{VSR}$ and $h^r_{VSR}$ and the signs of the gains are inverted for the left and right legs in order to make them realize a symmetric motion.

[Formulas 10]

$$g_{VSR} = P_{roll}^b \quad (18)$$

$$h_{VSR}^l > 0 \quad (19)$$

$$h_{VSR}^r = -h_{VSR}^l \quad (20)$$

Figure 27:
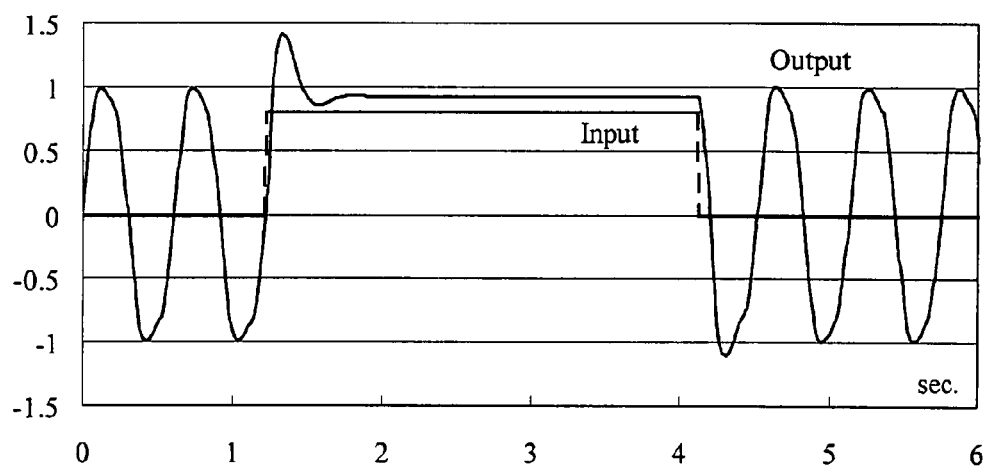
FIG. 27 is a graph illustrating an operation of stopping the oscillation of a neural oscillator by adjusting the parameters of the neural oscillator when a large feedback value is input to it.

A neural oscillator can stop its oscillation when a large feedback value is input to it by adjusting the parameters thereof. FIG. 27 schematically illustrates how the oscillation of a neural oscillator is stopped. It is possible to prevent a robot from falling down when the trunk is inclined to a large extent by temporarily inhibiting the oscillation and utilizing the restoring moment of the gravity.

Figure 28:
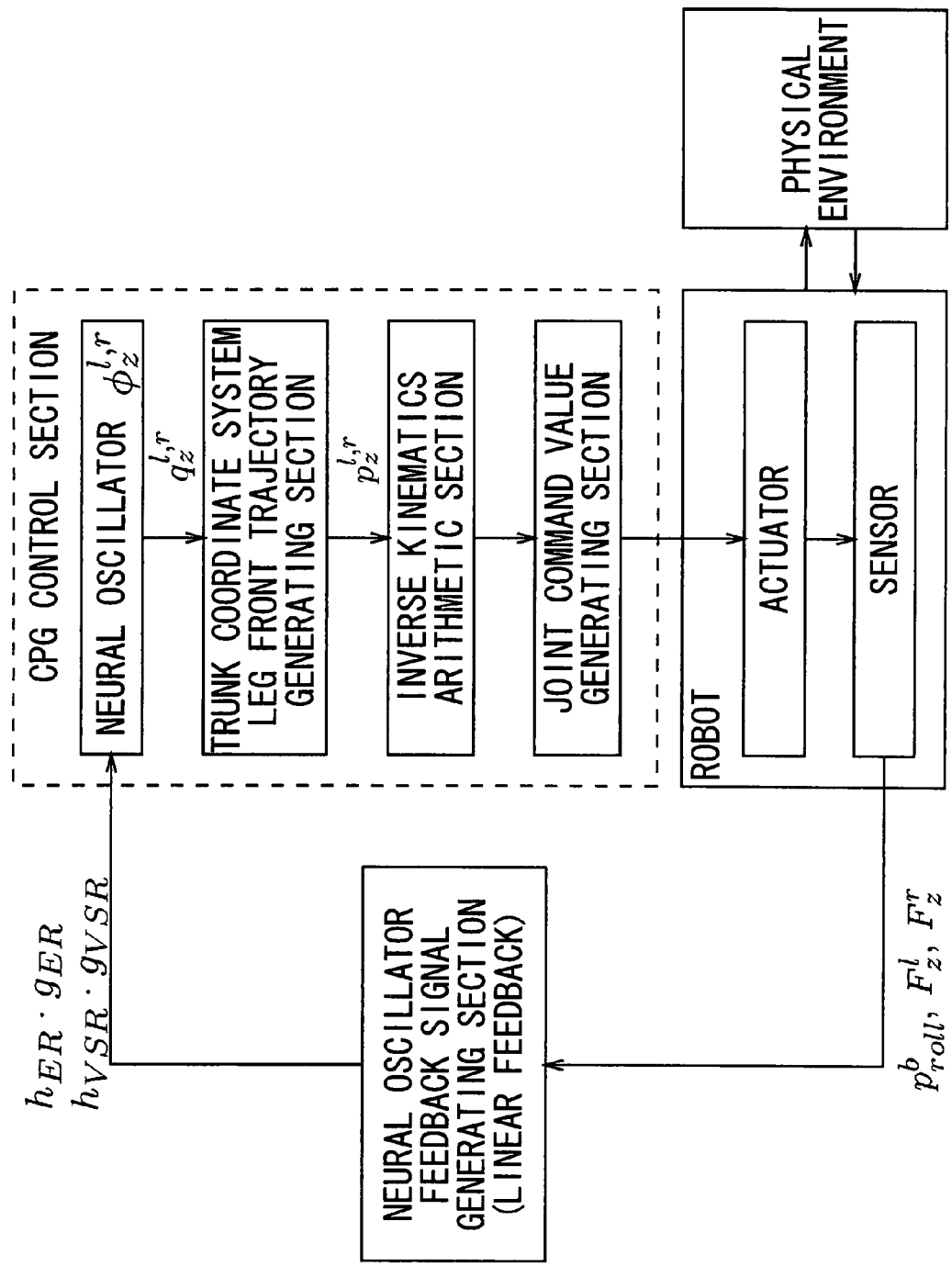
FIG. 28 is a schematic illustration of a system for controlling the stepping motion of a robot apparatus in the lateral plane of the robot, showing the configuration thereof.

FIG. 28 is a schematic block diagram of a system for controlling the stepping motion of a robot apparatus in a lateral plane. The illustrated system includes a CPG control section for generating a command value according to two-element type neural oscillators, a robot that is the subject of control and a neural oscillator feedback signal generating section for applying a feedback term to the neural oscillators.

The CPG control section includes a neural oscillator, a trunk coordinate system toe trajectories generating section, an inverse kinetics arithmetic section and a joint command value generating section.

Two-element type neural oscillators $\phi^l_z$ and $\phi^r_z$ are arranged respectively at the left and right legs along the Z-direction of the trunk coordinate system. The oscillators show entrainment characteristics relative to the environment and do self-oscillation with a natural frequency in a state where no feedback signal is applied to them to output $q^l_z$ and $q^r_z$ respectively. The output of a two-element type neural oscillator is indicated by the formulas (1) through (6) shown earlier.

The trunk coordinate system toe trajectories generating section converts the outputs $q^l_z$ and $q^r_z$ of the neural oscillators of the left and right legs into the positional trajectories $p^l_z$ and $p^r_z$ of the toes when the left and right legs do a stepping motion as viewed from the orthogonal trunk coordinate system by mapping. The positional trajectories $p^l_z$ and $p^r_z$ of the left and right legs are described above by referring to the formulas (11) and (12).

The inverse kinematics arithmetic section computationally determines the joint position of each of the joints of the legs by inverse kinematics arithmetic operations in order to realize the generated toe trajectories. The joint command value generating section generates command value signals for driving the joints to the obtained joint positions and outputs them to the respective joint actuators.

The neural oscillator feedback signal generating section generates feedback signals to the neural oscillators according to the observed values input from the sensors relating to the stepping motion of the robot. In this instance, the neural oscillator feedback signal generating section receives the trunk roll angle $P^b$ roll, the angular velocity of the roll of the trunk and the Z-direction floor reaction forces $F^l_z$ and $F^r_z$ of the left and right legs obtained by the stepping motion as inputs, generates linear feedback signals $g_{ER}$ and $g_{VSR}$ that mimic the extensor response and the vestibulo-spinal reflex as expressed by the formulas (15) through (20) and outputs them to the respective neural oscillators $\phi^l_z$ and $\phi^r_z$ in the CPG control section. The inputs to the oscillators are expressed by formulas (21) through (24) below.

[Formulas 11]

$$g_z^{l+} = h_{ER}^l \cdot g_{ER} + h_{VSR}^l \cdot g_{VSR} \tag{21}$$

$$g_z^{l-} = -g_z^{l+} \tag{22}$$

$$g_z^{r+} = h_{ER}^r \cdot g_{ER} + h_{VSR}^r \cdot g_{VSR} \tag{23}$$

$$g_z^{r-} = -g_z^{r+} \tag{24}$$

Due to the entrainment characteristics that the neural oscillators $\phi^l_z$ and $\phi^r_z$ have, the oscillation frequencies of the oscillator outputs $q^l_z$ and $q^r_z$ are synchronized with the oscillation frequencies of $g_{ER}$ and $g_{VSR}$ and their phase relationships are fixed to a constant value while the natural frequencies are autonomously adjusted according to the environment.

F-2-2. Walking Motion in Sagittal Plane

Now, a walking motion realized by adding motions of the legs in the X-direction to the above-described motions in the YZ plane will be discussed below.

Figure 29:
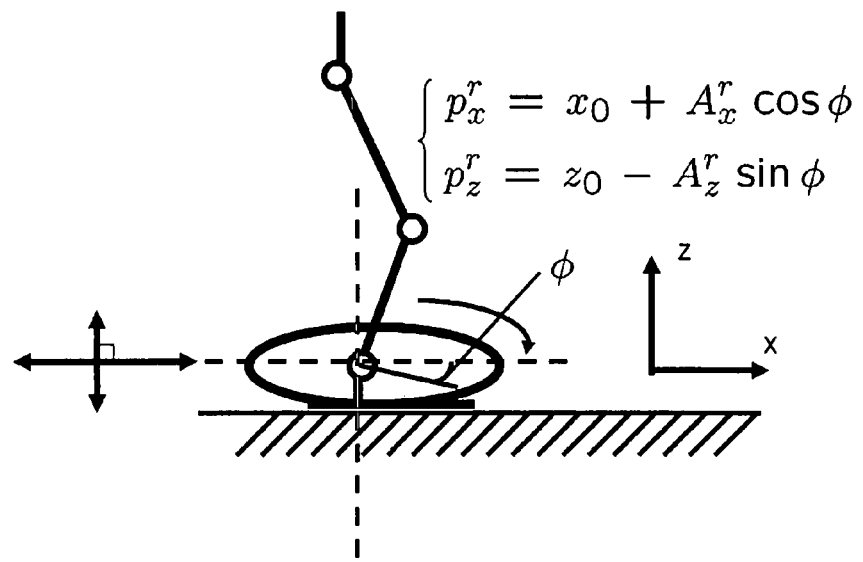
FIGS. 29 and 30 are schematic illustrations of a walking motion of a robot in the sagittal plane of the robot, using oscillators under control.

A motion in the sagittal plane can be a walking motion when the toe trajectories as viewed on the XZ plane are elliptic trajectories. For example, an elliptic trajectory that progresses clockwise as shown in FIG. 29 can make a robot apparatus to move in the X-direction. In this case, the inventors of the present invention believe that a feedback signal for shifting the phase of the motion in the X-direction by 90 degrees from the phase of the motion in the Z-direction is required. Then, the X-coordinate $p^r_x$ and the Z-coordinate $p^r_z$ of the toe of the right leg are expressed by formulas (25) and (26) below. The coordinates are expressed by parameters, the initial reference positions of the coordinates being $x_0$ and $z_0$, $A_x$ and $A_z$ being constants, phase $\phi$ being the illustrated angle.

[formulas 12]

$$p_x^r = x_0 + A_x^r \cos\phi = x_0 + A_x^r \sin\left(\phi + \frac{\pi}{2}\right) \tag{25}$$

$$p_z^r = z_0 - A_z^r \sin\phi \tag{26}$$

Figure 30:
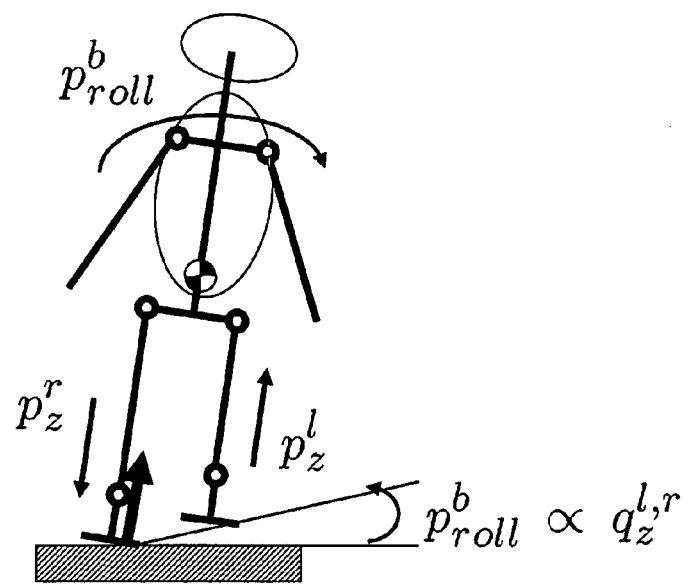
Figure 31:
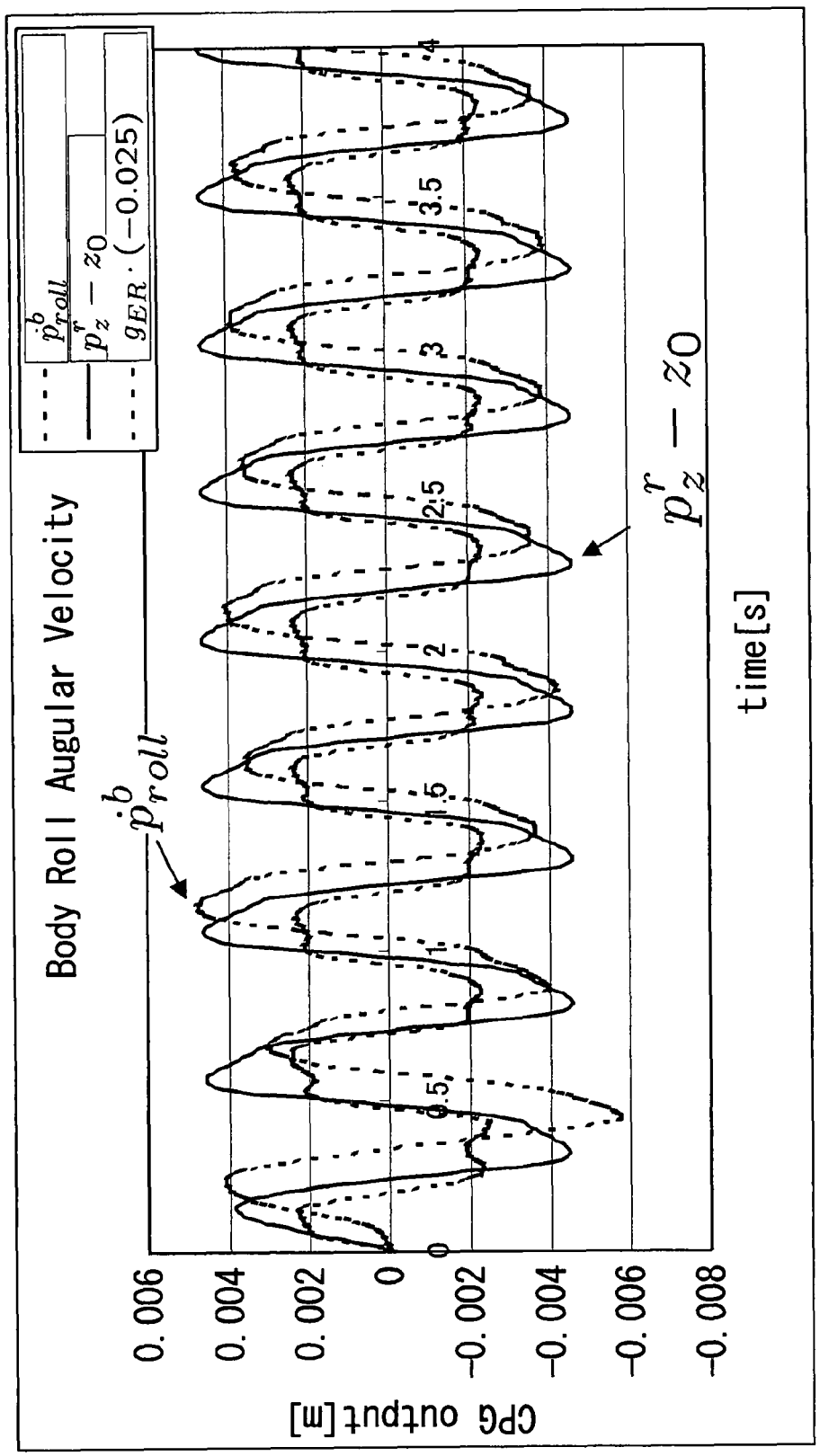
FIG. 31 is a graph illustrating the outcome obtained by simulating a walking motion of a robot in the sagittal plane of the robot, using oscillators under control.

From the above formulas, it will be seen that a signal showing a phase difference of 90 degrees between the oscillation in the X-direction and the oscillation in the Z-direction is required. A qualitative discussion will be given below. As shown in FIG. 30, a swinging motion $p^b_{roll}$ is generated by the oscillator outputs $q^l_z$ and $q^r_z$ in the Z-direction. Thus, the swinging motion $p^b_{roll}$ in the rolling direction of the trunk and the oscillator output $q^l_z$ (or $q^r_z$) seem to be oscillating with the same phase (opposite phases). If $q^l_z$ (or $q^r_z$) can be approximated by a sine wave, a cosine wave is produced and a phase difference of 90 degrees is obtained by differentiating it. In other words, the differential of the first order of $p^b_{roll}$ is expected to give rise to a phase difference of 90 degrees. FIG. 31 is a graph illustrating the outcome obtained by simulating the angular velocity in the roll direction of the trunk when a robot apparatus does a steady stepping motion.

From FIG. 31, it will be seen that there is a phase difference of about 90 degrees between the differential of the first order of the swinging motion $p^b_{roll}$ in the roll direction of the trunk and ($p^r_{z-z0}$). Since $q^r_z \propto (p^r_z - z_0)$ from the formula (14), it will be seen that the oscillation in the Z-direction and the angular velocity in the roll direction of the trunks show a phase difference of 90 degrees. Thus, the angular velocity in the roll direction of the trunk is used as feedback signal for the oscillators $q^l_x$ and $q^r_x$ for describing the motion of the robot produced by the left and right legs in the X-direction.

As for the motion in the X-direction in the sagittal plane, the left and right legs are driven in the X-direction by arranging the oscillators $q^l_x$ and $q^r_x$ at the left and right legs respectively as shown by formulas (27) and (28) below. X0 is the initial reference position and $A^l_x$ and $A^r_x$ are appropriate constants.

[Formulas 13]

$$p_x^l = x_0 + A_x^l q_x^l \tag{27}$$

$$p_x^r = x_0 + A_x^r q_x^r \tag{28}$$

If the feedback signal to be input to the oscillators for the X-direction is $g_x$, it can be defined by formulas (29) through (31) below, where the gains of the left and right legs are $h^l_x$ and $hq^r_x$ respectively. Note that the signs of the gains are inverted for the left and right legs in order to drive the left and right legs symmetrically.

[Formulas 14]

$$g_x = -\dot{p}_{roll}^b \tag{29}$$

$$h_x^l > 0 \tag{30}$$

$$h_x^r = -h_x^l \tag{31}$$

Figure 32:
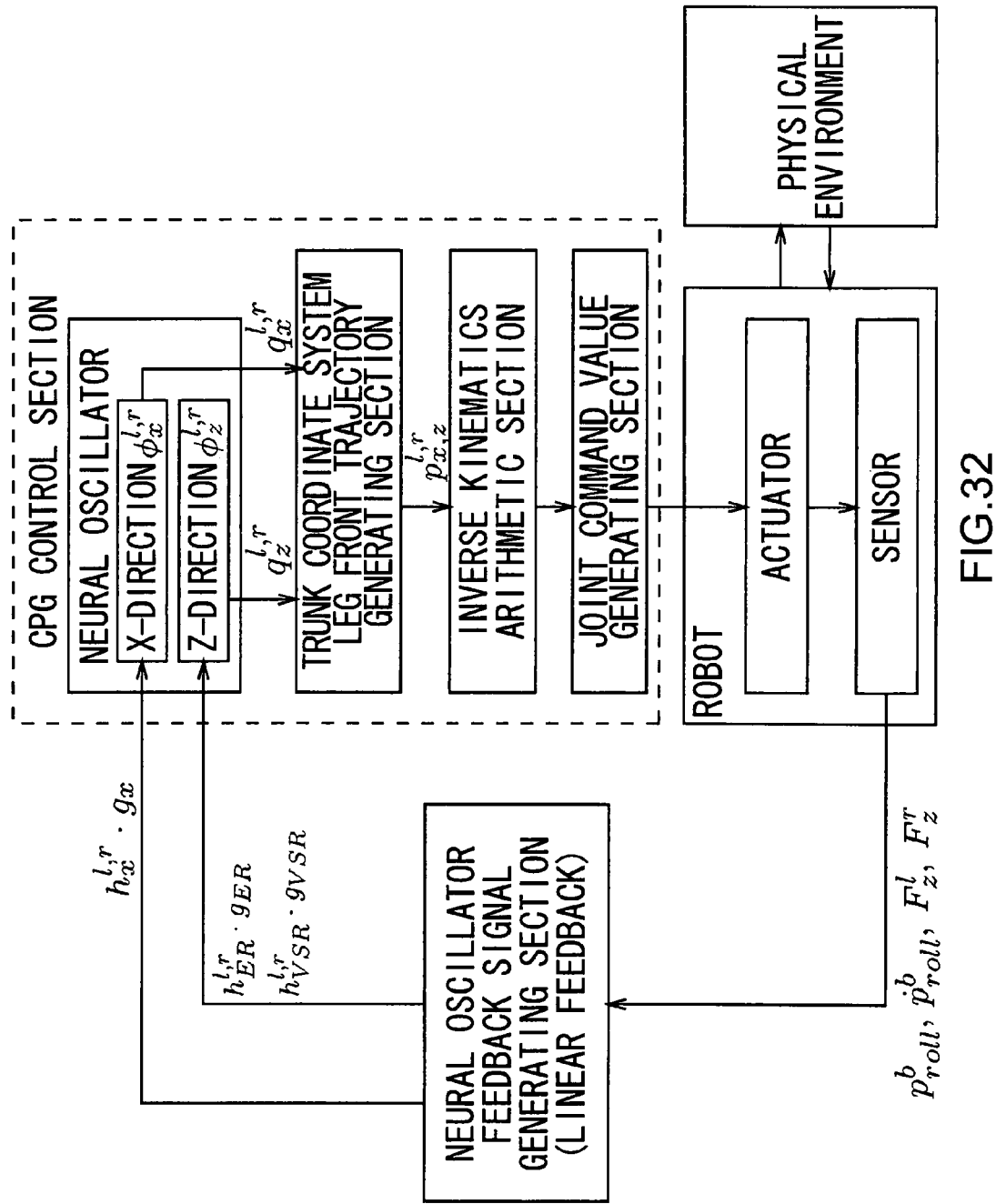
FIG. 32 is a schematic illustration of a control system for the waling motion of a robot apparatus, showing the configuration thereof.

FIG. 32 is a schematic illustration of a control system for the waling motion of a robot apparatus, showing the configuration thereof. It is assumed here that the stepping motion in the lateral plane is already realized and a motion in the sagittal plane is added to it. The illustrated system includes a CPG control section for generating a command value according to neural oscillators, a robot that is the subject of control and a neural oscillator feedback signal generating section for applying a feedback term to the neural oscillators.

The CPG control section includes a neural oscillator, a trunk coordinate system toe trajectories generating section, an inverse kinetics arithmetic section and a joint command value generating section.

Two-element type neural oscillators $\phi^l_x$ and $\phi^r_x$ are arranged respectively at the left and right legs along the X-direction while two-element type neural oscillators $\phi^l_z$ and $\phi^r_z$ are arranged respectively at the left and right legs along the Z-direction of the trunk coordinate system. The oscillators show entrainment characteristics relative to the environment and do self-oscillation with a natural frequency in a state where no feedback signal is applied to them. The output of a two-element type neural oscillator is indicated by the formulas (1) through (6) shown earlier.

The trunk coordinate system toe trajectories generating section converts the outputs $q^l_z$ and $q^r_z$ of the neural oscillators of the left and right legs that are arranged along the Z-direction into the positional trajectories $p^l_z$ and $p^r_z$ of the toes when the left and right legs do a stepping motion as viewed from the orthogonal trunk coordinate system by mapping. The positional trajectories $p^l_z$ and $p^r_z$ of the left and right legs are described above by referring to the formulas (11) and (12).

The trunk coordinate system toe trajectories generating section converts the outputs $q^l_x$ and $q^r_x$ of the neural oscillators of the left and right legs that are arranged along the X-direction into the positional trajectories $p^l_x$ and $p^r_x$ of the toes when the left and right legs do a stepping motion as viewed from the orthogonal trunk coordinate system by mapping. The positional trajectories $p^l_x$ and $p^r_x$ of the left and right legs are described above by referring to the formulas (27) and (28).

The inverse kinematics arithmetic section computationally determines the joint position of each of the joints of the legs by inverse kinematics arithmetic operations in order to realize the generated toe trajectories. The joint command value generating section generates command value signals for driving the joints to the obtained joint positions and outputs them to the respective joint actuators.

The neural oscillator feedback signal generating section generates feedback signals to the neural oscillators according to the observed values input from the sensors relating to the stepping motion of the robot. In this instance, the neural oscillator feedback signal generating section receives the trunk roll angle $p^b_{roll}$ and the Z-direction floor reaction forces $F^l_z$ and $F^r_z$ of the left and right legs obtained by the stepping motion as inputs, generates linear feedback signals $g_{ER}$ and $g_{VSR}$ that mimic the extensor response and the vestibulo-spinal reflex as expressed by the formulas (15) through (20) and outputs them to the respective neural oscillators $\phi^l_z$ and $\phi^r_z$ in the CPG control section. The inputs to the oscillators are expressed by formulas (21) through (24) below.

The neural oscillator feedback signal generating section generates feedback signals to the neural oscillators according to the observed values input from the sensors relating to the stepping motion of the robot. In this instance, the neural oscillator feedback signal generating section receives the angular velocity of the roll of the trunk in addition to the trunk roll angle $p^b_{roll}$ and the Z-direction floor reaction forces $F^l_z$ and $F^r_z$ of the left and right legs obtained by the stepping motion as inputs, generates feedback signal $g_x$ as expressed by the formulas (29) through (31) above and outputs them to the respective neural oscillators $\phi^l_x$ and $\phi^r_x$ in the CPG control section. The inputs to the oscillators are expressed by formulas (32) through (35) below.

[Formulas 15]

$$g_x^{l^+} = h_x^l \cdot g_x \tag{32}$$

$$g_x^{l^-} = -g_x^{l^+} \tag{33}$$

$$g_x^{r^+} = h_x^r \cdot g_x \tag{34}$$

$$g_x^{r^-} = -g_x^{r^+} \tag{35}$$

Figure 33:
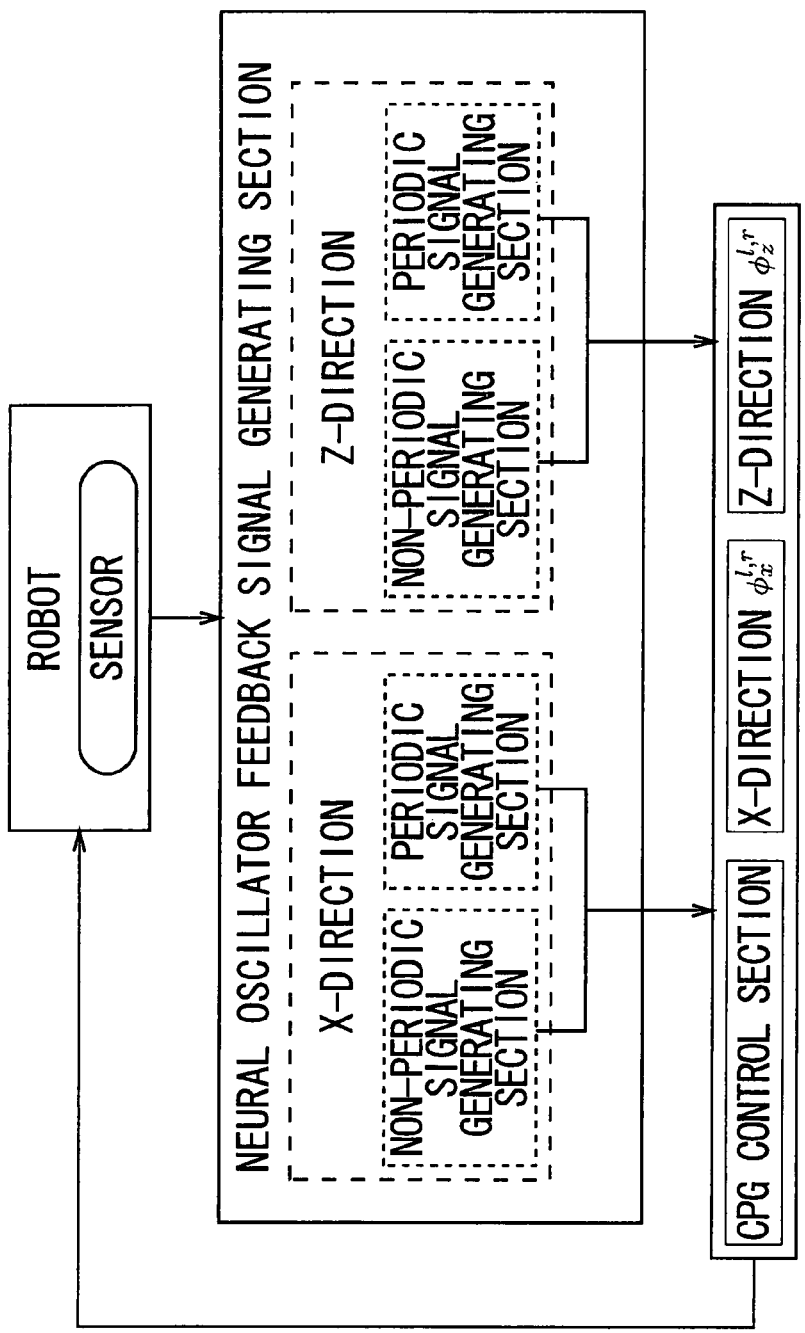
FIG. 33 is a schematic illustration: of the neural oscillator feedback signal generating section, showing the internal configuration thereof.

FIG. 33 is a schematic illustration of the neural oscillator feedback signal generating section, showing the internal configuration thereof. The neural oscillator feedback signal generating section includes signal generating sections for the oscillators in the X-direction and those for the oscillators in the Z-direction so as to accommodate the arrangement of oscillators. The signal generating sections of each direction include a part for generating periodic signals and a part for generating non-periodic signals.

Each of the non-periodic signal generating sections outputs a predetermined fixed value when the sensor information satisfies predetermined requirements. Each of the periodic signal generating sections performs a linear transformation on an input periodic signal and generates a feedback signal that is a periodic signal. The generated non-periodic and periodic feedback signals are input to each of the neural oscillators arranged along the X-direction and the Z-direction.

The oscillation frequency of the outputs $q^l_x$ and $q^r_x$ of the neural oscillators $\phi^l_x$ and $\phi^r_x$ arranged along the X-direction is synchronized with the oscillation frequency of the feedback signal $g_x$ that is determined from the angular velocity of the roll of the trunk due to the entrainment characteristics of the neural oscillators $\phi^l_x$ and $\phi^r_x$ and their phase relationship is fixed to constant value, while the natural frequency is autonomously adjusted according to the environment. Additionally, as linear feedback signals $g_{ER}$ and $g_{VSR}$ that respectively mimic the extensor response and the vestibulo-spinal reflex are generated and input to the $\phi^l_z$ and $\phi^r_z$ arranged along the Z-direction, the oscillation frequency of the oscillator outputs $q^l_z$ and $q^r_z$ are synchronized with the oscillation frequency of $g_{ER}$ and $g_{VSR}$ as described above (see FIG. 28).

F-2-3. Height Increase of Idling Leg in Stepping Motion on the Spot

When a robot apparatus is walking on an unknown undulated road, it is preferable to raise the idling leg high in order to prevent itself from stumbling. However, the stepping motion expressed by the formulas (13) and (14) shown above are driven by the oscillator $q_z$ that describes the motion in the Z-direction and the amplitude of the stepping down motion of the leg ($q_z$<0) and that of idling the leg ($q_z$>0) is equal to each other. Then, if the amplitude $A_z$ is increased in order to secure a large height for the idling leg, the amplitude of the stepping down motion of the supporting leg is inevitably increased to consequently raise the oscillation of the trunk in the roll direction. Such a motion is disadvantageous to external turbulences. Additionally, the robot apparatus is caused to fall down sideways when it can no longer continue the stepping motion because of the large oscillation in the roll direction of the trunk.

It is difficult to obtain an action of raising the idling leg high from the output of the oscillator $q_z$ only by feeding back an ordinary periodic signal and exploiting the entrainment phenomenon. However, it is possible to increase the amplitude only for the idling leg by introducing a one-shot feedback signal.

Now, the fact that it is possible to increase the height of the idling leg and secure a sufficient clearance between the floor surface by using a one-shot feedback signal as non-periodic feedback signal will be described. Firstly, a stepping motion on the spot will be discussed by reducing both the constants $A^l_x$ and $A^r_x$, by which the oscillators $q^l_x$ and $q^r_x$ for describing a motion of the left and right legs in the X-direction are to be multiplied respectively, to nil.

Figure 34:
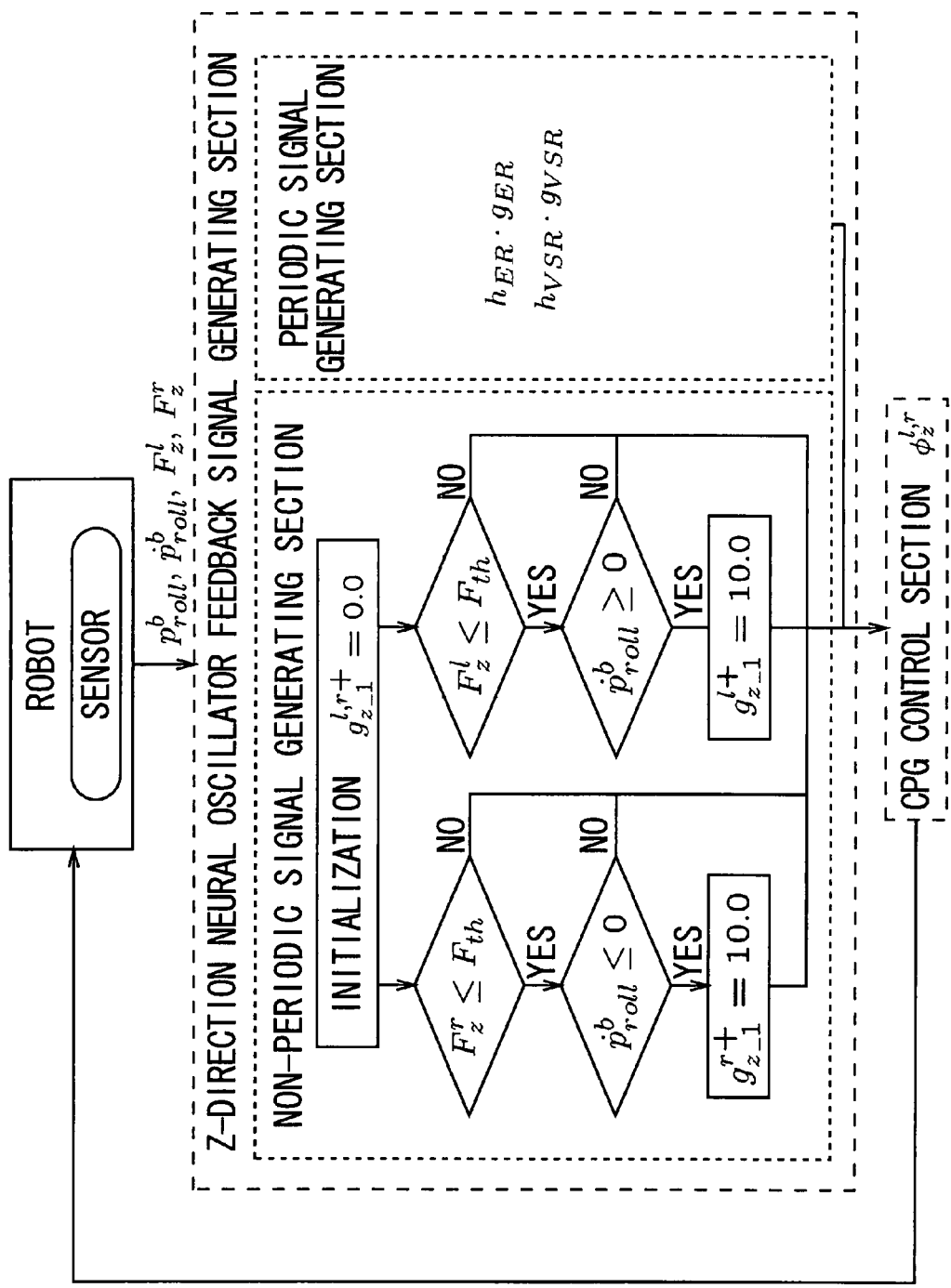
FIG. 34 is a schematic illustration of the control system for realizing a stepping motion of a robot apparatus with an increased height for the idling leg, showing the configuration thereof.

FIG. 34 is a schematic illustration of the control system for realizing a stepping motion of a robot apparatus with an increased height for the idling leg, showing the configuration thereof. As shown, the neural oscillator feedback signal generating section includes a periodic signal generating section and a non-periodic signal generating section.

The periodic signal generating section inputs a periodic feedback signal to each of the neural oscillators for describing a motion of the left and right legs in the Z-direction in order to cause the robot to do a steady stepping motion. More specifically, the periodic signal generating section receives the trunk roll angle $p^b_{roll}$, the angular velocity of the roll of the trunk and the Z-direction floor reaction forces $F^l_z$ and $F^r_z$ of the left and right legs obtained by the stepping motion as inputs, generates linear feedback signals $g_{ER}$ and $g_{VSR}$ that mimic the extensor response and the vestibulo-spinal reflex as expressed by the formulas (15) through (20) and outputs them to the respective neural oscillators $\phi^l_z$ and $\phi^r_z$ in the CPG control section. The inputs to the oscillators are expressed by the formulas (21) through (24) shown above.

On the other hand, the non-periodic signal generating section generates a one-shot feedback signal and supplies it to each of the neural oscillators $\phi^l_z$ and $\phi^r_z$ when causing the robot to do a non-steady stepping motion of lifting the idling leg high. The one-shot feedback signal may use a large constant relative to the neural oscillators that is typically equal to +10.0.

The following requirements are formulated by formulas (36) and (37) below.
(1) The sole is not touching the floor surface.
(2) An angular velocity of the roll of the trunk is generated in the direction of falling down onto the supporting leg.

[Formulas 16]

When $(F^l_{th} \leq F_{th}) \cap (\dot{p}^b_{roll} \geq 0)$, $g_{z\_1}^{l+} = 10.0$ \hfill (36)

When $(F^r_{th} \leq F_{th}) \cap (\dot{p}^b_{roll} \geq 0)$, $g_{z\_1}^{r+} = 10.0$ \hfill (37)

Fth: floor reaction force threshold value in Z-direction $g^{l,r}_{z\_1}$: non-periodic feedback signal The one-shot feedback signal increases the oscillator $q_z$ in the positive direction (shorten the leg) and hence shows an amplitude of 10.0 times of that of $q_z$. The one-shot feedback signal is added to the above described feedback signals $g_{ER}$ and $g_{VSR}$ and applied to each of the neural oscillators $\phi^l_z$ and $\phi^r_z$. The feedback signals to be applied to the neural oscillators $\phi^l_z$ and $\phi^r_z$ are expressed by formulas (38) through (41) below.

[Formulas 17]

$$g_z^{l+} = h^l_{ER} \cdot g_{ER} + h^l_{VSR} \cdot g_{VSR} + g_{z\_1}^{l+} \tag{38}$$

$$g_z^{l-} = -(h^l_{ER} \cdot g_{ER} + h^l_{VSR} \cdot g_{VSR}) \tag{39}$$

$$g_z^{r+} = h^r_{ER} \cdot g_{ER} + h^r_{VSR} \cdot g_{VSR} + g_{z\_1}^{r+} \tag{40}$$

$$g_z^{r-} = -(h^r_{ER} \cdot g_{ER} + h^r_{VSR} \cdot g_{VSR}) \tag{41}$$

The use of the one-shot feedback signal is same as a state transition machine that is used for controlling the motions of a locomotion robot. Thus, it will be seen that neural oscillators can be combined with the controller of a state transition machine with ease.

Figure 35:
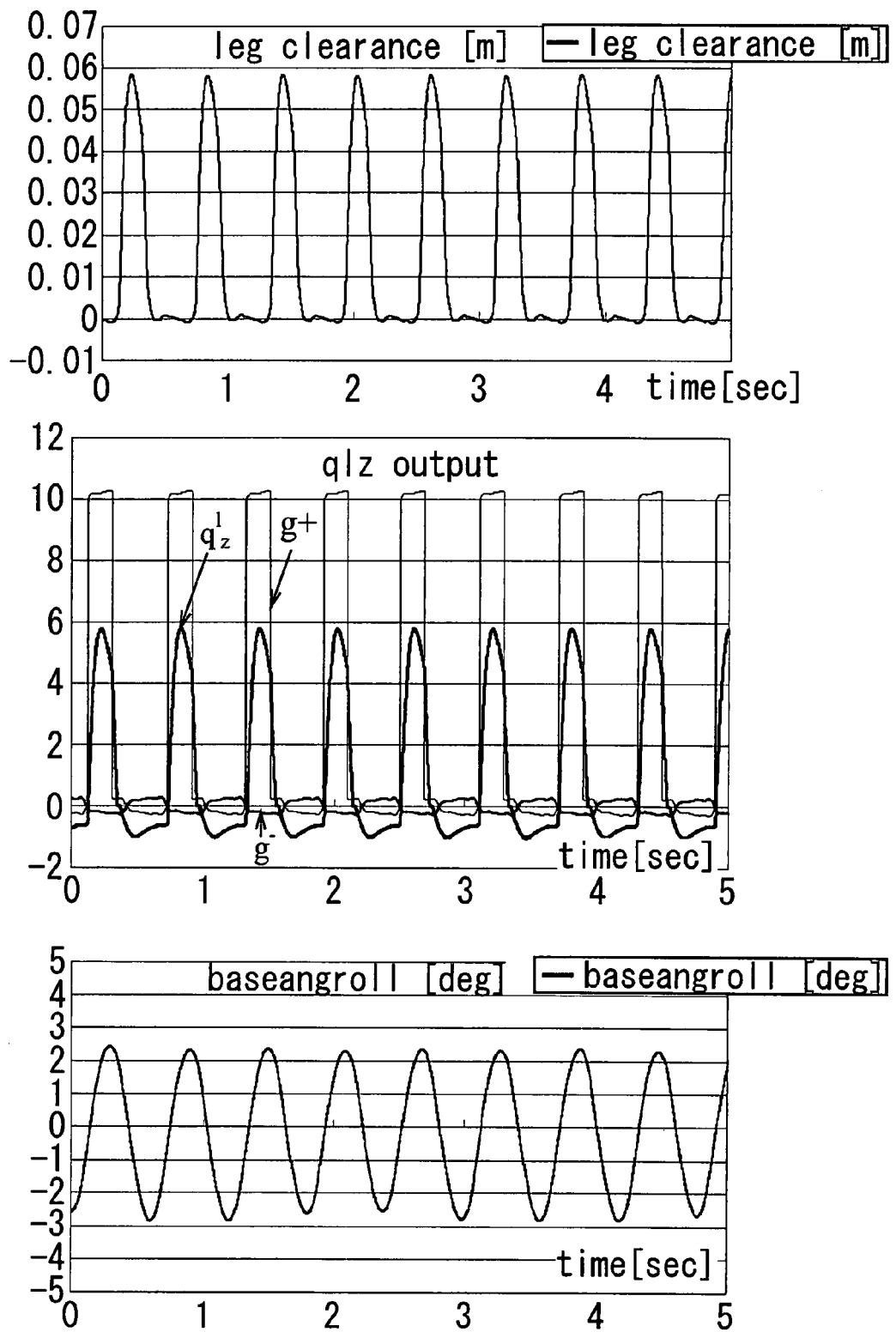
FIG. 35 shows graphs illustrating the outcome of a computer simulation for controlling a biped locomotion robot so as to increase the height of the idling leg by means of a one-shot feedback signal.
Figure 36:
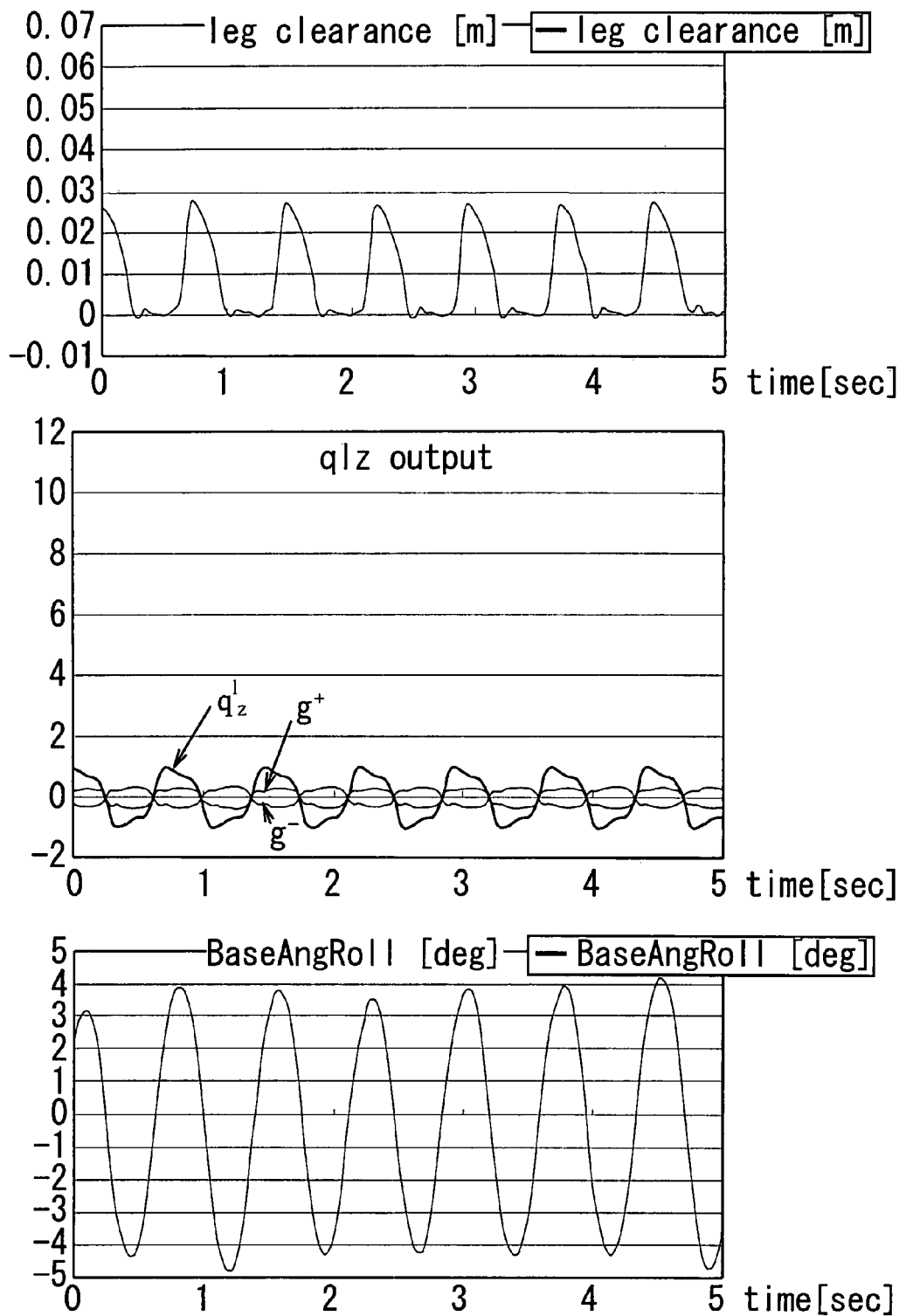
FIG. 36 shows graphs illustrating the outcome of a computer simulation for controlling a biped locomotion robot so as to increase the height of the idling leg without introducing a one-shot feedback signal.

FIG. 35 shows graphs illustrating the outcome of a computer simulation for controlling a biped locomotion robot so as to increase the height of the idling leg by means of a one-shot feedback signal. FIG. 36 shows graphs illustrating the outcome of a computer simulation for controlling a biped locomotion robot so as to increase the height of the idling leg without introducing a one-shot feedback signal for the purpose of comparison.

In each of FIGS. 35 and 36, the top graph shows the height of the sole of left leg in the Z-direction. It will be seen from FIGS. 35 and 36 that the largest height of the idling leg is increased to about twice by introducing a one-shot feedback signal.

In each of FIGS. 35 and 36, the middle graph shows the output $q^l_z$ of the oscillator and the applied feedback signal (positive side: $g^+$, negative side: $g^-$). When no one-shot feed back signal is applied, the amplitude of the positive side and that of the negative side are same and their absolute values are substantially equal to 1. On the other hand, when a one-shot feedback signal of +10.0 is applied, only the amplitude of the positive side is boosted remarkably to about six times of that of the negative side. The largest amplitude was confirmed to show an excellent linear relationship with the value of the applied one-shot feedback signal.

In each of FIGS. 35 and 36, the bottom graph shows the change with time of the trunk roll angle $p^b_{roll}$ of the robot in a stepping motion. The swinging motion of the robot is not boosted but rather reduced in the trunk roll direction when a one-shot feedback signal is introduced. Thus, it will be seen that it is possible to increase the height of the idling leg without boosting the amplitude of the swinging motion in the trunk roll direction.

The behavior of the supporting leg is similar to the one observed when linear feedback signals $g_{ER}$ and $g_{VSR}$ are used. Thus, it is possible to secure the robustness relative to external turbulences in the lateral direction as ever.

F-2-4. Straight Forward Walking, High Speed Walking, Traveling Over Obstacle with Heightened Idling Leg Now, the straight forward walking of the robot when a one-shot feedback signal is introduced in the Z-direction will be described below. Controlling the height of the idling leg and the amplitude of the swinging motion of the supporting leg in the Z-direction independently by using a one-shot feedback signal, the robot provides advantages (1) the robot can walk at high speed and (2) it can travel on an unleveled ground better.

(1) When the robot walks at high speed, it is necessary to minimize the vertical movement of the center of gravity and prevent the potential energy from being lost. For this purpose, the motion of the supporting leg in the Z-direction needs to be minimized. Additionally, if the walking cycle is short and a high angular velocity is required for the joints, such occasions can be accommodated by minimizing the displacement of the idling leg but preventing the idling leg from touching the floor surface. However, when no one-shot feedback signal is used, the amplitude of the motion of the supporting leg and that of the motion of the idling leg are the same and are not able to be adjusted independently so that the walking speed is limited.
(2) When the robot travels on an unleveled ground, it is important to secure a large height for the idling leg in order to prevent itself from stumbling. However, when no one-shot feedback signal is used, the height of the idling leg is limited and hence the robustness of the robot relative to the undulations of the floor surface where the robot walks is low.

In view of the above items, the effectiveness of introducing a one-shot feedback signal will be discussed below in terms of straight forward walking, high speed walking and traveling on an unleveled ground.

F-2-4-1. Phase Adjustment of Leg Trajectories for Straight Forward Walking

Figure 37:
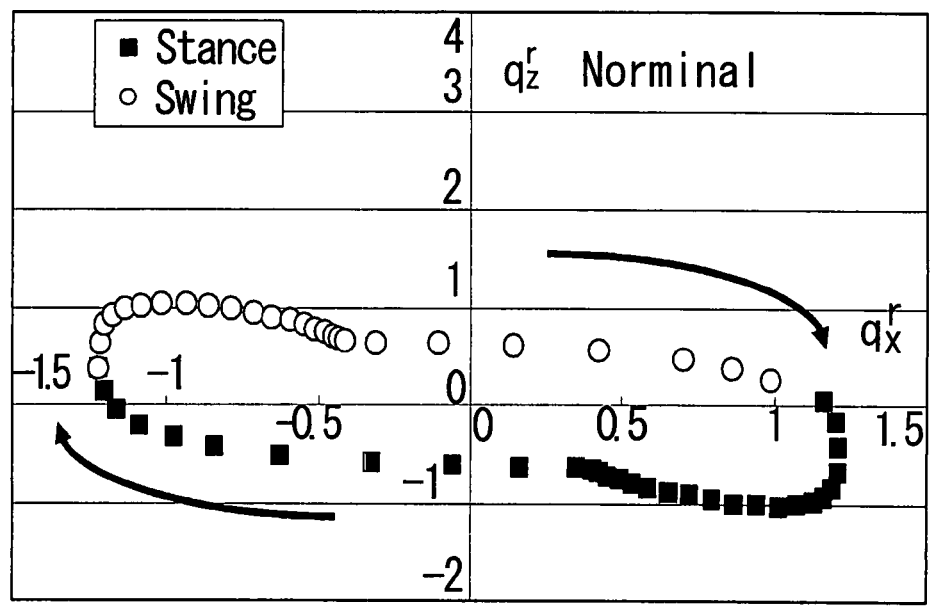
FIGS. 37 and 38 are graphs schematically illustrating the trajectory of the right leg when a real robot is made to walk straight forward without using a one-shot feedback signal.
Figure 38:
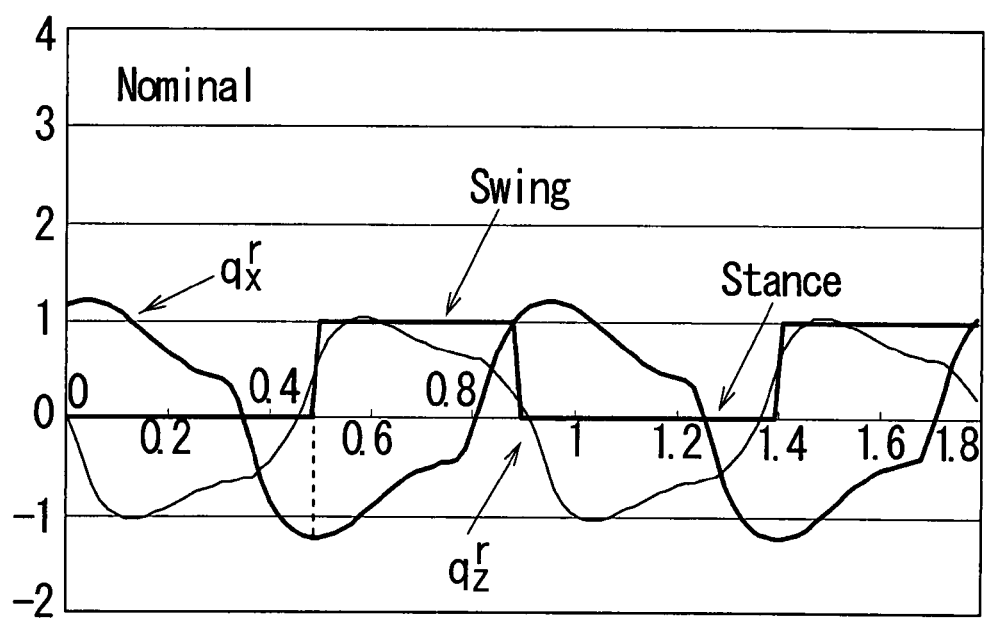
Figure 39:
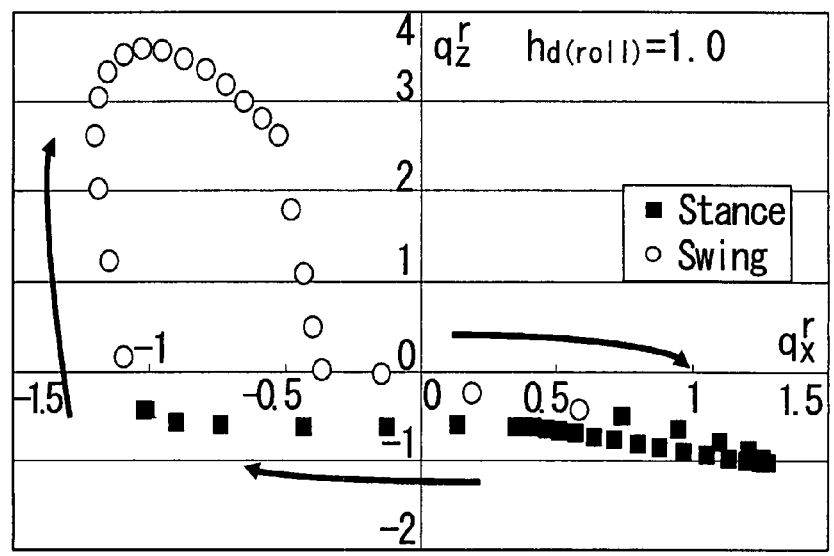
FIGS. 39 and 40 are graphs schematically illustrating the trajectory of the right leg when a real robot is made to walk straight forward when a one-shot feedback signal is used.
Figure 40:
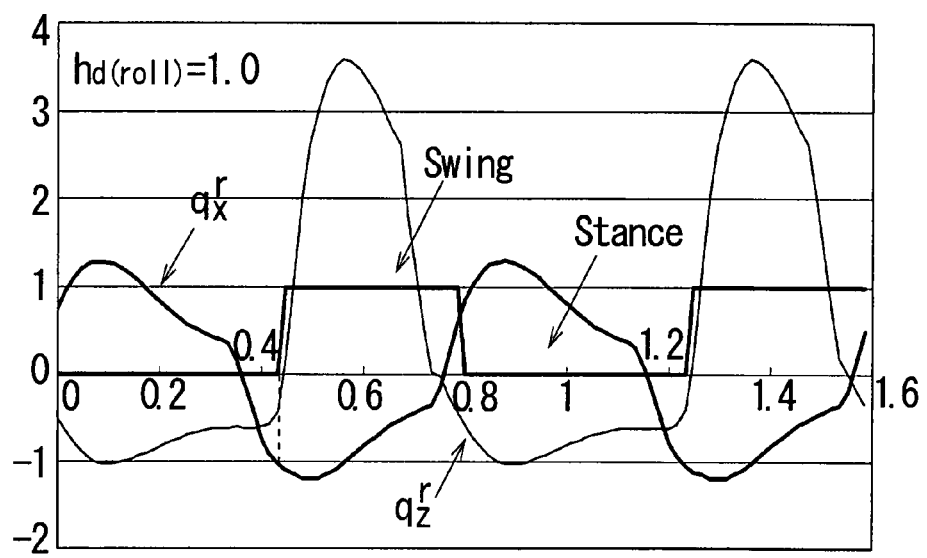

FIGS. 37 through 40 illustrate the trajectories of the right leg when a real robot walks straight forward. FIGS. 37 and 38 show the trajectories when no one-shot feedback signal is used, whereas FIGS. 39 and 40 show the trajectories when a one-shot feedback signal is used. The graphs of FIGS. 37 and 39 are obtained by plotting the oscillator output on the XZ plane. In FIGS. 37 and 39, white circles indicate the idling leg and black squares indicate the supporting leg. They show trajectories that turn clockwise with time. The graphs of FIGS. 38 and 40 show the relationship between the oscillator output and the state of the grounding leg that changes with time.

In FIG. 37, the leg trajectory is substantially elliptic and point-symmetric to indicate that both the extent of stepping down for grounding and the height of the idling leg remain to a substantially same level. FIG. 38 shows that the idling period of the idling leg start when the oscillator output is smallest in the X-direction and hence the supporting leg is at the rearmost position and the supporting leg touches down when the oscillator output is largest.

To the contrary, FIG. 39 shows that the leg trajectory is asymmetric in the Z-direction and the idling leg is raised high when a one-shot feedback signal is used. FIG. 40 also shows that the oscillator output is boosted in the Z-direction.

However, the appropriate phase difference between the X- and Z-directions that is necessary for walking changes when a one-shot feedback signal is introduced. Then, due to the influence thereof, the idling leg shows a forward kicking motion after touching down to consequently reduce the stride. While the trajectory of the idling leg shows a large clearance in the former half of the idling period, it is reduced to a small one in the latter half of the idling period so that the robot can easily stumbles when it encounters an obstacle.

Thus, the base line periodic signal needs to be discussed so as to be used as feedback signal for generating an appropriate phase difference between the X- and Z-directions.

Figure 41:
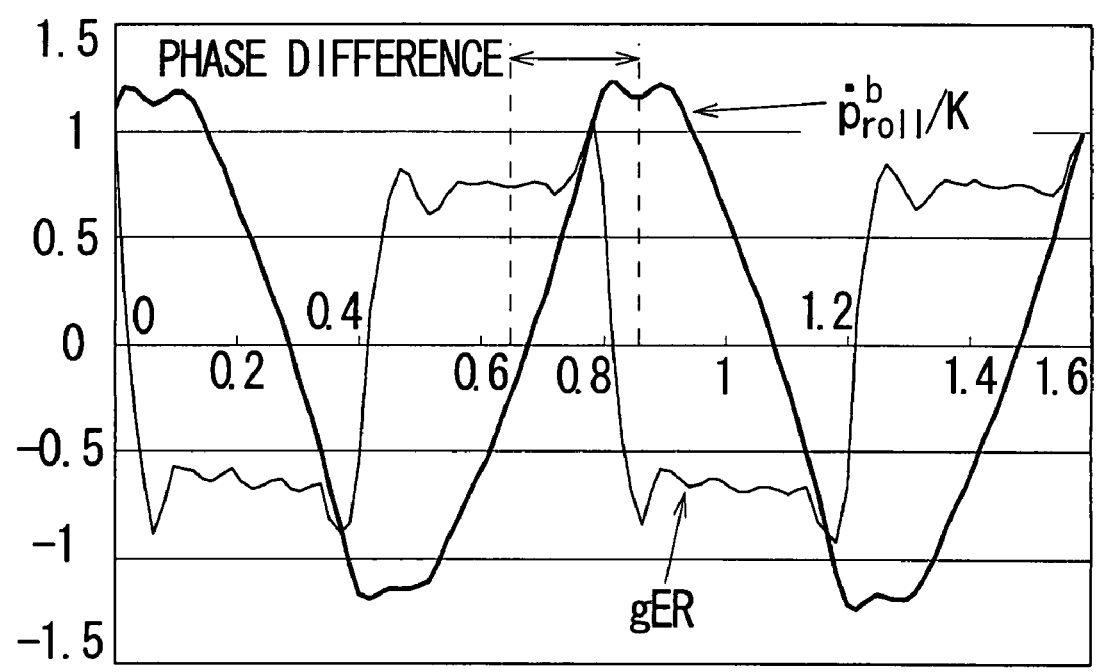
FIG. 41 is a graph illustrating the relationship between the angular velocity of the roll of the trunk and $g_{ER}$ observed in an experiment using a real robot.

For entraining the oscillator in the X-direction, a feedback signal $g_x$ that is based on the angular velocity of the roll of the trunk as defined by the formula (29) is used. It is expected that $g_x$ shows a phase difference of 90 degrees relative to the feedback signal $g_{ER}$ for entraining the oscillator in the Z-direction (as described earlier). FIG. 41 is a graph illustrating the relationship between the angular velocity of the roll of the trunk and $g_{ER}$ observed in an experiment using a real robot. In FIG. 41, K is an appropriate constant of normalization that is obtained from the angular velocity of the roll of the trunk as observed by a sensor for a steady stepping motion. From FIG. 41, a phase difference of about 90 degrees is confirmed.

Thus, an appropriate phase difference that is necessary for walking is produced by weighting and linearly coupling the feedback signals according to the sensor signals to generate a linear feedback signal for the oscillator in the X-direction as defined by formulas (42) through (45) below. The normalized angular velocity of the roll of the trunk is expressed by $g_{d(roll)}$ anew.

[formulas 18]

$$g_{ER} = (F_z^l - F_z^r)/mg \quad (42)$$

$$g_{d(roll)} = \dot{p}_{roll}^b / K \quad (43)$$

$$g_x = \frac{h_{ER} \cdot g_{ER} + h_{d(roll)} \cdot g_{d(roll)}}{\sqrt{h_{ER}^2 + h_{d(roll)}^2}} \quad (44)$$

$$h_{ER} = 1.0 - h_{d(roll)} \quad (0.0 \le h_{d(roll)} \le 1.0) \quad (45)$$

Figure 42:
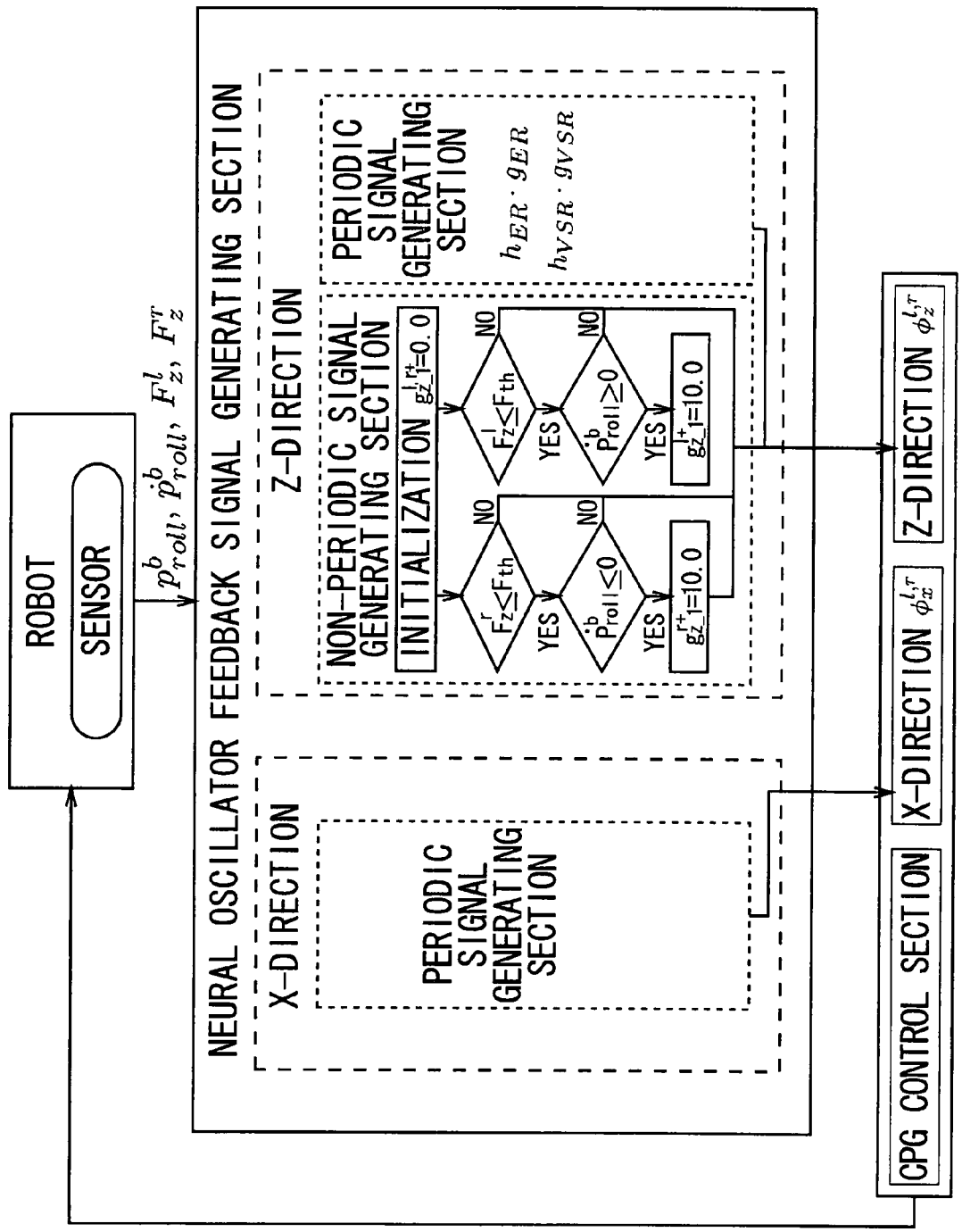
FIG. 42 is a schematic block diagram of the control system for realizing straight forward walking of a robot with a sufficiently large height secured for the idling leg, showing the configuration thereof.
Figure 43:
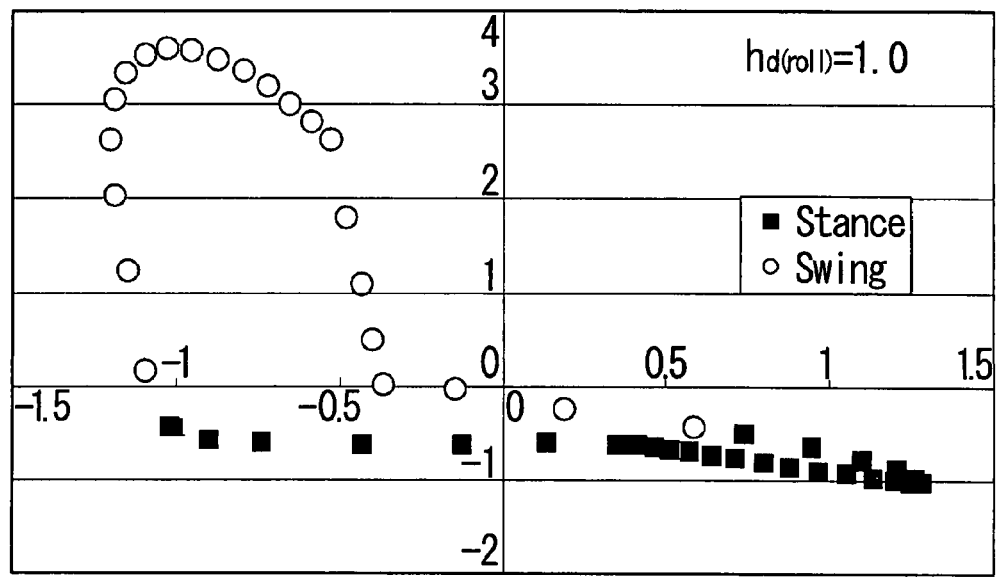
FIGS. 43 through 46 are graphs schematically illustrating the influence of the weight $h_{d(roll)}$ for feedback signal $g_{d(roll)}$ that is based on the angular velocity of the roll of the trunk of a robot on the leg trajectory of the idling leg.
Figure 44:
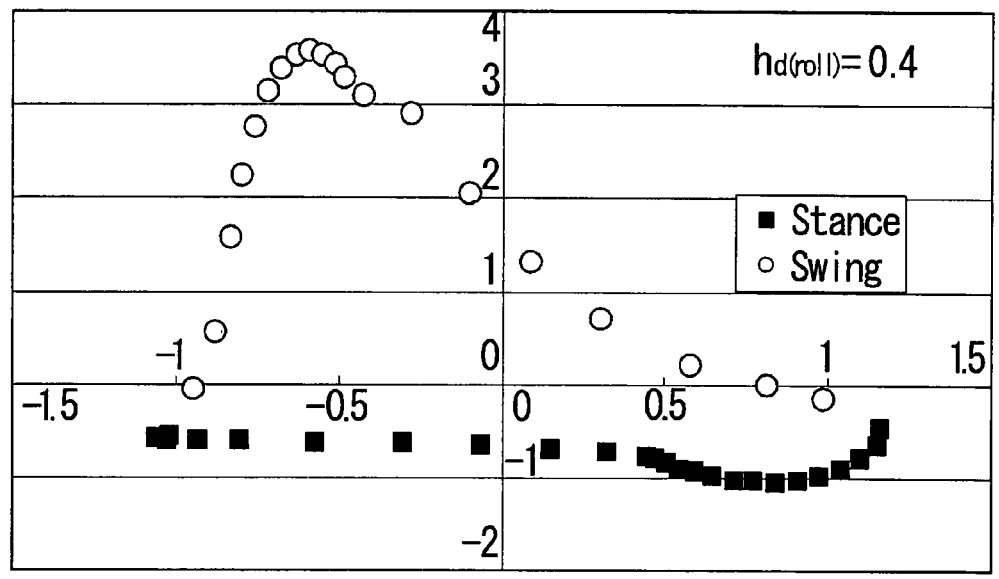
Figure 45:
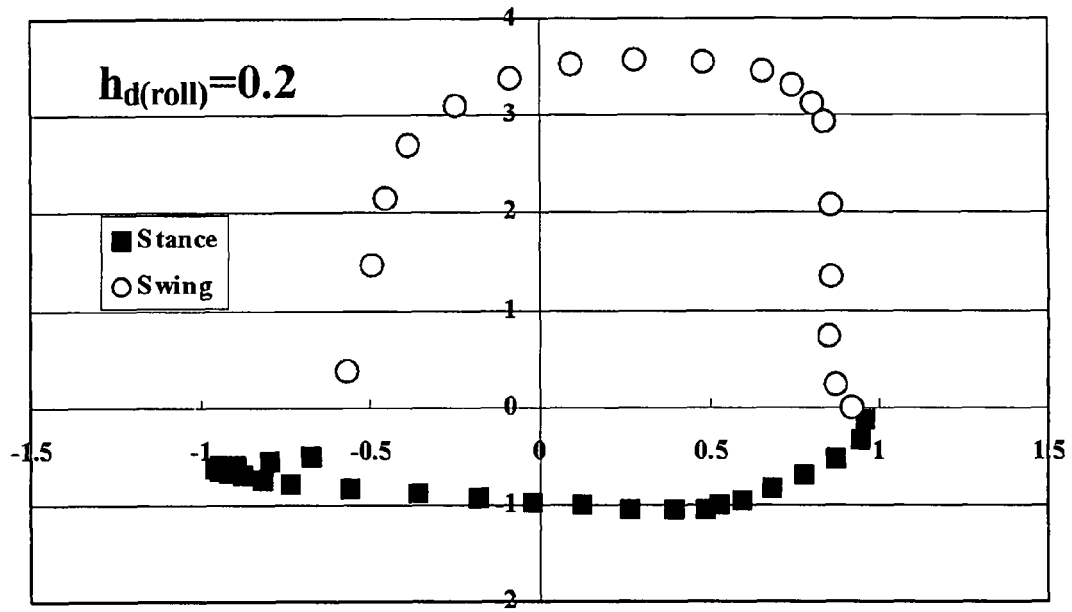
Figure 46:
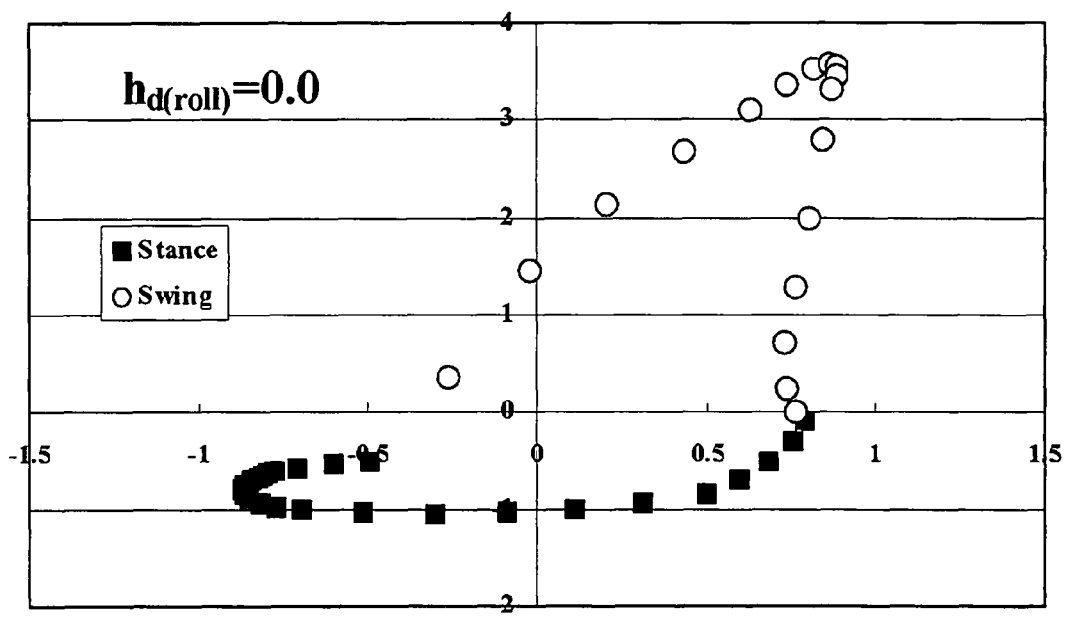

FIG. 42 is a schematic block diagram of the control system for realizing straight forward walking of a robot with a sufficiently large height secured for the idling leg, showing the configuration thereof. As shown in FIG. 42, the neural oscillator feedback signal generating section includes a periodic signal generating section and a non-periodic signal generating section for the neural oscillators in the Z-direction and a periodic signal generating section for the neural oscillators in the X-direction.

The system for generating a feedback signal for the neural oscillators in the Z-direction is similar to that of FIG. 34. More specifically, the periodic signal generating section receives the trunk roll angle $p_{roll}^b$, the angular velocity of the roll of the trunk and the Z-direction floor reaction forces $F_z^l$ and $F_z^r$ of the left and right legs obtained by the stepping motion as inputs, generates linear feedback signals $g_{ER}$ and $g_{VSR}$ that mimic the extensor response and the vestibulo-spinal reflex as expressed by the formulas (15) through (20) and outputs them to the respective neural oscillators $\phi_z^l$ and $\phi_z^r$ in the CPG control section. On the other hand, the non-periodic signal generating section operates when the requirement defined by the formula (36) or (37) is satisfied and generates a one-shot feedback signal expressed by the formula (36) or (37), whichever appropriate. The one-shot feedback signal is then added to the linear feedback signals $g_{ER}$ and $g_{VSR}$ and applied to each of the neural oscillators $\phi_z^l$ and $\phi_z^r$ in the Z-direction. The feedback signals to be applied to the neural oscillators $\phi_z^l$ and $\phi_z^r$ are same as those defined by the formula (38) through (41) shown above.

Meanwhile, the periodic signal generating section for the neural oscillators in the X-direction weights and linearly couples the feedback signal $g_{ER}$ that utilizes the extensor response and the normalized angular velocity $g_{d(roll)}$ of the roll of the trunk to generate a linear feedback signal as expressed by the formula (44) above on the basis of the assumption that the periodic feedback signal $g_x$ shows a phase difference of 90 degrees relative to the feedback signal $g_{ER}$ to be used for entraining the oscillator in the Z-direction and inputs the feedback signal to the oscillators in the X-direction. In this way, it generates an appropriate phase difference necessary for walking. The feedback signals to the neural oscillators $\phi^l_z$ and $\phi^r_z$ are expressed by formulas (46) through (53) below.

[Formulas 19]

$$g_x^{l+} = g_x \quad (46)$$

$$g_x^{l-} = -g_x^{l+} \quad (47)$$

$$g_x^{r+} = -g_x \quad (48)$$

$$g_x^{r-} = -g_x^{r+} \quad (49)$$

$$g_z^{l+} = h_{ER}^l \cdot g_{ER} + h_{VSR}^l \cdot g_{VSR} + g_{z\_1}^{l+} \quad (50)$$

$$g_z^{l-} = -(h_{ER}^l \cdot g_{ER} + h_{VSR}^l \cdot g_{VSR}) \quad (51)$$

$$g_z^{r+} = h_{ER}^r \cdot g_{ER} + h_{VSR}^r \cdot g_{VSR} + g_{z\_1}^{r+} \quad (52)$$

$$g_z^{r-} = -(h_{ER}^r \cdot g_{ER} + h_{VSR}^r \cdot g_{VSR}) \quad (53)$$

The inventors of the present invention looked into the influence of weight $h_{d(roll)}$ for the feedback signal $g_{d(roll)}$ that is based on the angular velocity of the roll of the trunk on the leg trajectories by changing it as parameter according to the formula (45) above. FIGS. 43 through 46 show the obtained results. Consequently, it was confirmed that the largest height of the idling leg gradually moves from the early idling period of the idling leg toward the late idling period.

Since an optimal leg trajectory may vary depending on the purpose, it is not able to be defined unequivocally. However, a trajectory that keeps the clearance to a constant value such as $h_{d(roll)} = 0.2$ is appropriate when waling on an unleveled ground.

Figure 47:
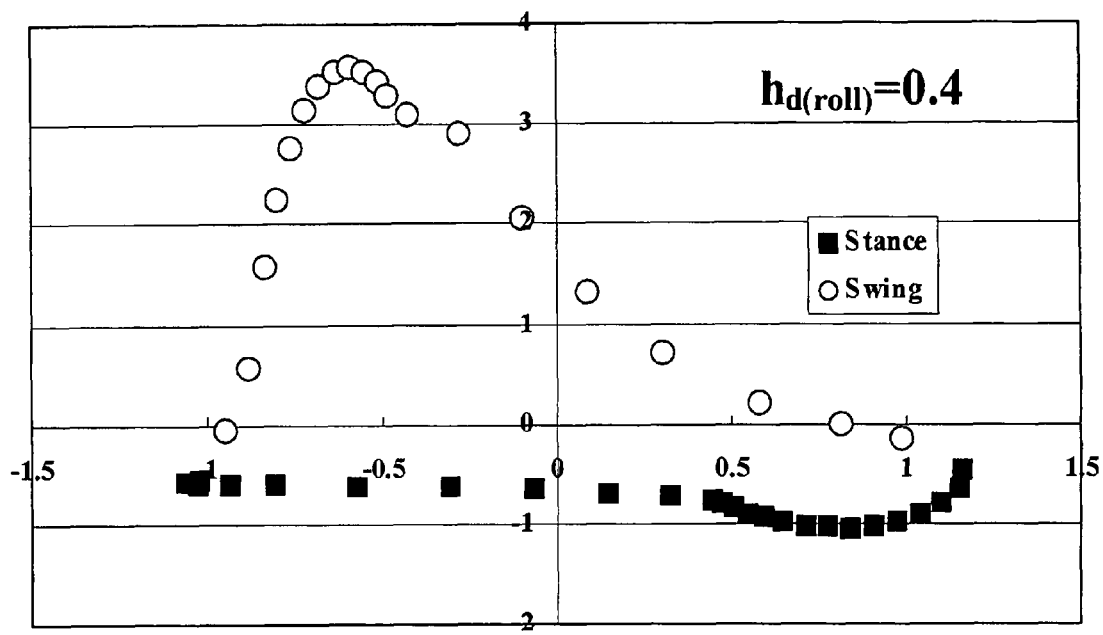
FIG. 47 is a schematic illustration of the trajectory of the idling leg when $h_{d(roll)}=0.4$.
Figure 48:
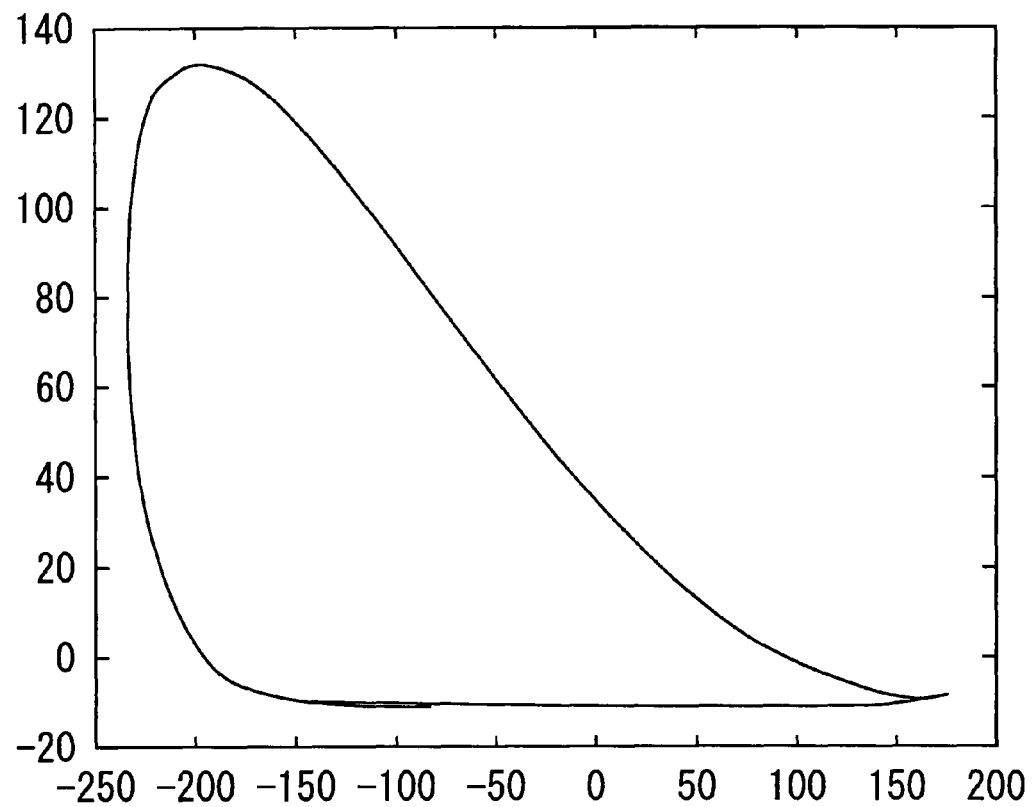
FIG. 48 is a schematic illustration of the trajectory of the idling leg of a human being in a steady walking motion that is drawn by using data obtained by motion capturing.

When the robot is to be designed to mimic the walking attitude of human being, a value of $h_{d(roll)} = 0.4$ may be preferable. FIG. 47 is a schematic illustration of the trajectory of the idling leg when $h_{d(roll)} = 0.4$ FIG. 48 is a schematic illustration of the trajectory of the idling leg of a human being in a steady walking motion that is drawn by using data obtained by motion capturing. It will be seen that the two trajectories resemble each other.

From the above description, it may be understandable that the leg trajectory can be changed by combining a one-shot feedback signal and steady periodic feedback signals.

F-2-4-2. High Speed Walking

In a high speed walking motion using neural oscillators, it is possible to reduce the extent of stepping down of the supporting leg and increase only the height of the idling leg by using a one-shot feedback signal. A reduction in the extent of stepping down leads to a reduction of lateral swinging. Then, as a result, the robot is less prone to fall down. The control system for such a control operation is similar to that of FIG. 42 and will not be described here any further.

Figure 49:
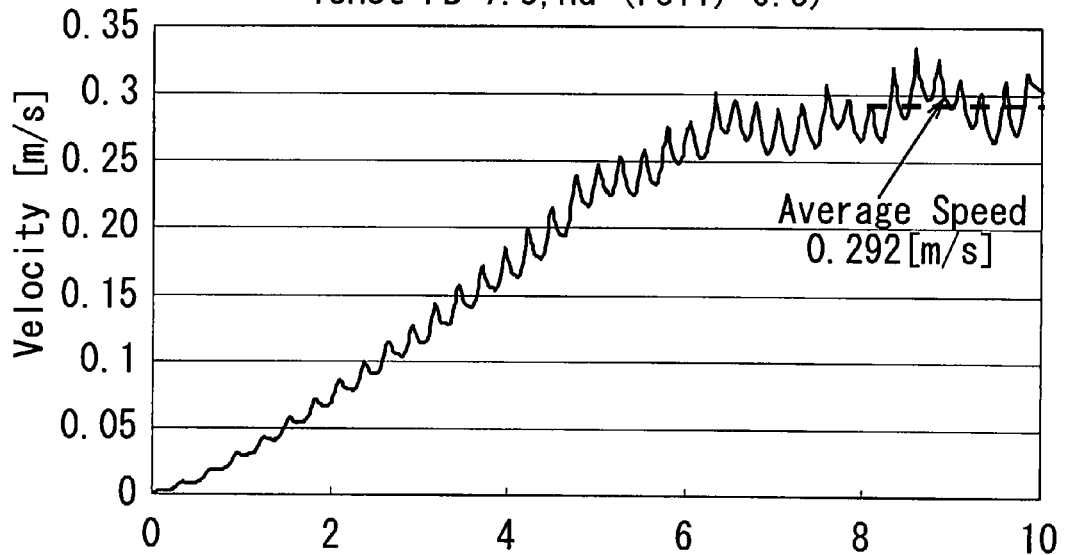
FIG. 49 is a graph illustrating the results of an experiment where a robot is driven to walk at high speed, using neural oscillators and introducing a one-shot feedback signal.
Figure 50:
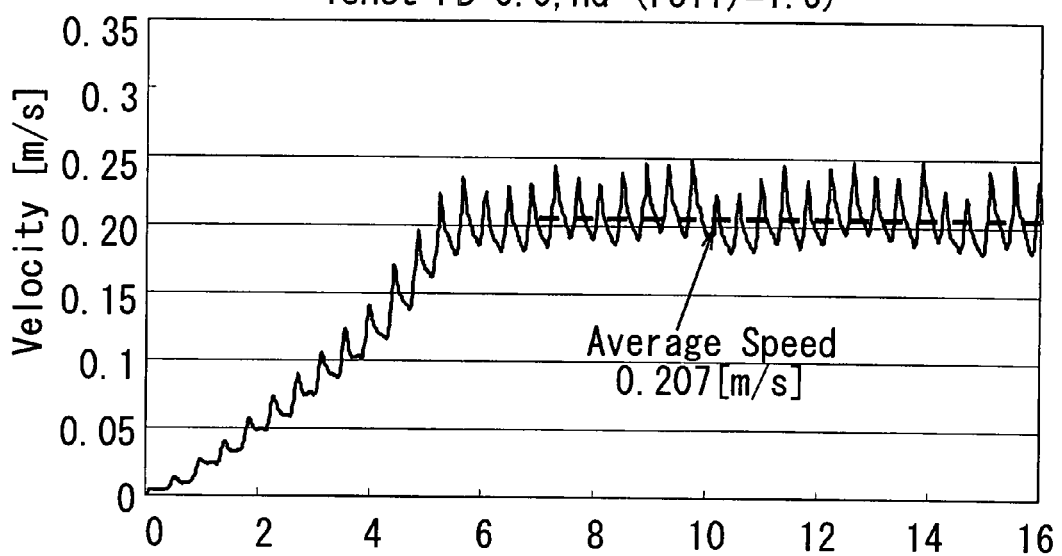
FIG. 50 is a graph illustrating the results of an experiment where a robot is driven to walk at high speed, using neural oscillators without introducing a one-shot feedback signal.

FIG. 49 is a graph illustrating the results of an experiment where a robot is driven to walk at high speed, using neural oscillators and introducing a one-shot feedback signal. For the purpose of comparison, FIG. 50 shows a graph illustrating the results of an experiment where a robot is driven to walk at high speed, using neural oscillator without introducing a one-shot feedback signal. The moving speed is observed by dead reckoning on the basis of the relative speed of the grounding leg and the trunk. A high speed walking that is as fast as 0.292 meters per second could be realized by introducing a one-shot feedback signal. This speed is about 1.5 times greater than the speed that can be realized without introducing a one-shot feedback signal.

F-2-4-3. Improvement of Traveling on Unleveled Ground

Stumbling on an unleveled ground can be avoided by increasing the height of the idling leg. The control system for such a control operation is similar to that of FIG. 42 and will not be described here any further.

The inventors of the present invention conducted an experiment where a robot apparatus is made to travel over steps in order to see the traveling ability of the robot on an unleveled ground by using a one-shot feedback signal. In this experiment, wood panels that are 2, 3, 5 and 6.5 millimeters thick were placed on the walking surface of the robot to see if the robot can step up on and down from such wood panels. The robot was made to step up on and down ten times from each of the wood panels. The robot was made to start walking in various directions and the ratio of the successful stepping motions was checked. Since it is known that the robustness of the robot in the lateral direction is improved when the walking cycle is short, the waling cycle was changed by changing the time constant $\tau_1$ of the neural oscillators.

Figure 51:
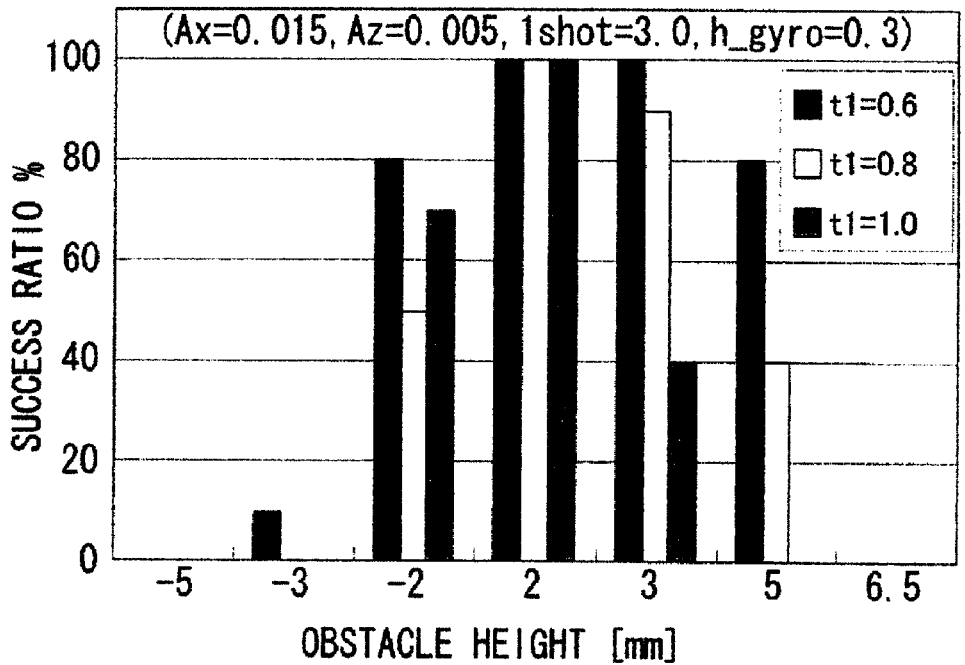
FIG. 51 is a graph illustrating the results of an experiment where a traveling motion of a robot over an unleveled ground is verified by introducing a one-shot feedback signal.
Figure 52:
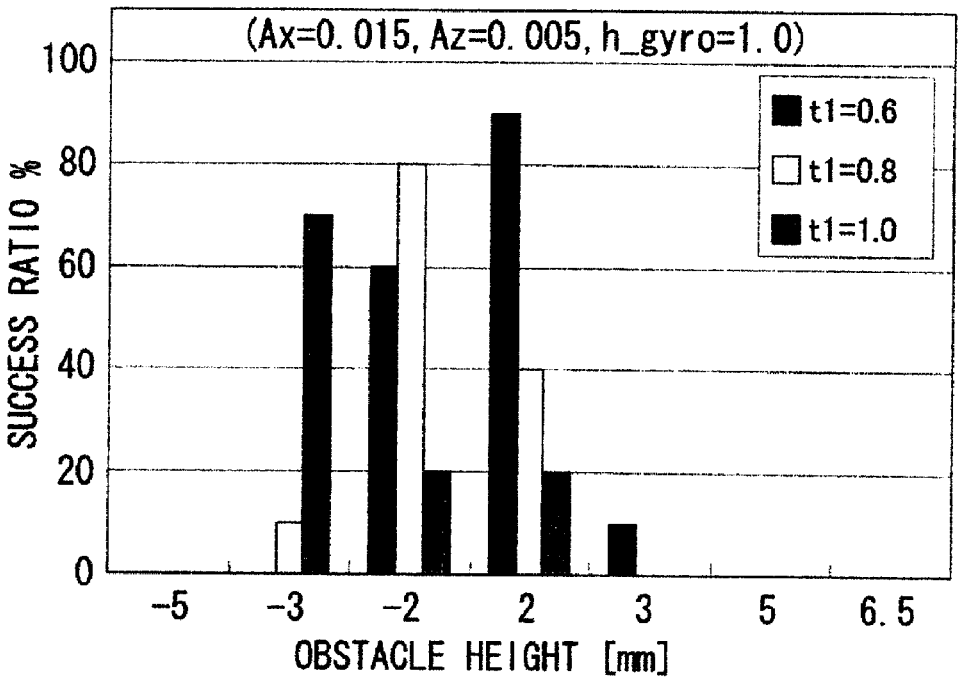
FIG. 52 is a graph illustrating the results of an experiment where a traveling motion of a robot over an unleveled ground is verified by without introducing a one-shot feedback signal.

FIG. 51 is a graph illustrating the results of the experiment. For the purpose of comparison, FIG. 52 shows a graph illustrating the result of an experiment conducted without using a one-shot feedback signal. In each of the graphs, the horizontal axis indicates the condition of the step and the vertical axis indicates the ratio (%) of the traveling successes by using bars. Different patterns show different walking cycles. The ratio of the traveling successes is high when a one-shot feedback signal is used. Additionally, the ratio of the traveling successes is high when a one-shot feedback signal is used and the walking cycle is short.

F-2-5. Improvement of the Robustness Relative to Forward External Force

The robustness of a robot apparatus can be improved relative to abrupt external turbulences by widening the stride in an operation of controlling the motion of a robot including neural oscillators when a one-shot feedback signal is introduced.

Figure 53:
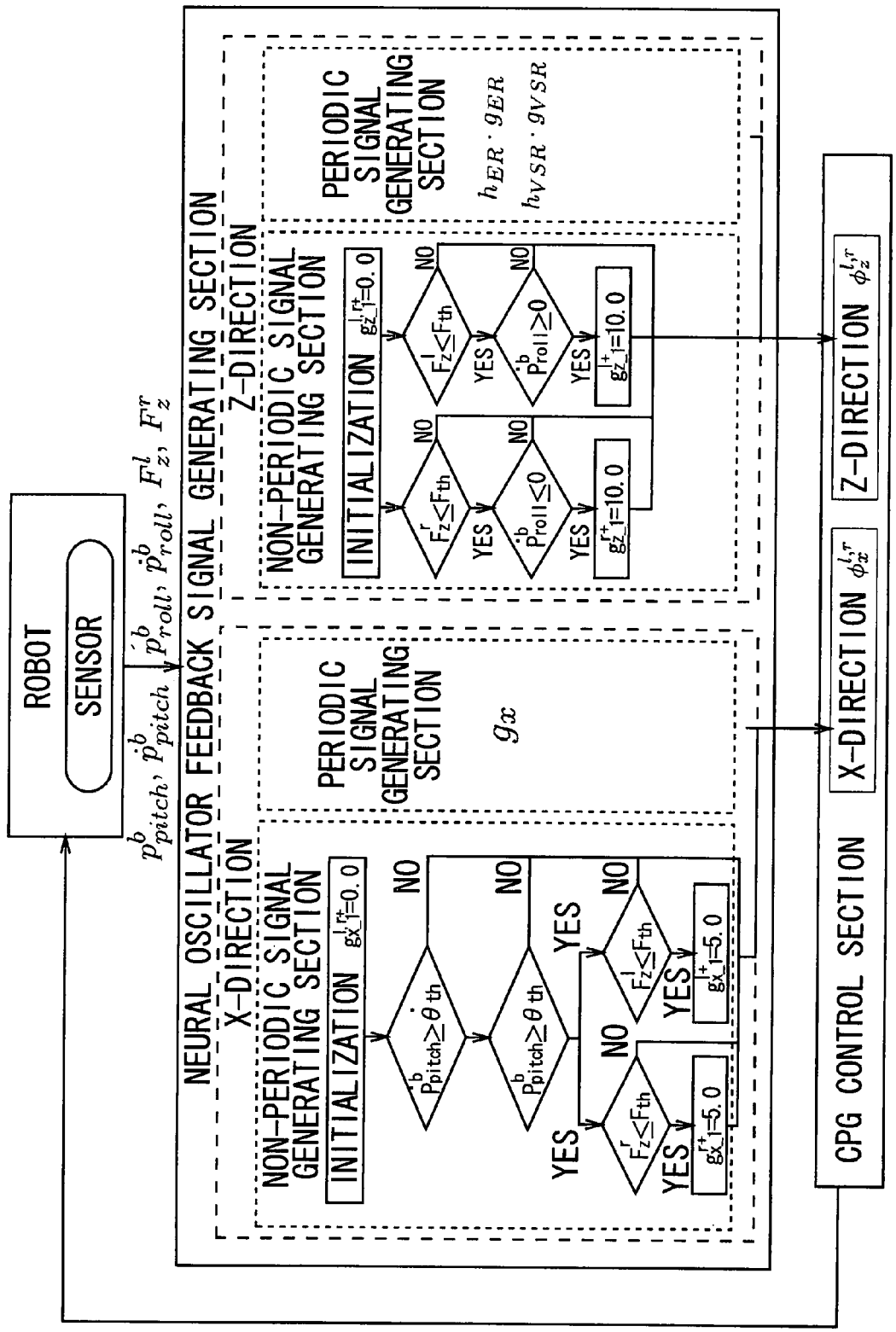
FIG. 53 is a schematic illustration of a control system for improving the robustness of a robot apparatus relative to forward external force, showing the configuration thereof.

FIG. 53 is a schematic illustration of a control system for improving the robustness of a robot apparatus relative to forward external force, showing the configuration thereof. This system is realized by adding a non-periodic signal generating section for generating a feedback signal for the oscillators in the X-direction to the control system for straight forward walking of FIG. 42. The non-periodic signal generating section applies a non-periodic feedback signal to the neural oscillators to temporarily widen the stride and draw back the neural oscillators in the X-direction to the entrainment region.

The system for generating a feedback signal for the neural oscillators in the Z-direction is same as the one illustrated in FIG. 34. More specifically, the periodic signal generating section receives the trunk roll angle $p^b_{roll}$, the angular velocity of the roll of the trunk and the Z-direction floor reaction forces $F^l_z$ and $F^r_z$ of the left and right legs obtained by the stepping motion as inputs, generates linear feedback signals $g_{ER}$ and $g_{VSR}$ that mimic the extensor response and the vestibulo-spinal reflex as expressed by the formulas (15) through (20) and outputs them to the respective neural oscillators $\phi^l_z$ and $\phi^r_z$ in the CPG control section. On the other hand, the non-periodic signal generating section operates when the requirement defined by the formula (36) or (37) is satisfied and generates a one-shot feedback signal expressed by the formula (36) or (37), whichever appropriate. The one-shot feedback signal is then added to the linear feedback signals $g_{ER}$ and $g_{VSR}$ as base line and applied to each of the neural oscillators $\phi^l_z$ and $\phi^r_z$ in the Z-direction. The feedback signals to be applied to the neural oscillators $\phi^l_z$ and $\phi^r_z$ are same as those defined by the formula (38) through (41) shown above.

On the other hand, the periodic signal generating section for the neural oscillators in the X-direction weights and linearly couples the feedback signal $g_{ER}$ that utilizes the extensor response and the normalized angular velocity $g_{d(roll)}$ of the roll of the trunk to generate a linear feedback signal as expressed by the formula (44) above on the basis of the assumption that the periodic feedback signal $g_x$ shows a phase difference of 90 degrees relative to the feedback signal $g_{ER}$ to be used for entraining the oscillator in the Z-direction and inputs the feedback signal to the oscillators in the X-direction. In this way, it generates an appropriate phase difference necessary for walking.

Meanwhile, the non-periodic signal generating section for the neural oscillators in the X-direction generates a one-shot feedback signal when the three requirements listed below are satisfied.

(1) vertical floor reaction force<$F_{z\_th}$
(2) trunk angular velocity>$\omega_{th}$
(3) trunk angle>$\theta_{th}$ In the above formulas, $F_{z\_th}$ is the threshold value for the floor reaction force and $\omega_{th}$ is the threshold value for the trunk angular velocity while $\theta_{th}$ is the threshold value for the trunk angle. The above three requirements are defined by formula (54) below.

[Formula 20]

When $$(\dot{p}_{pitch}^b \geq \dot{\theta}_{th}) \cap (p_{pitch}^b \geq \theta_{th}) \cap (F_z^{l,r} \leq F_{th}), \quad (54)$$

$$g_{x\_1}^{l,r+} = 5.0$$

where
$F_{th}$: threshold value for floor reaction force in Z-direction
$\theta_{th}$: threshold value for trunk pitch angle
$\theta_{th}$: threshold value for angular velocity of trunk pitch
$g_{x\_1}^{l,r}$: non-periodic feedback signal in Z-direction The non-periodic signal generating section for the neural oscillators in the X-direction generates one-shot feedback signals $g_{x\_1}^{l}$ and $g_{x\_1}^{r}$ of +5.0 in the +X-direction and input them respectively to the neural oscillators $\phi_x^l$ and $\phi_x^r$ in the X-direction in order to increase their outputs in the +X-direction in the idling period of the idling leg and widen the stride, thereby preventing the robot from falling down. The one-shot feedback signals are added to the linear feedback signal $g_x$ from the periodic signal generating section that operates as base line and applied respectively to the neural oscillators $\phi_x^l$ and $\phi_x^r$. The feedback term for the neural oscillators in the Z-direction is same as that of stepping motion in stead forward walking. The feedback signals to the neural oscillators are defined by formulas (55) through (62) below.

[Formulas 21]

$$g_x^{l+} = g_x + g_{x\_1}^{l+} \quad (55)$$

$$g_x^{l-} = -g_x^{l+} \quad (56)$$

$$g_x^{r+} = -g_x + g_{x\_1}^{r+} \quad (57)$$

$$g_x^{r-} = -g_x^{r+} \quad (58)$$

$$g_z^{l+} = h_{ER}^l \cdot g_{ER} + h_{VSR}^l \cdot g_{VSR} + g_{z\_1}^{l+} \quad (59)$$

$$g_z^{l-} = -(h_{ER}^l \cdot g_{ER} + h_{VSR}^l \cdot g_{VSR}) \quad (60)$$

$$g_z^{r+} = h_{ER}^r \cdot g_{ER} + h_{VSR}^r \cdot g_{VSR} + g_{z\_1}^{r+} \quad (61)$$

$$g_z^{r-} = -(h_{ER}^r \cdot g_{ER} + h_{VSR}^r \cdot g_{VSR}) \quad (62)$$

Figure 54:
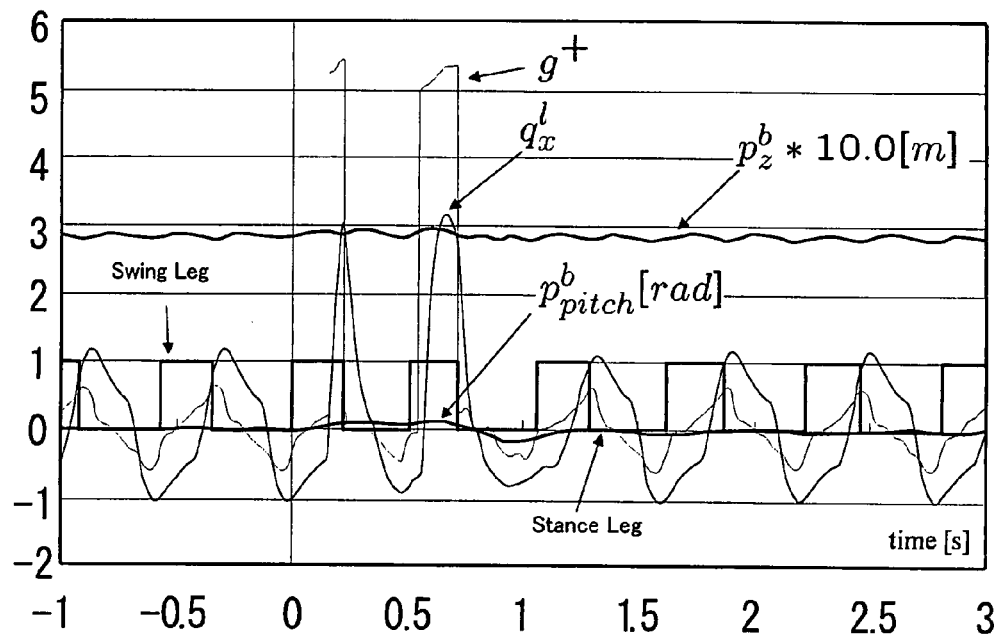
FIG. 54 is a graph schematically illustrating the results of a dynamics simulation where horizontal external force is applied to the pelvic section of a steadily walking robot in the moving direction (X-direction) and the stride is widened by means of a one-shot feedback signal.
Figure 55:
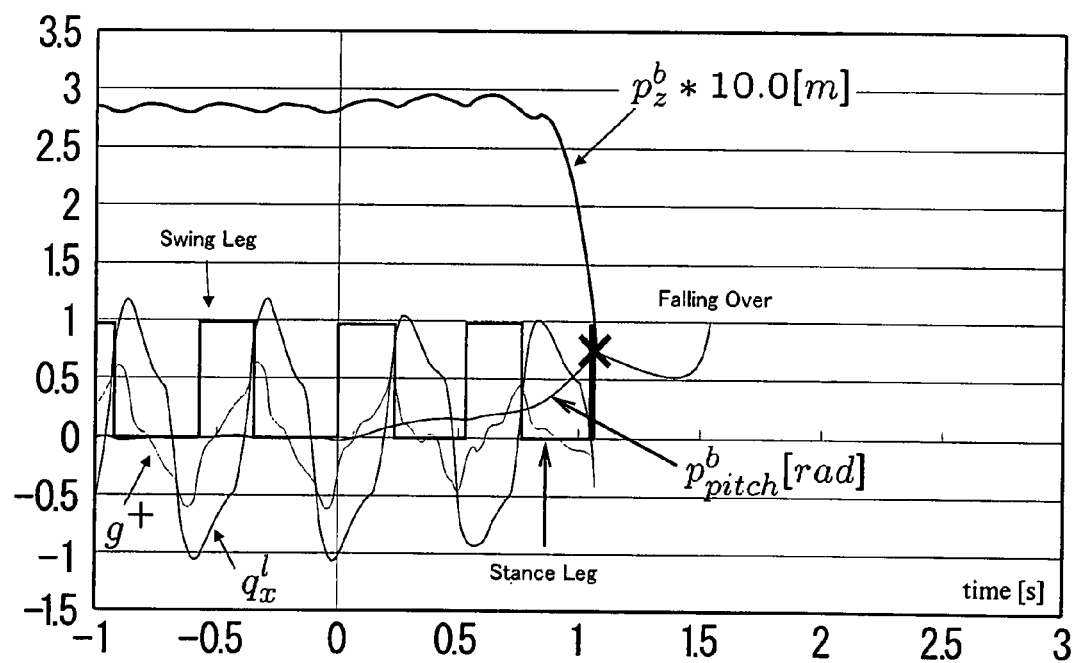
FIG. 55 is a graph schematically illustrating the results of a dynamics simulation where horizontal external force is applied to the pelvic section of a steadily walking robot in the moving direction (X-direction) without using a one-shot feedback signal.

FIG. 54 is graph schematically illustrating the results of a dynamics simulation where horizontal external force of 25.0N is applied to the pelvic section of a steadily walking robot (with a stride of 0.04 m and at a pace of 0.4 second per stride) in the moving direction (X-direction) only from time 0 to time 1.2 seconds and the stride is widened by means of a one-shot feedback signal. For the purpose of comparison, FIG. 55 shows a graph schematically illustrating the results of a similar simulation made under the same conditions without using a one-shot feedback signal. In the graphs, each of "Swing Leg and Stance Leg" shows the value that indicates if the sole touches the floor or not. The value of 1 indicates the idling leg and the value of 0 indicated the supporting leg.

When no one-shot feedback signal is introduced, as seen from FIG. 55, the trunk of the robot is gradually inclined forward after the time when horizontal external force is applied to the robot and eventually the robot falls down. This will be understood from the height $p_z^b$ of the trunk.

To the contrary, when a one-shot feedback signal is introduced, as seen from FIG. 54, the oscillator output $q_z^l$ that describes the motion of the left leg in the Z-direction, which is the idling leg at the time when horizontal external force is applied to the robot, increased in the positive direction to a large extent due to the one-shot feedback signal. Then, as a result, the stride of the robot increased when the horizontal external force is applied to the robot to make it possible to prevent the robot from falling down. As a matter of fact, while the trunk pitch angle $p_{pitch}^b$ oscillates to a large extent at time 0 to 1.2 seconds but thereafter the trunk height keeps a substantially same value so that it may be understood that the robot can keep on walking.

Figure 56:
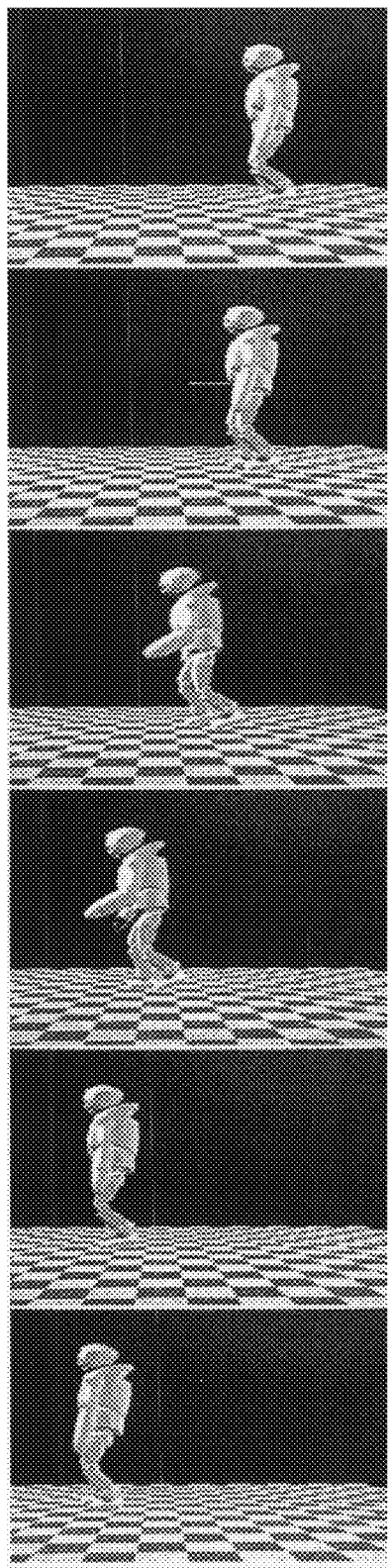
FIG. 56 illustrates visualized images for every predetermined time period of the results of a dynamics simulation where horizontal external force is applied to a steadily walking robot and a one-shot feedback signal is used.
Figure 57:
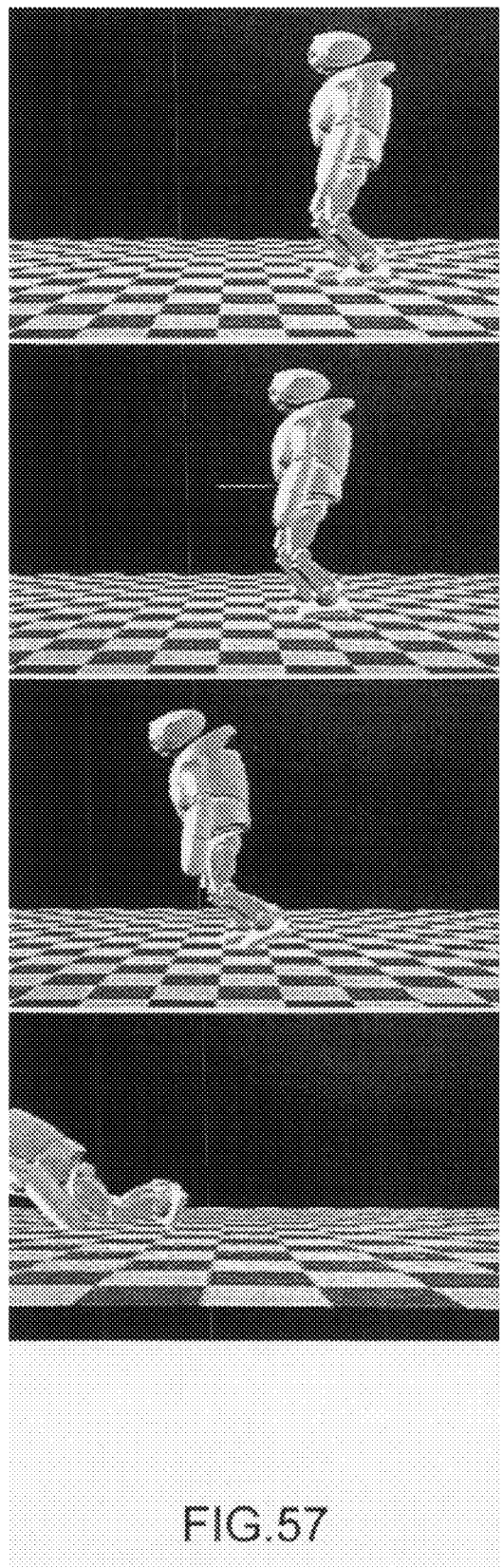
FIG. 57 illustrates visualized images in every predetermined time period of the results of a dynamics simulation where horizontal external force is applied to a steadily walking robot and a one-shot feedback signal is not used.

FIGS. 56 and 57 are visualized images in every predetermined time period of the results of a dynamics simulation where horizontal external force is applied to the pelvic section of a steadily walking robot in the moving direction (X-direction) by means of a one-shot feedback signal and those when no one-shot feedback signal is used. In each of FIGS. 56 and 57, the second image from the top shows that external turbulence is horizontally applied forward.

As shown in FIG. 57, the robot eventually falls down when no one-shot feedback signal is used. To the contrary, as shown in FIG. 56, the robot does not fall down and keeps on walking when a one-shot feedback signal is used.

While the present invention is described in detail by way of a specific embodiment, the present invention is by no means limited to and it may be obvious to those skilled in the art that the described and illustrated embodiment can be modified and altered in various different ways without departing from the spirit and scope of the invention.

While this specification describes the embodiments of the present invention applied to a biped locomotion robot apparatus, the gist of the present invention is not limited thereto. The present invention is equally applicable to locomotion robots other than biped robots and legged robots as well as to machine apparatus other than robot so long as such machine apparatus have a movable section that do cyclic motions and can be controlled for such motions by means of one or more than one oscillators that show self-oscillation and entrainment characteristics.

It should be understood by those skilled in the art that various modifications, combinations, sub-combinations and alterations may occur depending on design requirements and other factors in so far as they are within the scope of the appended claims or the equivalents thereof.

What is claimed is:

1. A robot apparatus having a plurality of movable sections and comprising:

a motion control section that generates a control signal for periodic motion of at least part of the movable sections according to an output of an oscillator showing self-oscillation and entrainment characteristics;

an environment measuring section that measures the motion according to the control signal for the movable sections or physical environment at the time of the motion of the movable sections;

a periodic oscillator control section that inputs a periodic signal to the oscillator as feedback according to the outcome of the measurement by the environment measuring section and generates an entrainment phenomenon; and a non-periodic oscillator control section that inputs a non-periodic or temporary feedback signal to the oscillator only when the robot apparatus is in an unsteady state.

2. The apparatus according to claim 1, wherein
the movable sections have at least a joint; and
the motion control section transforms the output of the oscillator into the trajectories of the movable sections in the coordinate system of the robot apparatus and computationally determines the command value for the joint from the trajectories by inverse kinematics arithmetic.

3. The apparatus according to claim 1, wherein
the oscillator is a neural oscillator formed by mutually inhibiting coupling of two neural elements, one of which works for the positive side output while the other works for the negative side output.

4. The apparatus according to claim 3, wherein
the non-periodic oscillator control section performs an excitation-excitation type feedback operation of inputting a feedback signal of a positively directed single pulse rectangular wave or an inhibition-inhibition type feedback operation of inputting a feedback signal of a negatively directed single pulse rectangular wave to both of the positive side neural element and the negative side neural element.

5. The apparatus according to claim 3, wherein
the non-periodic oscillator control section performs an excitation-inhibition type feedback operation of inputting a positively directed feedback signal and a negatively directed feedback signal respectively to the positive side neural element and the negative side neural element.

6. The apparatus according to claim 3, wherein
the non-periodic oscillator control section performs an excitation-zero type or inhibition-zero type feedback operation of inputting a positively directed or negatively directed, whichever appropriate, feedback signal of a single pulse rectangular wave only to either of the positive side and negative side neural elements.

7. The apparatus according to claim 1, further comprising:
an oscillator state determining section that determines the state of the oscillator to be inside or outside of the entrainment region on the phase plane defined by orthogonal axes of the output of the oscillator and its temporal differential;

the periodic oscillator control section outputting a periodic feedback signal for causing the oscillator to produce an entrainment phenomenon according to the outcome of measurement of the environment measuring section; and the non-periodic oscillator control section outputting a feedback signal for the oscillator of a constant value for drawing the oscillator back to the entrainment region according to the determination on the state of the oscillator to be outside of the entrainment region.

8. The apparatus according to claim 1, wherein
the motion control section uses a periodic feedback signal from the periodic oscillator control section and a non-periodic feedback signal from the non-periodic oscillator control section in combination for the oscillator.

9. The apparatus according to claim 1, further comprising left and right legs fitted to the trunk as movable sections;
the motion control section driving the Z-position of each of the legs by adding a value based on the output of an oscillator describing the motion of the leg in the Z-direction to the initial reference position defined in the leg for the Z-direction, and the periodic oscillator control section generating a linear feedback signal according to at least the difference of the floor reaction forces applied to the respective soles of the left and right legs or the roll angle of the trunk and inputting it to the oscillator describing the motions of the legs in the Z-direction, at the time of carrying out an intra-lateral-plane motion for a walking motion using the left and right legs.

10. The apparatus according to claim 9, further comprising left and right legs fitted to the trunk as movable sections;
the motion control section driving the X-position of each of the legs by means of an oscillator describing the motion of the leg in the X-direction and showing a phase shifted by about 90 degrees relative to the oscillator describing the motion of the leg in the Z-direction, and the periodic oscillator control section generating a linear feedback signal according to the angular velocity of the roll of the trunk and inputting it to the oscillator describing the legs in the X-direction, at the time of carrying out an intra-sagittal-plane motion for a walking motion using the left and right legs.

11. The apparatus according to claim 10, wherein
the non-periodic oscillator control section temporarily supplies a feedback signal for increasing the amplitude to the oscillator describing the motions of the legs in the X-direction, when increasing the stride to move the idling leg further forward in the intra-sagittal-plane motion.

12. The apparatus according to claim 10, wherein
the non-periodic oscillator control section temporarily supplies a feedback signal for decreasing the amplitude to the oscillator describing the motions of the legs in the X-direction, when decreasing the stride in the intra-sagittal-plane motion.

13. The apparatus according to claim 10, wherein
the non-periodic oscillator control section temporarily supplies a feedback signal for increasing the amplitude in the positive Z-direction to the oscillator describing the motion of the idling leg in the Z-direction, when increasing the height of the idling leg in the intra-lateral-plane motion.

14. The apparatus according to claim 13, wherein
the non-periodic oscillator control section temporarily supplies a feedback signal having a value greater than the amplitude of the oscillator formed by using as base line the linear feedback signal generated by the periodic oscillator control section according to at least the difference of the floor reaction forces applied to the respective soles of the left and right legs or the roll angle of the trunk to the oscillator describing the motion of the idling leg in the Z-direction.

15. The apparatus according to claim 13, wherein
the periodic oscillator control section inputs a base line periodic signal for causing the oscillator describing the motion in the X-direction to produce an appropriate phase difference with the oscillator describing the motion in the Z-direction, following the operation of the non-periodic oscillator control section of inputting a temporary feedback signal to the oscillator describing the motion in the Z-direction.

16. The apparatus according to claim 15, wherein the periodic oscillator control section generates the base line periodic signal by coupling the linear feedback signal based on the difference of the floor reaction forces applied to the respective soles of the left and right legs and the linear feedback signal based on the angular velocity of the roll of the trunk by weighting linear coupling.

17. The apparatus according to claim 10, wherein the non-periodic oscillator control section temporarily supplies a feedback signal that increases the output in the acting direction of external force to the oscillator describing the motion in the acting direction of the external force when the floor reaction force to the sole falls below a predetermined threshold value as a result of application of the external force and both the angular velocity and the angle of the trunk exceeds the respective threshold values.

18. A method of controlling a robot apparatus having a plurality of movable sections, the method comprising:
   a motion control step of generating a control signal for periodic motion of at least part of the movable sections according to an output of an oscillator showing self-oscillation and entrainment characteristics;
   an environment measuring step of measuring the motion according to the control signal for the movable sections or physical environment at the time of the motion of the movable sections;
   a periodic oscillator control step of inputting a periodic signal to the oscillator as feedback according to the outcome of the measurement in the environment measuring step and generating an entrainment phenomenon; and
   a non-periodic oscillator control step of inputting a non-periodic or temporary feedback signal to the oscillator only when the robot apparatus is in an unsteady state.

19. The method according to claim 18, wherein the movable sections have at least a joint; and the motion control step transforms the output of the oscillator into the trajectories of the movable sections in the coordinate system of the robot apparatus and computationally determines the command value for the joint from the trajectories by inverse kinematics arithmetic.

20. The method according to claim 18, wherein the oscillator is a neural oscillator formed by mutually inhibiting coupling of two neural elements, one of which works for the positive side output while the other works for the negative side output.

21. The method according to claim 20, wherein the non-periodic oscillator control step performs an excitation-excitation type feedback operation of inputting a feedback signal of a positively directed single pulse rectangular wave or an inhibition-inhibition type feedback operation of inputting a feedback signal of a negatively directed single pulse rectangular wave to both of the positive side neural element and the negative side neural element.

22. The method according to claim 20, wherein the non-periodic oscillator control step performs an excitation-inhibition type feedback operation of inputting a positively directed feedback signal and a negatively directed feedback signal respectively to the positive side neural element and the negative side neural element.

23. The method according to claim 20, wherein the non-periodic oscillator control step performs an excitation-zero type or inhibition-zero type feedback operation of inputting a positively directed or negatively directed, whichever appropriate, feedback signal of a single pulse rectangular wave only to either of the positive side and negative side neural elements.

24. The method according to claim 18, further comprising:
   an oscillator state determining step of determining the state of the oscillator to be inside or outside of the entrainment region on the phase plane defined by orthogonal axes of the output of the oscillator and its temporal differential;
   the periodic oscillator control step outputting a periodic feedback signal for causing the oscillator to produce an entrainment phenomenon according to the outcome of measurement of the environment measuring step; and
   the non-periodic oscillator control step outputting a feedback signal for the oscillator of a constant value for drawing the oscillator back to the entrainment region according to the determination on the state of the oscillator to be outside of the entrainment region.

25. The method according to claim 18, wherein the motion control step uses as base line a periodic feedback signal generated in the periodic oscillator control step and a non-periodic feedback signal generated in the non-periodic oscillator control step in combination for the oscillator.

26. The method according to claim 18, wherein the robot apparatus further comprises left and right legs fitted to the trunk as movable sections;
   the motion control step driving the Z-position of each of the legs by adding a value based on the output of an oscillator describing the motion of the leg in the Z-direction to the initial reference position defined in the leg for the Z-direction, and
   the periodic oscillator control step generating a linear feedback signal according to at least the difference of the floor reaction forces applied to the respective soles of the left and right legs or the roll angle of the trunk and inputting it to the oscillator describing the motions of the legs in the Z-direction,
   at the time of carrying out an intra-lateral-plane motion for a walking motion using the left and right legs.

27. The method according to claim 26, wherein the robot apparatus further comprises left and right legs fitted to the trunk as movable sections;
   the motion control step driving the X-position of each of the legs by means of an oscillator describing the motion of the leg in the X-direction and showing a phase shifted by about 90 degrees relative to the oscillator describing the motion of the leg in the Z-direction, and
   the periodic oscillator control step generating a linear feedback signal according to the angular velocity of the roll of the trunk and inputting it to the oscillator describing the legs in the X-direction,
   at the time of carrying out an intra-sagittal-plane motion for a walking motion using the left and right legs.

28. The method according to claim 27, wherein the non-periodic oscillator control step temporarily supplies a feedback signal for increasing the amplitude to the oscillator describing the motions of the legs in the X-direction,
   when increasing the stride to move the idling leg further forward in the intra-sagittal-plane motion.

29. The method according to claim 27, wherein
the non-periodic oscillator control step temporarily supplies a feedback signal for decreasing the amplitude to the oscillator describing the motions of the legs in the X-direction,
when decreasing the stride in the intra-sagittal-plane motion.

30. The method according to claim 27, wherein
the non-periodic oscillator control step temporarily supplies a feedback signal for increasing the amplitude in the positive Z-direction to the oscillator describing the motion of the idling leg in the Z-direction,
when increasing the height of the idling leg in the intra-lateral-plane motion.

31. The method according to claim 30, wherein
the non-periodic oscillator control step temporarily supplies a feedback signal having a value greater than the amplitude of the oscillator formed by using as base line the linear feedback signal generated by the periodic oscillator control section according to at least the difference of the floor reaction forces applied to the respective soles of the left and right legs or the roll angle of the trunk to the oscillator describing the motion of the idling leg in the Z-direction.

32. The method according to claim 31, wherein
the periodic oscillator control step inputs a base line periodic signal for causing the oscillator describing the motion in the X-direction to produce an appropriate phase difference with the oscillator describing the motion in the Z-direction, following the operation of the non-periodic oscillator control step of inputting a temporary feedback signal to the oscillator describing the motion in the Z-direction.

33. The method according to claim 32, wherein
the periodic oscillator control step generates the base line periodic signal by coupling the linear feedback signal based on the difference of the floor reaction forces applied to the respective soles of the left and right legs and the linear feedback signal based on the angular velocity of the roll of the trunk by weighting linear coupling.

34. The method according to claim 27, wherein
the non-periodic oscillator control step temporarily supplies a feedback signal that increases the output in the acting direction of external force to the oscillator describing the motion in the acting direction of the external force when the floor reaction force to the sole falls below a predetermined threshold value as a result of application of the external force and both the angular velocity and the angle of the trunk exceed the respective threshold values.

* * * * *